July 10, 1956          H. F. BRUNS          2,753,795
ROTARY OFFSET DUPLICATING MACHINE
Filed April 5, 1950          39 Sheets-Sheet 7
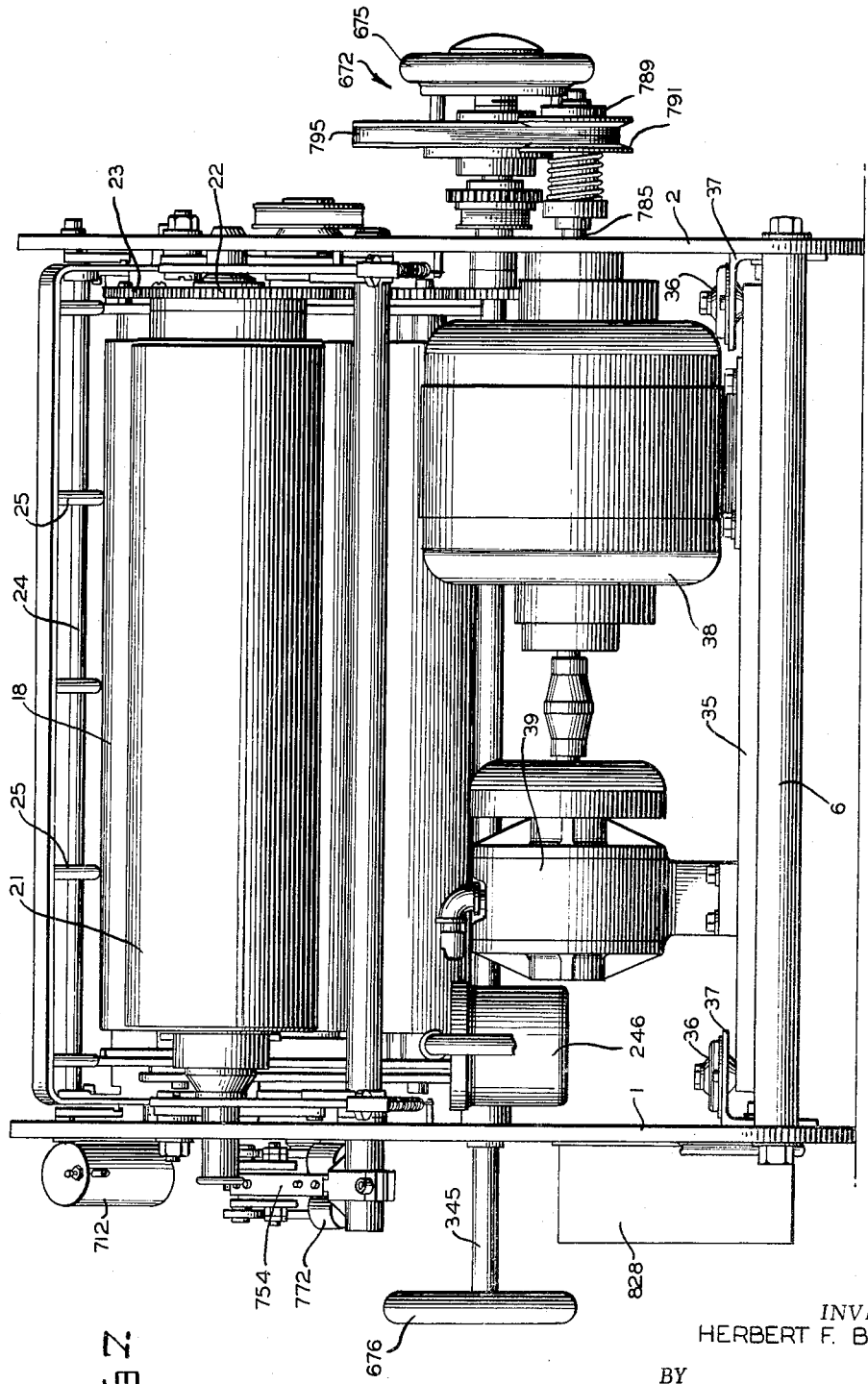
INVENTOR.
HERBERT F. BRUNS
BY
Cushman, Darby & Cushman
ATTORNEY

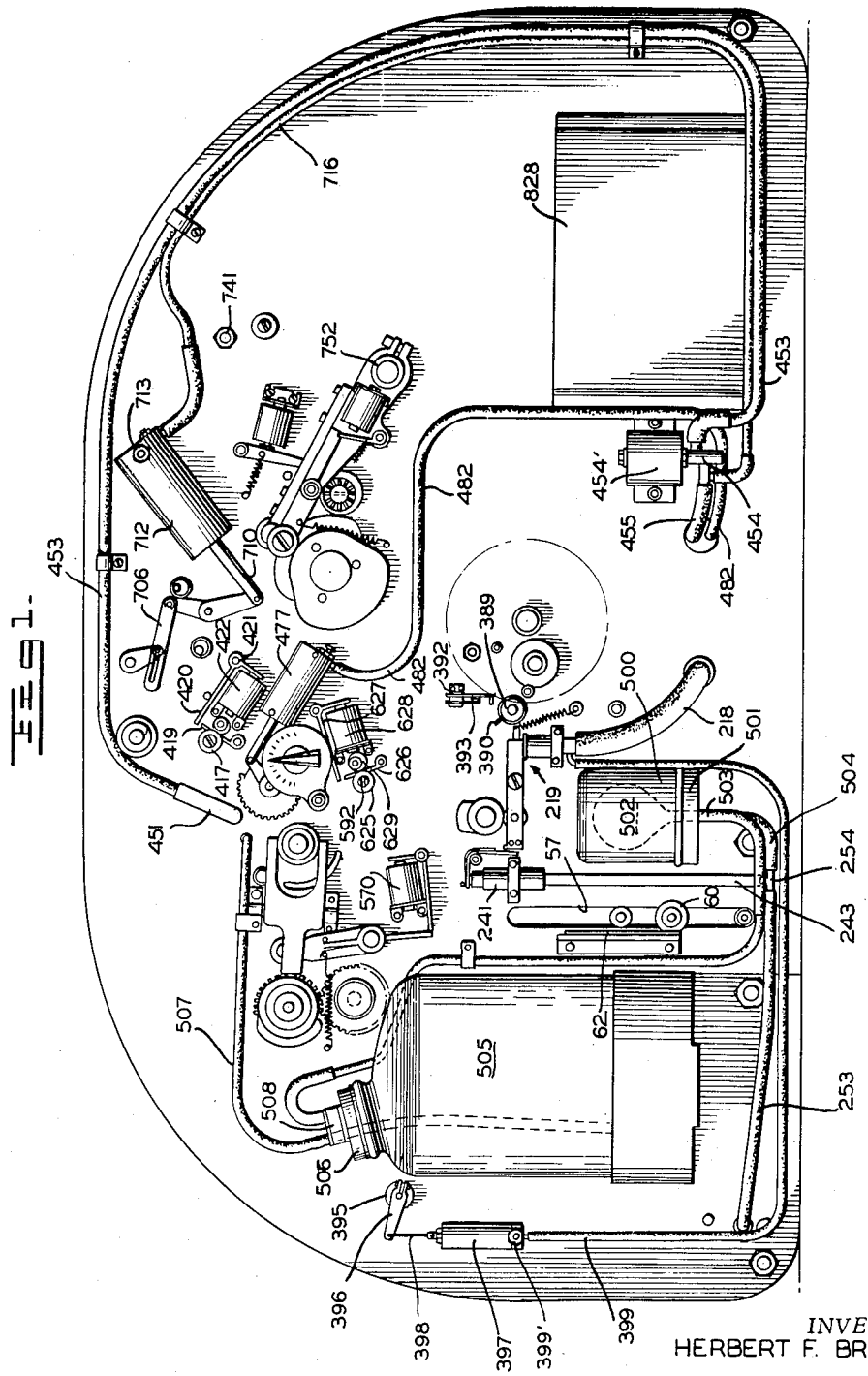

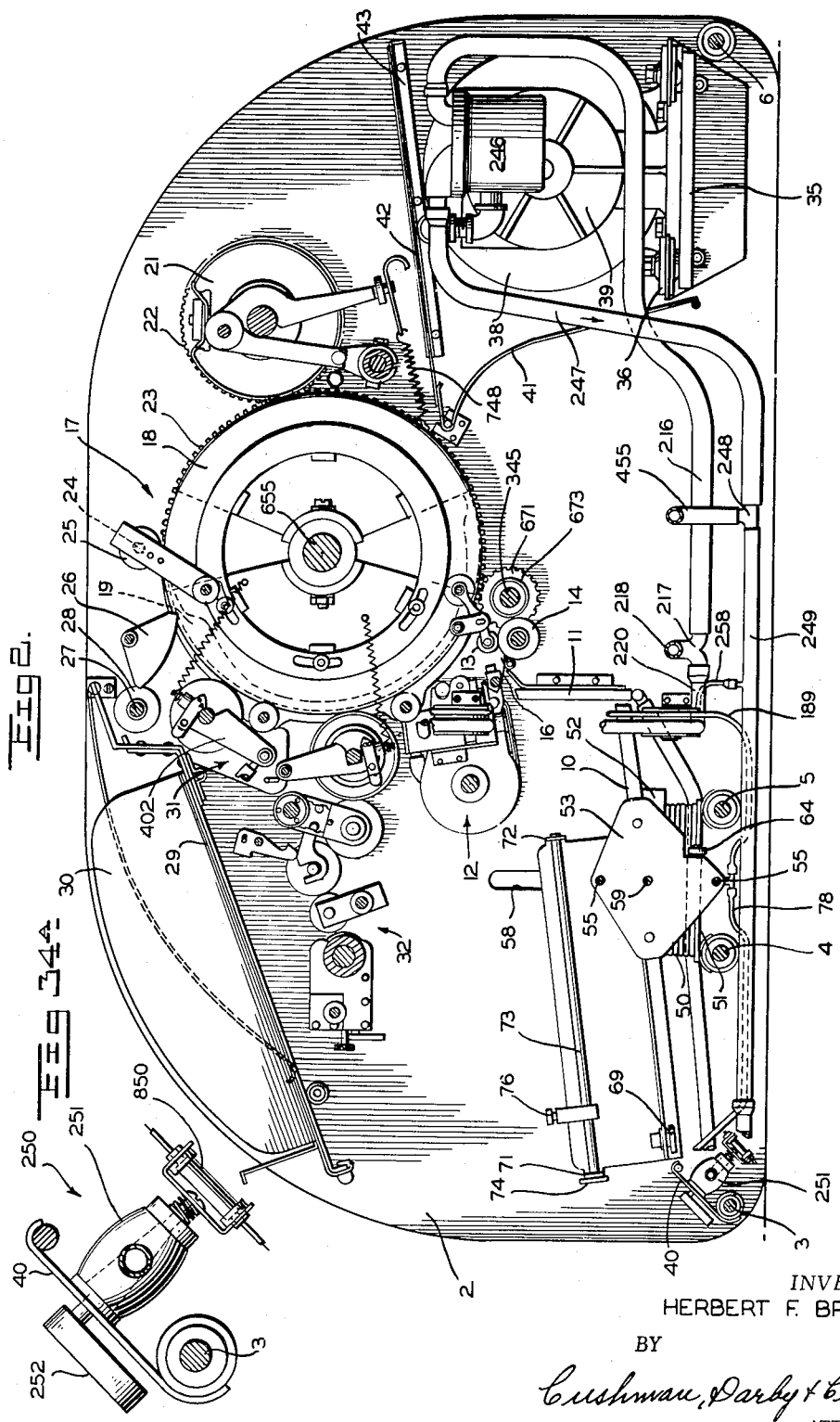

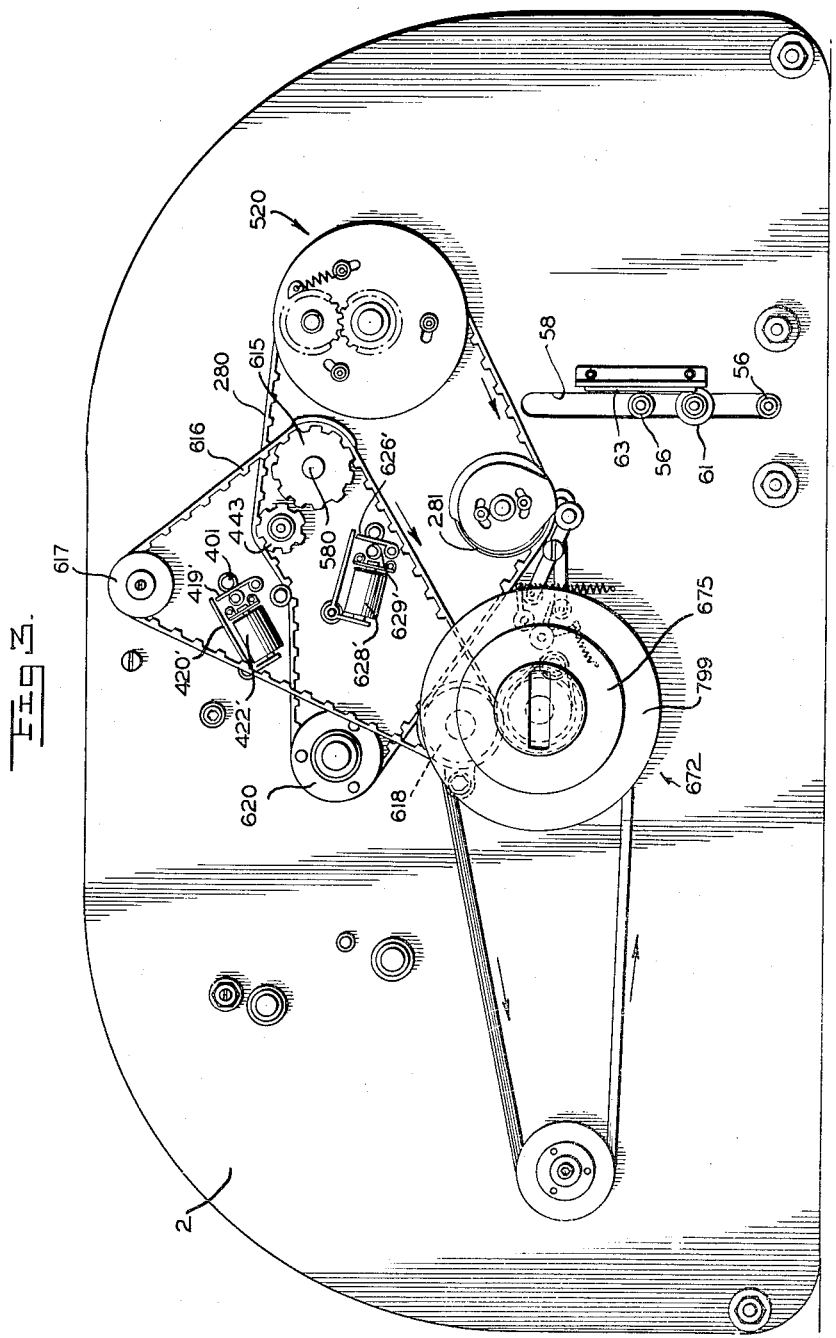

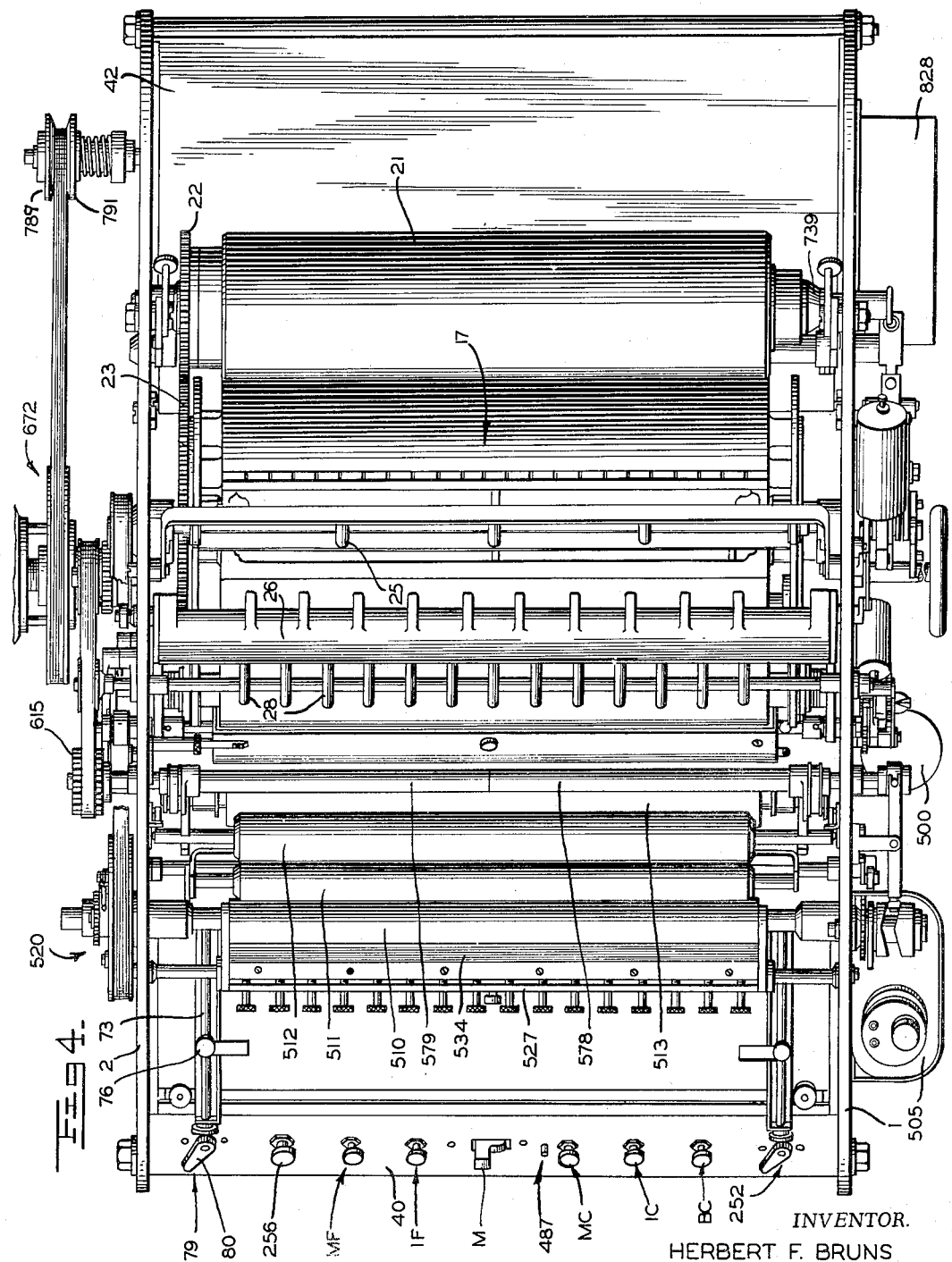

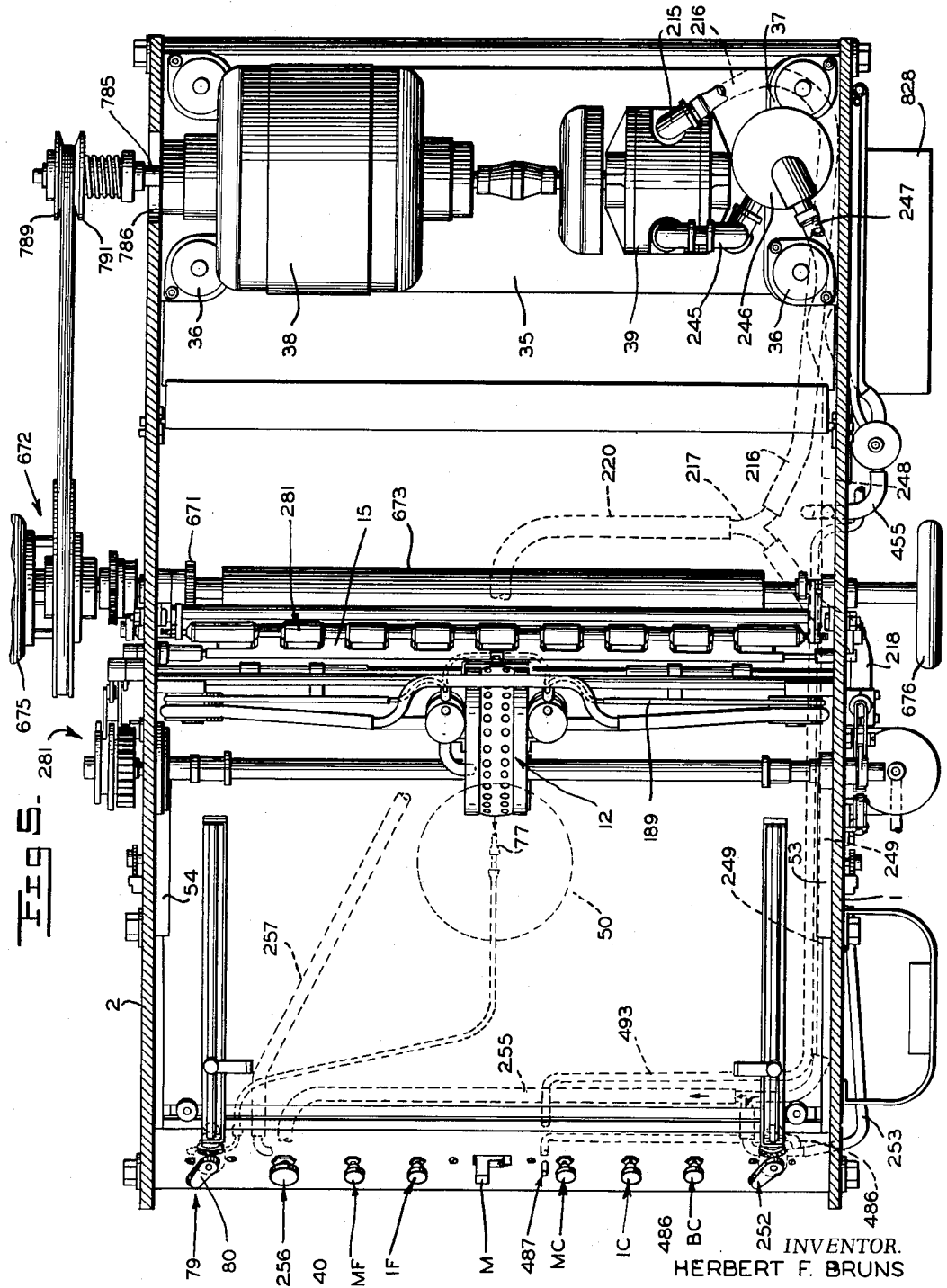

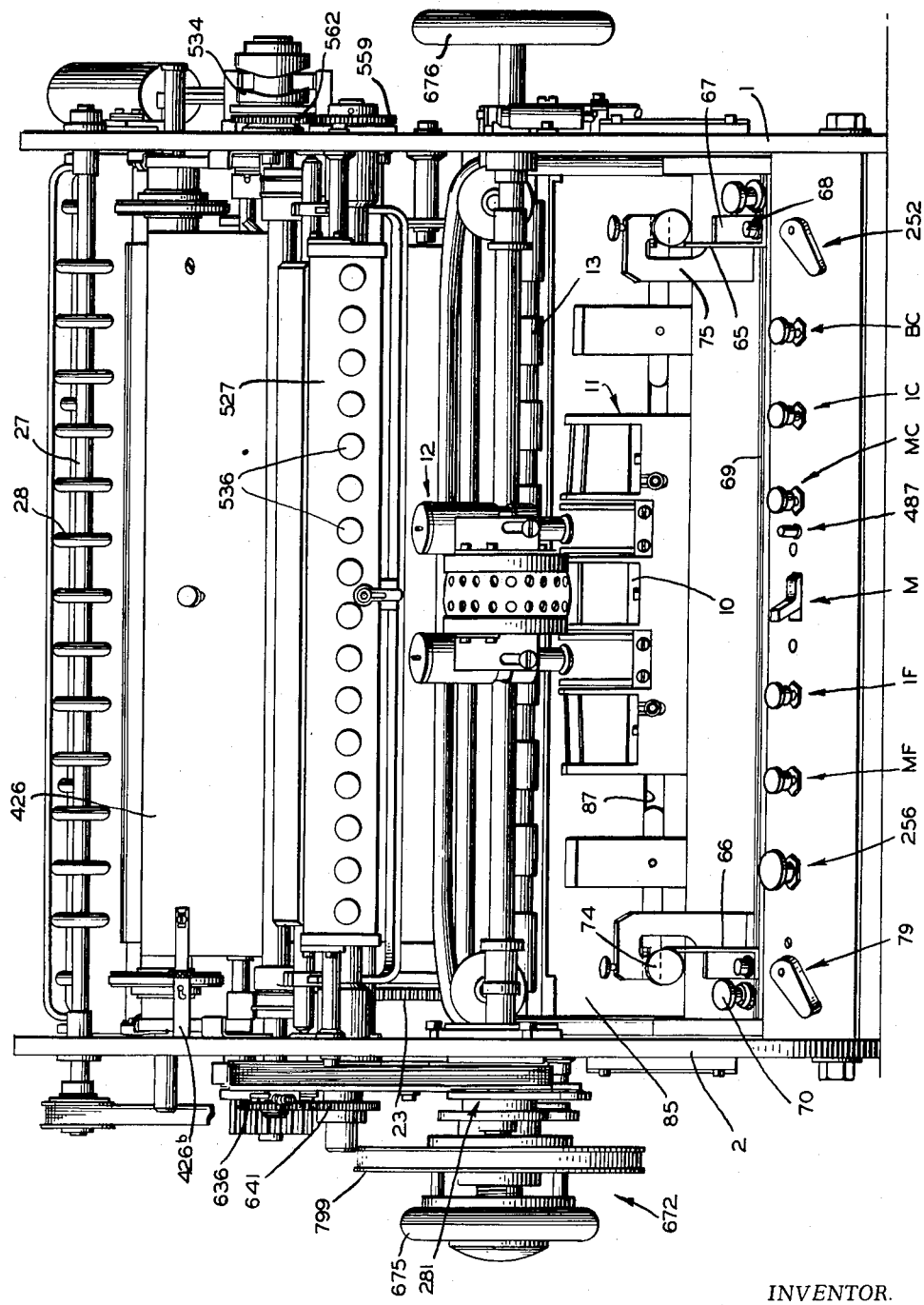

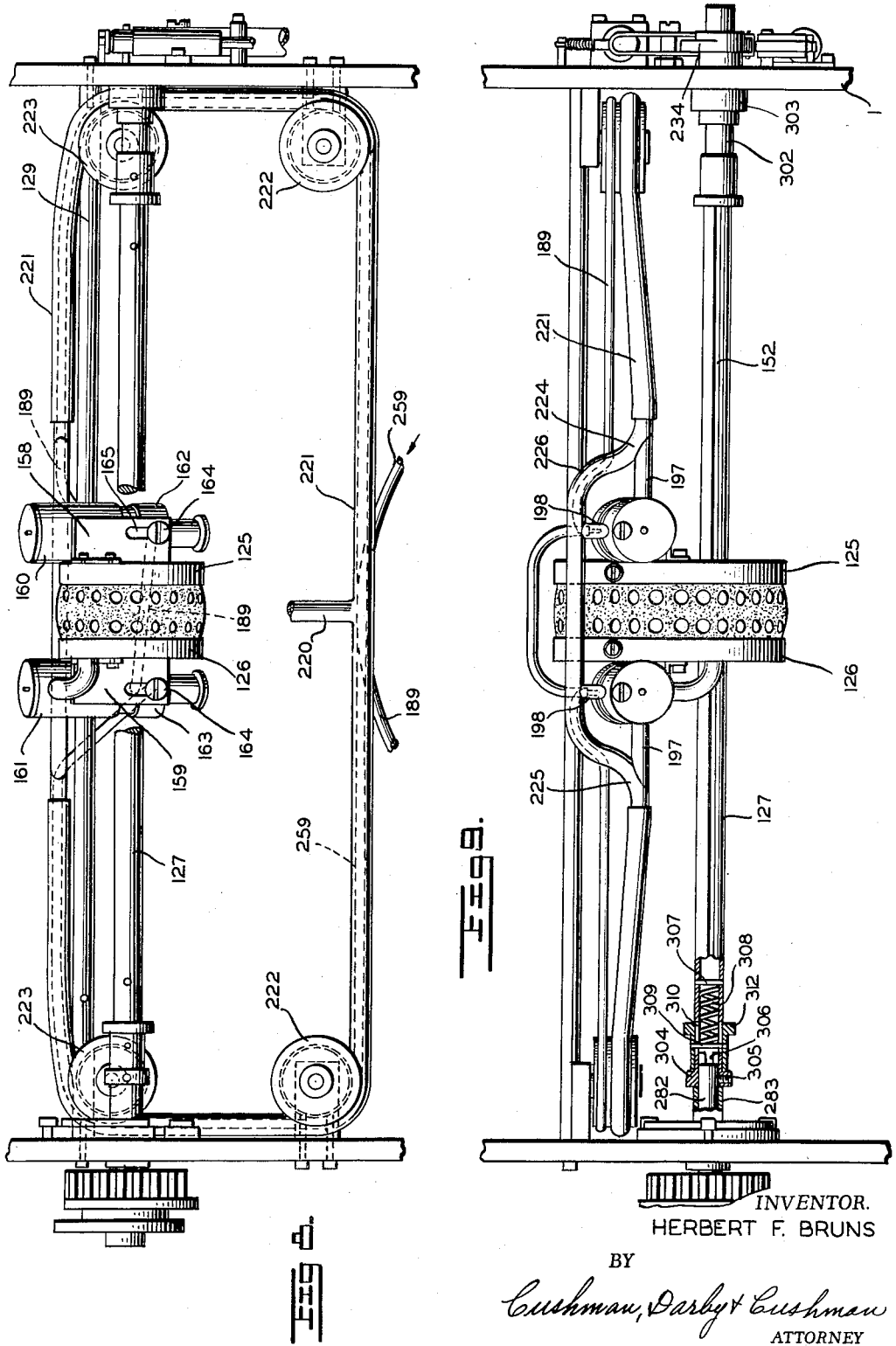

July 10, 1956
H. F. BRUNS
2,753,795
ROTARY OFFSET DUPLICATING MACHINE
Filed April 5, 1950
39 Sheets-Sheet 9
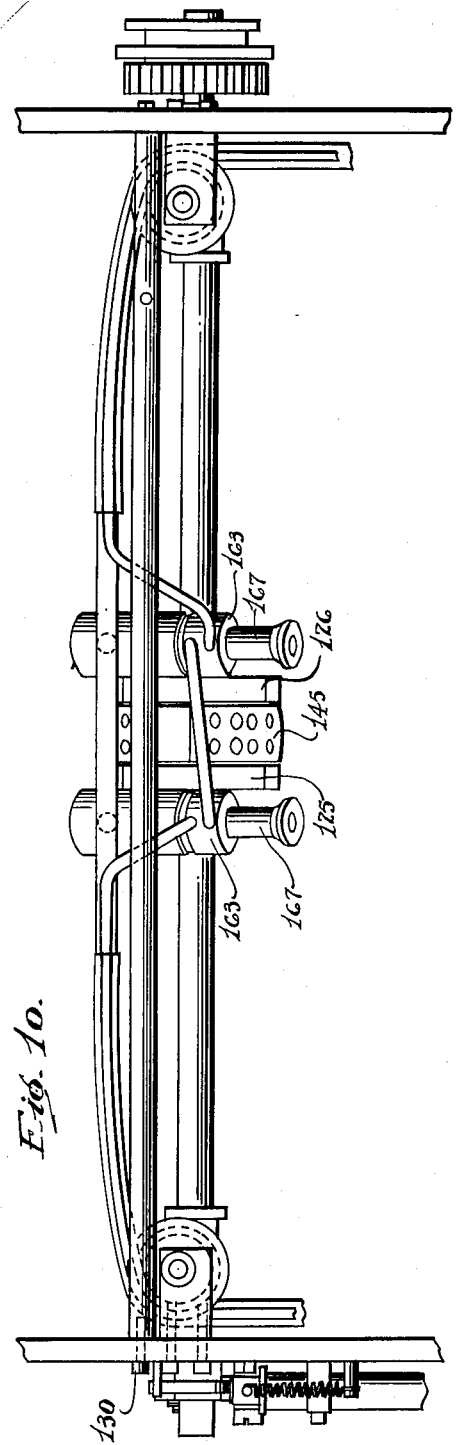
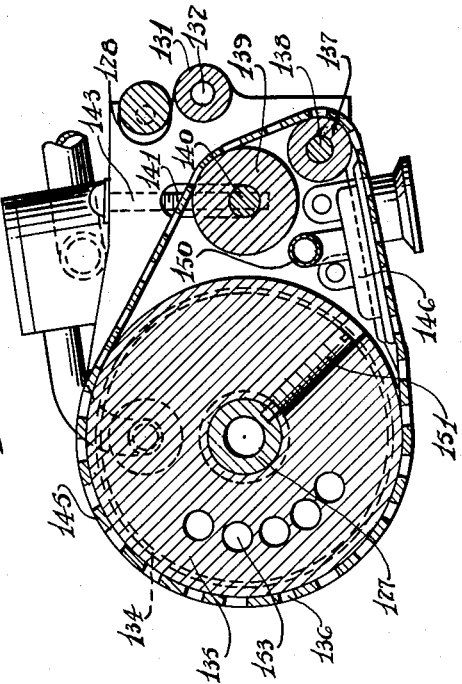
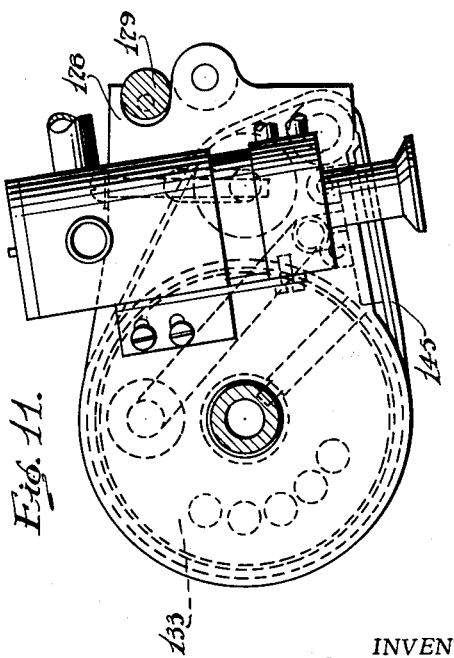
INVENTOR.
Herbert F. Bruns
BY
Cushman, Darby & Cushman
ATTORNEYS July 10, 1956     H. F. BRUNS     2,753,795
ROTARY OFFSET DUPLICATING MACHINE
Filed April 5, 1950     39 Sheets-Sheet 10
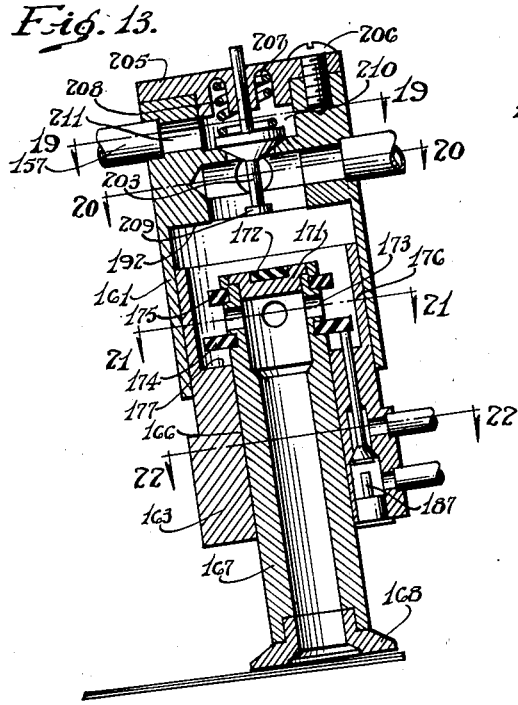
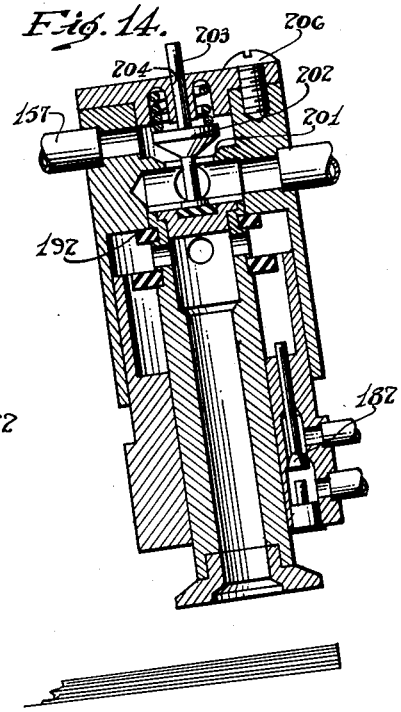
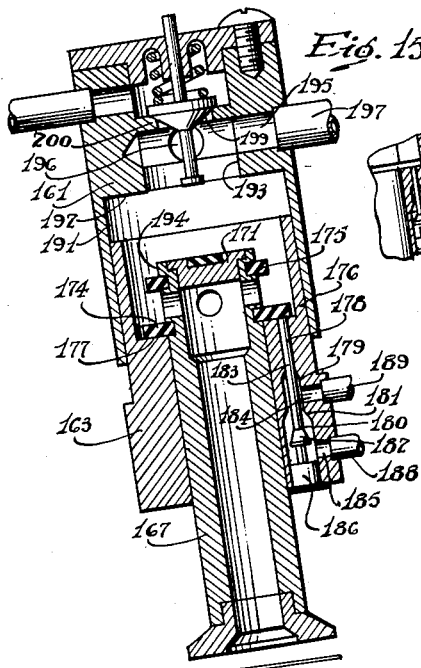
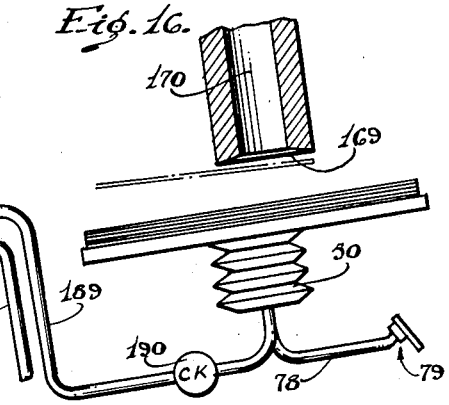
INVENTOR
Herbert F. Bruns
BY Cushman, Darby & Cushman
ATTORNEYS July 10, 1956  H. F. BRUNS  2,753,795
ROTARY OFFSET DUPLICATING MACHINE
Filed April 5, 1950  39 Sheets-Sheet 11
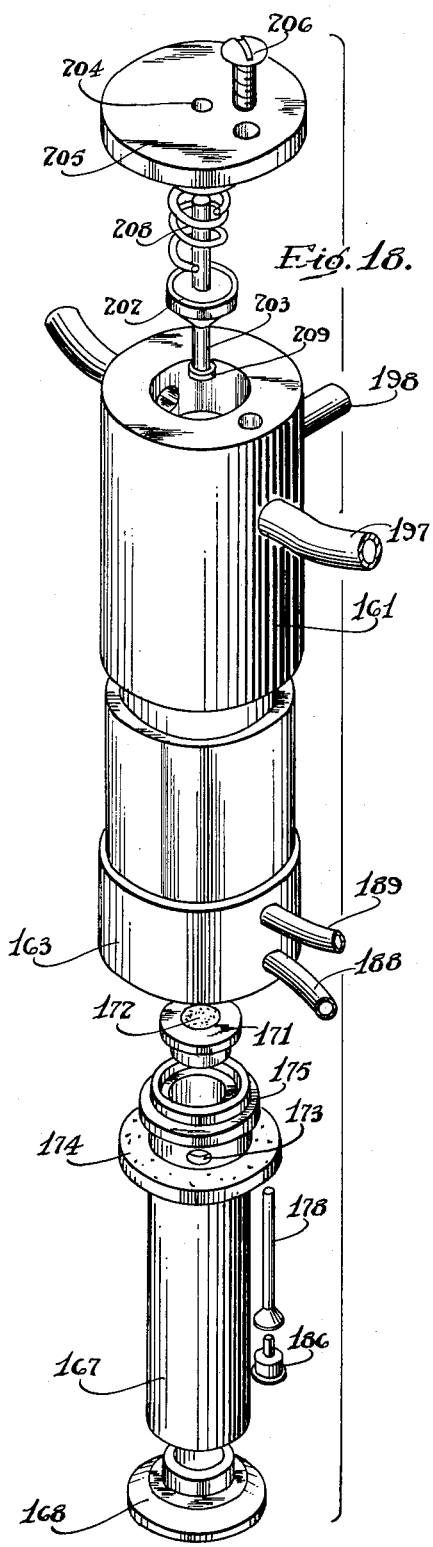
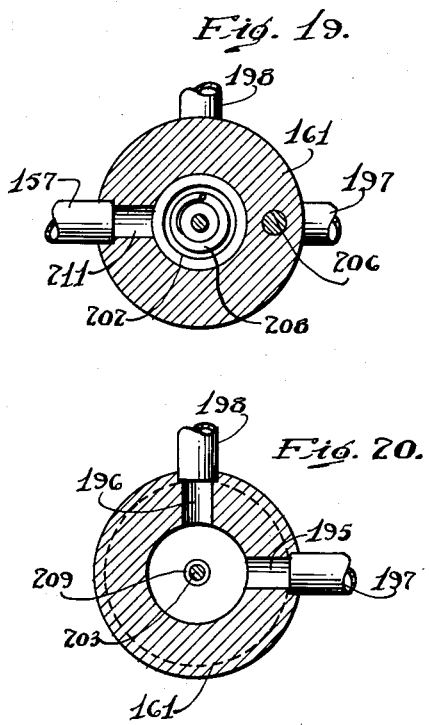
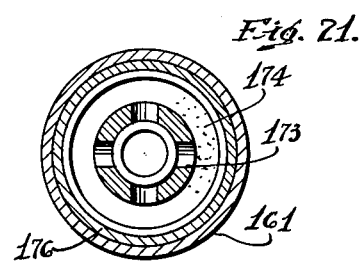
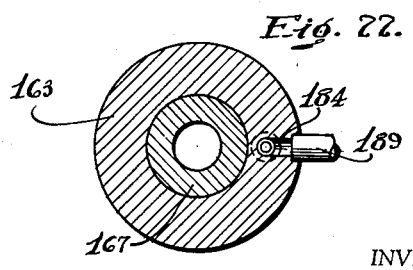
INVENTOR
Herbert F. Bruns
BY Cushman, Darby & Cushman
ATTORNEYS

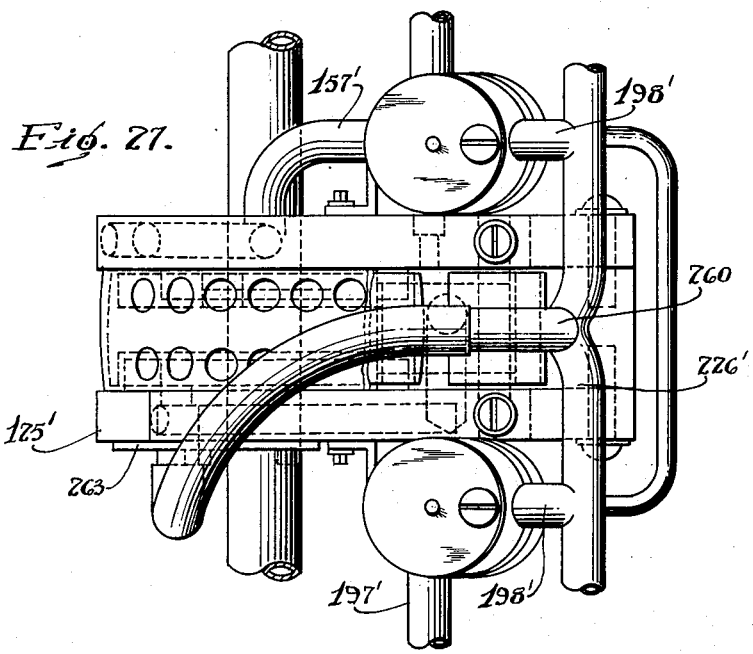
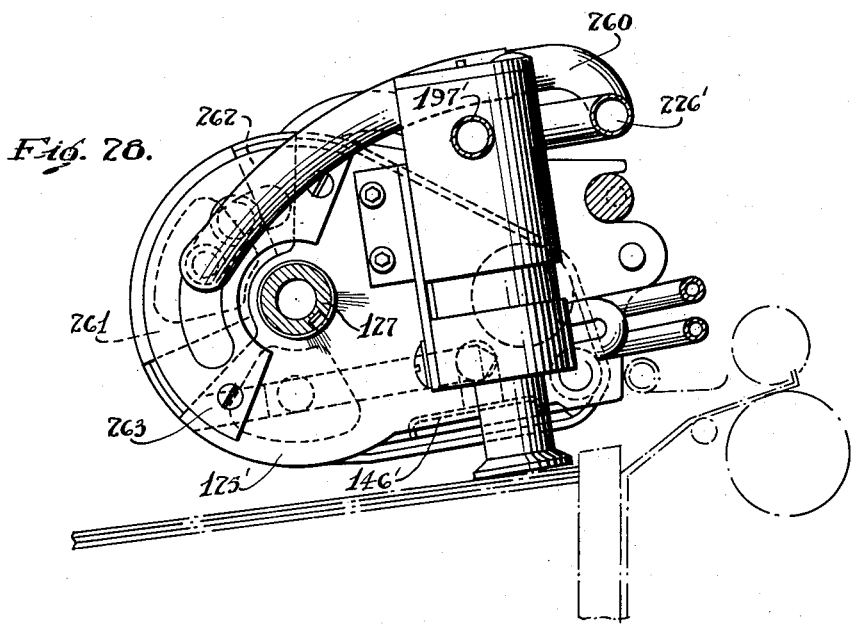

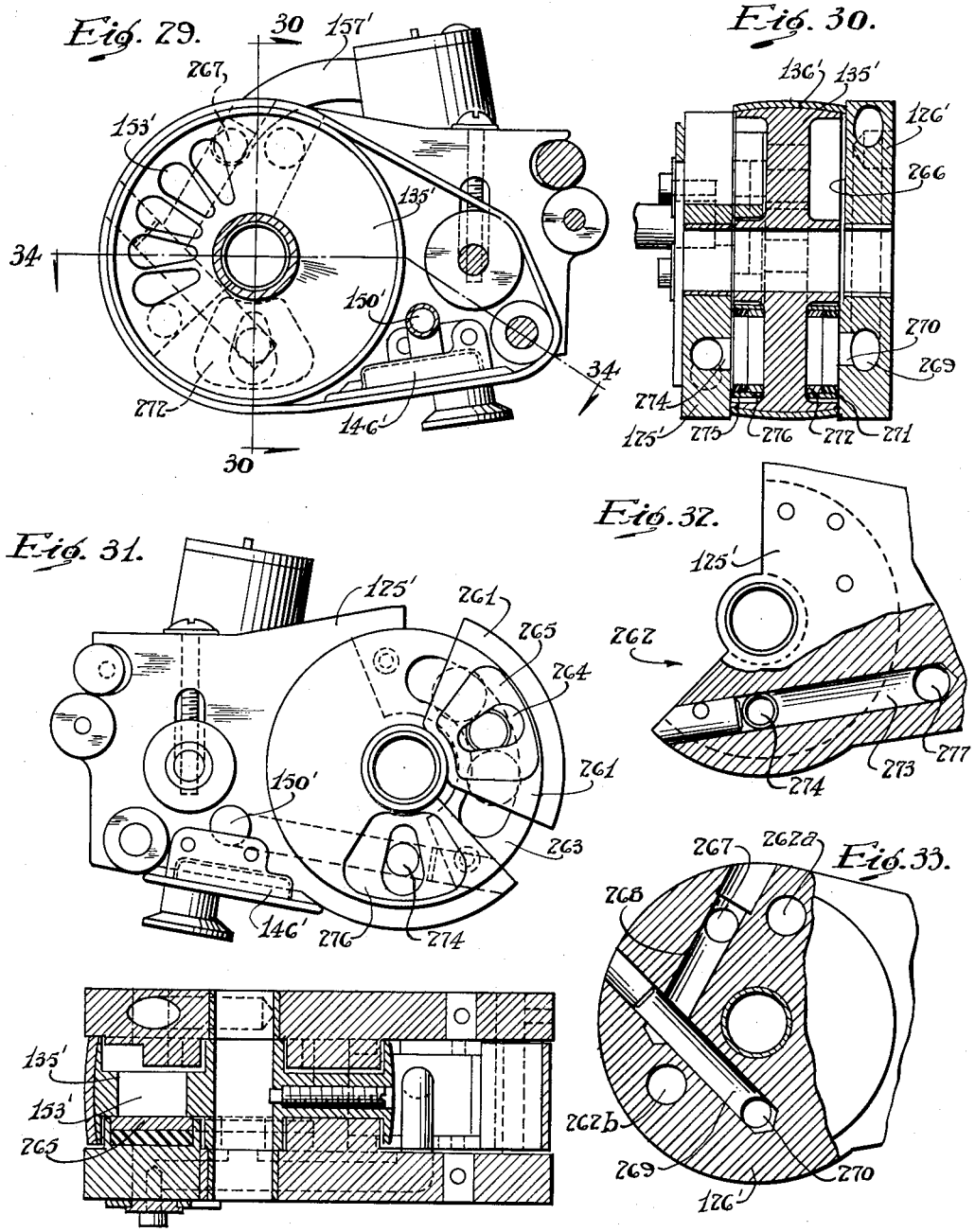

July 10, 1956 H. F. BRUNS 2,753,795
ROTARY OFFSET DUPLICATING MACHINE
Filed April 5, 1950 39 Sheets-Sheet 14

INVENTOR
Herbert F. Bruns
BY Cushman, Darby & Cushman
ATTORNEYS

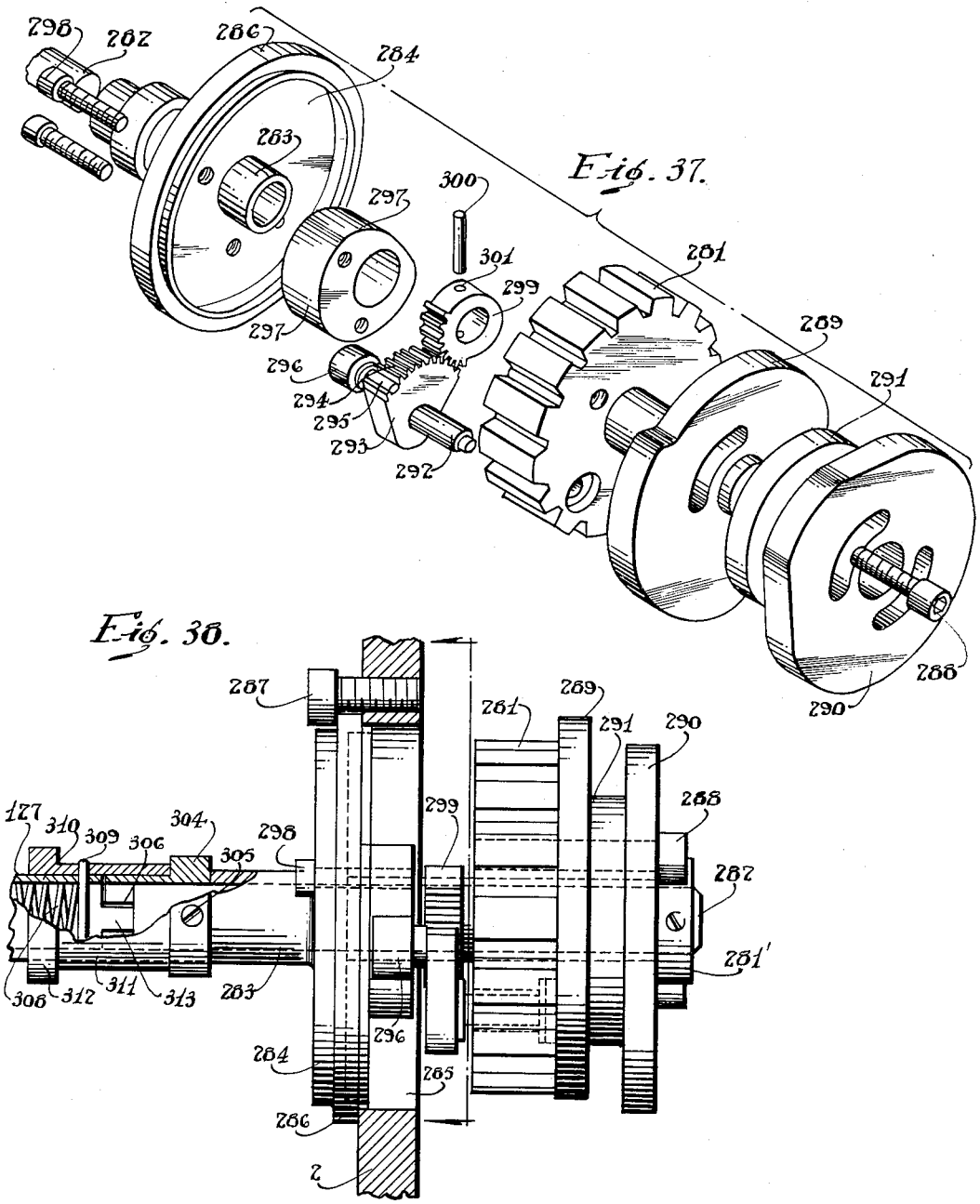

July 10, 1956 H. F. BRUNS 2,753,795
ROTARY OFFSET DUPLICATING MACHINE
Filed April 5, 1950 39 Sheets-Sheet 16

INVENTOR
Herbert F. Bruns

BY Cushman, Darby & Cushman
ATTORNEYS

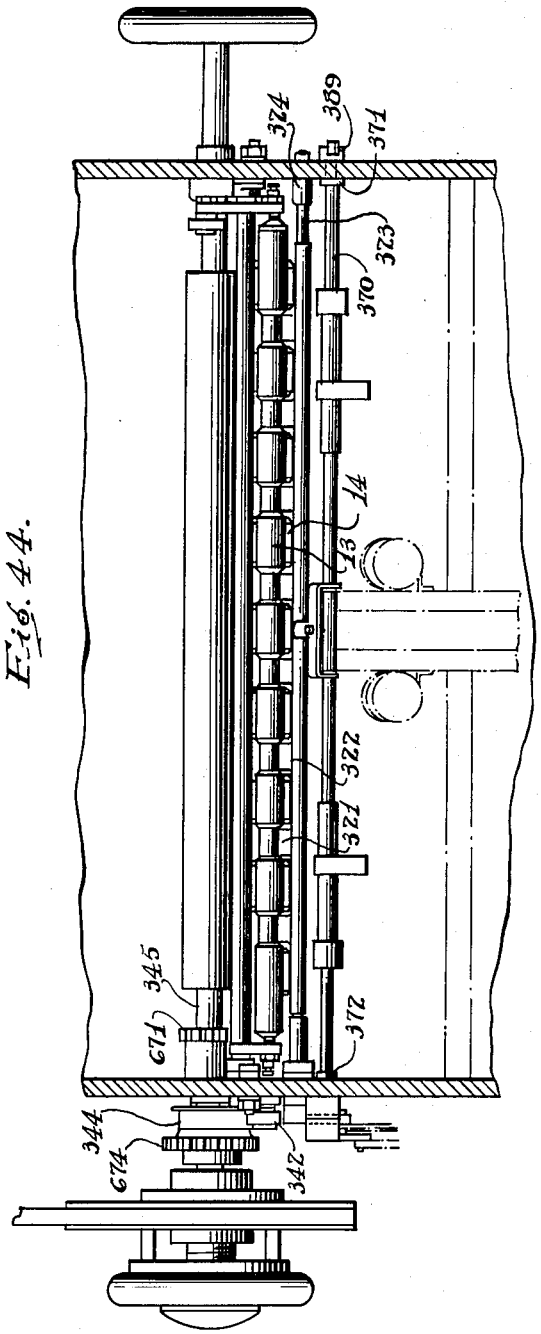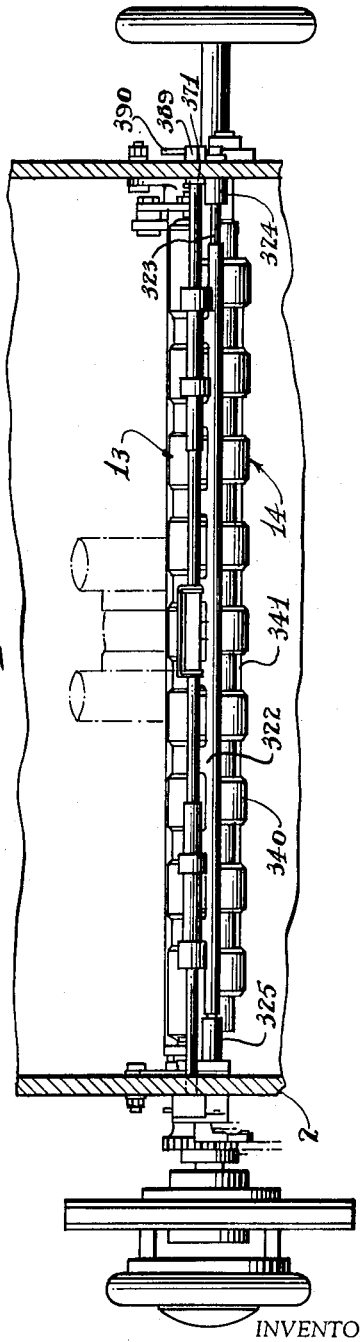

July 10, 1956  H. F. BRUNS  2,753,795
ROTARY OFFSET DUPLICATING MACHINE
Filed April 5, 1950  39 Sheets-Sheet 18

INVENTOR
Herbert F. Bruns
BY Cushman, Darby & Cushman
ATTORNEYS

July 10, 1956     H. F. BRUNS     2,753,795
ROTARY OFFSET DUPLICATING MACHINE
Filed April 5, 1950     39 Sheets-Sheet 19

INVENTOR
Herbert F. Bruns
BY Cushman, Darby & Cushman
ATTORNEYS

July 10, 1956  H. F. BRUNS  2,753,795
ROTARY OFFSET DUPLICATING MACHINE
Filed April 5, 1950  39 Sheets-Sheet 20
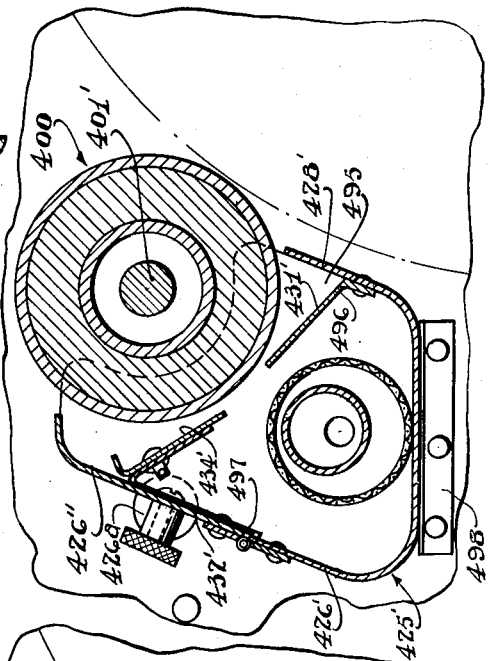
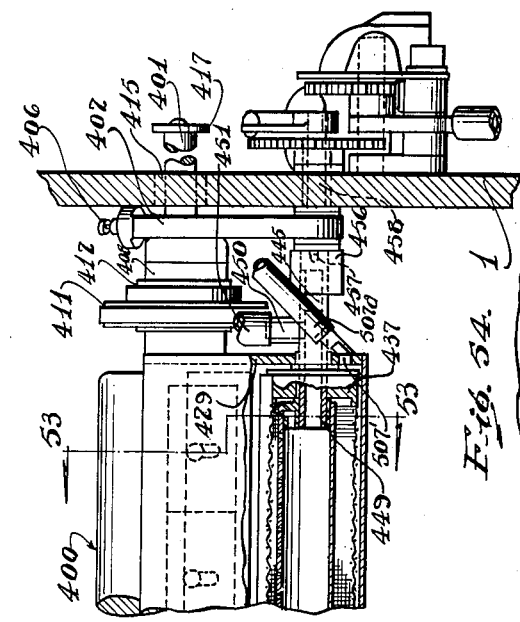
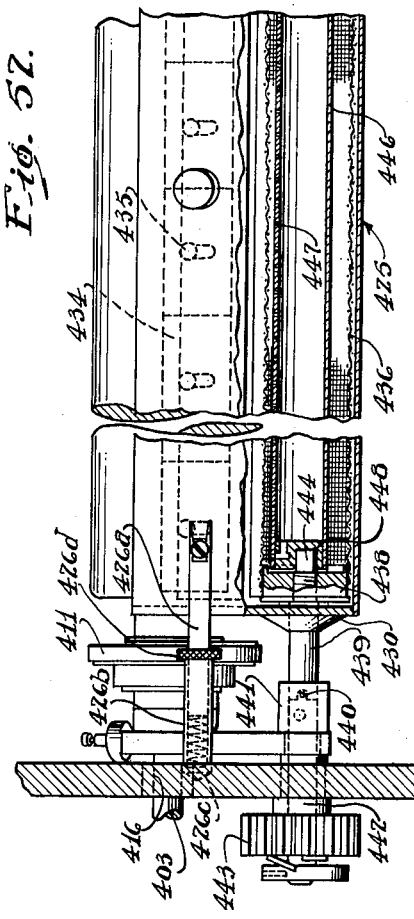
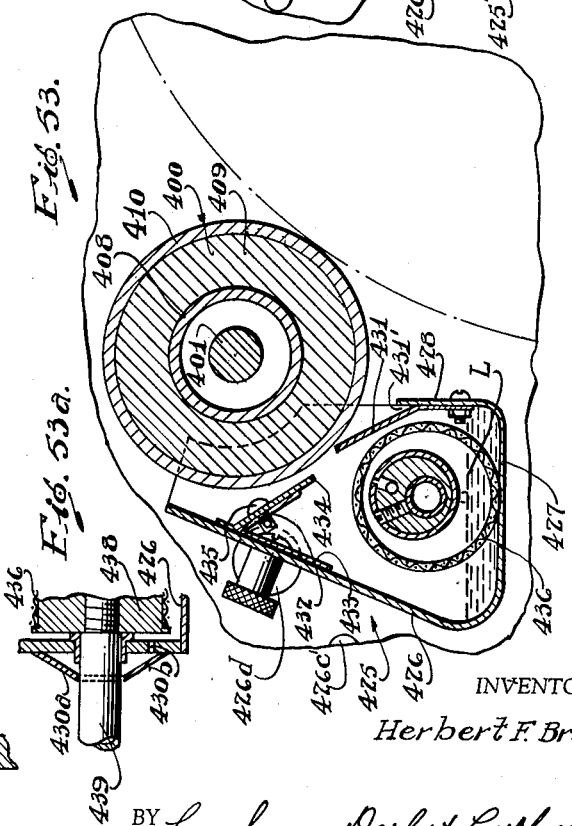
INVENTOR
Herbert F. Bruns
BY Cushman, Darby & Cushman
ATTORNEYS July 10, 1956 H. F. BRUNS 2,753,795
ROTARY OFFSET DUPLICATING MACHINE
Filed April 5, 1950 39 Sheets-Sheet 21
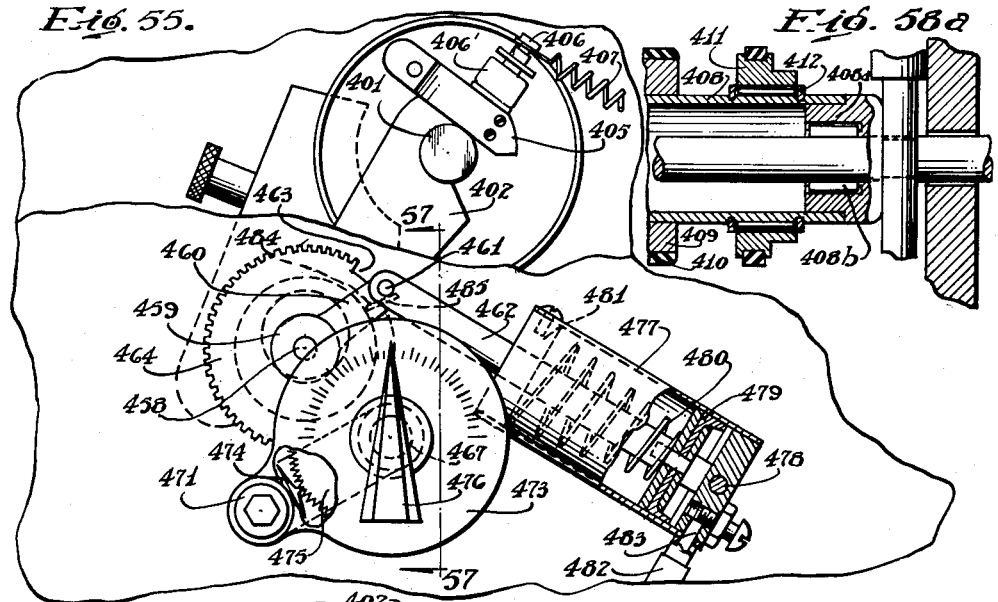
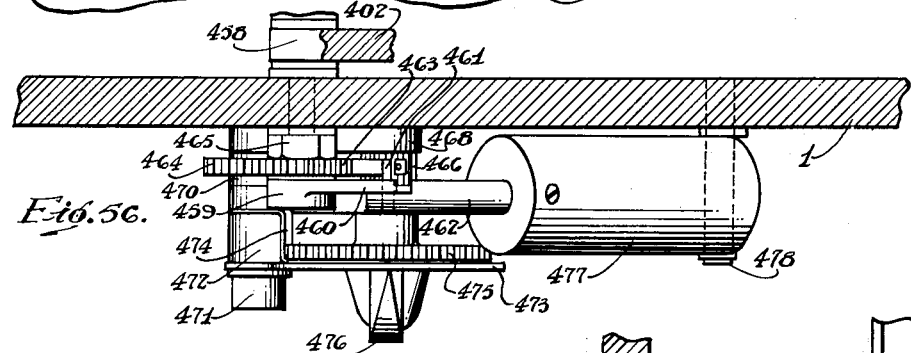
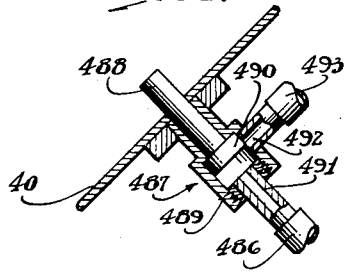
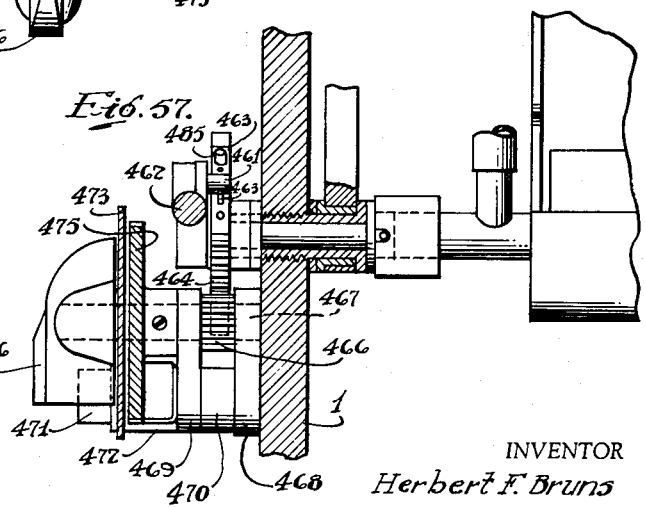
INVENTOR
Herbert F. Bruns
BY Cushman, Darby & Cushman
ATTORNEYS

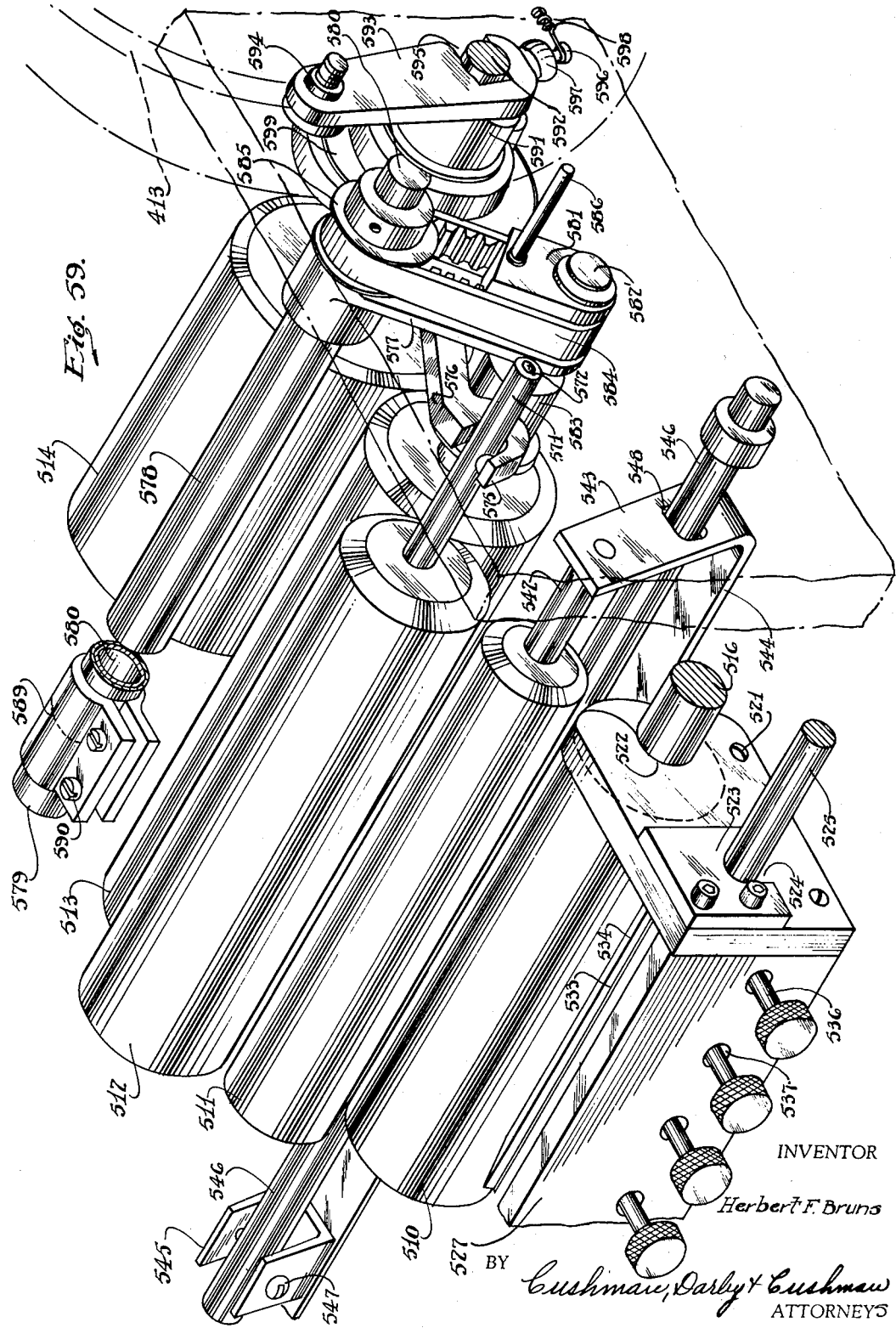

July 10, 1956
H. F. BRUNS
ROTARY OFFSET DUPLICATING MACHINE
2,753,795
Filed April 5, 1950
39 Sheets-Sheet 23
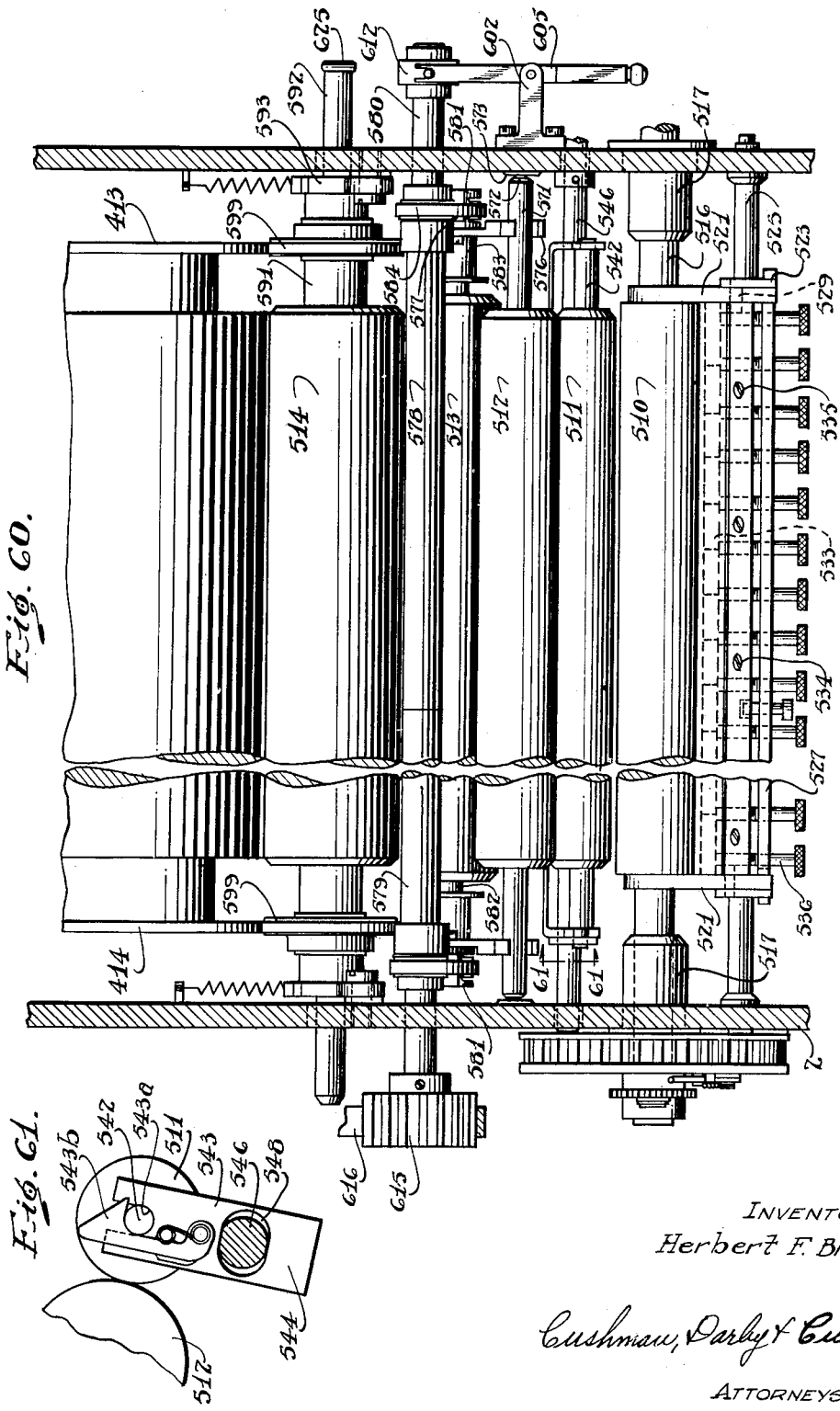
INVENTOR
Herbert F. Bruns
Cushman, Darby & Cushman
ATTORNEYS

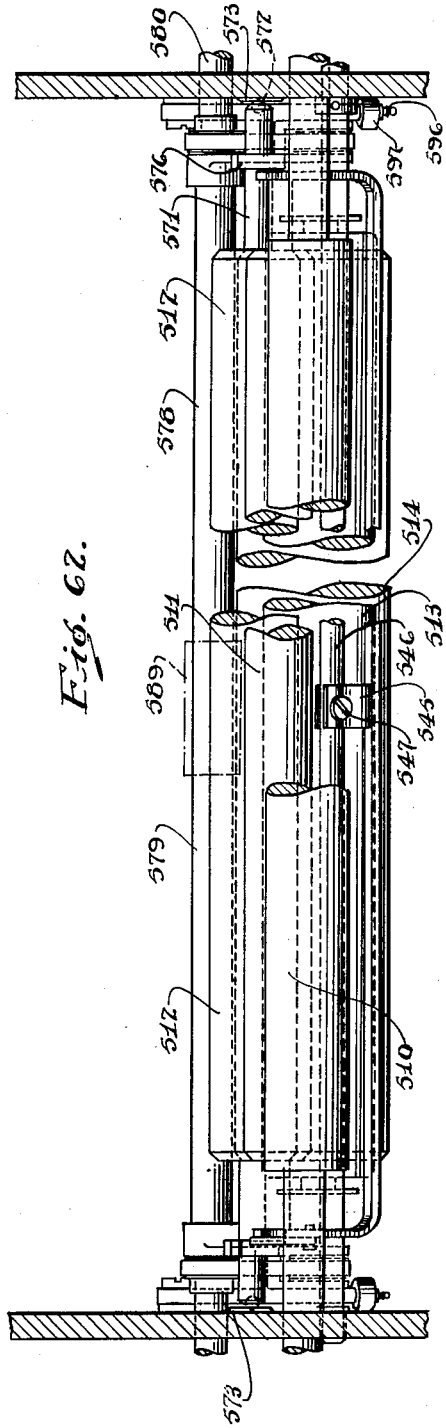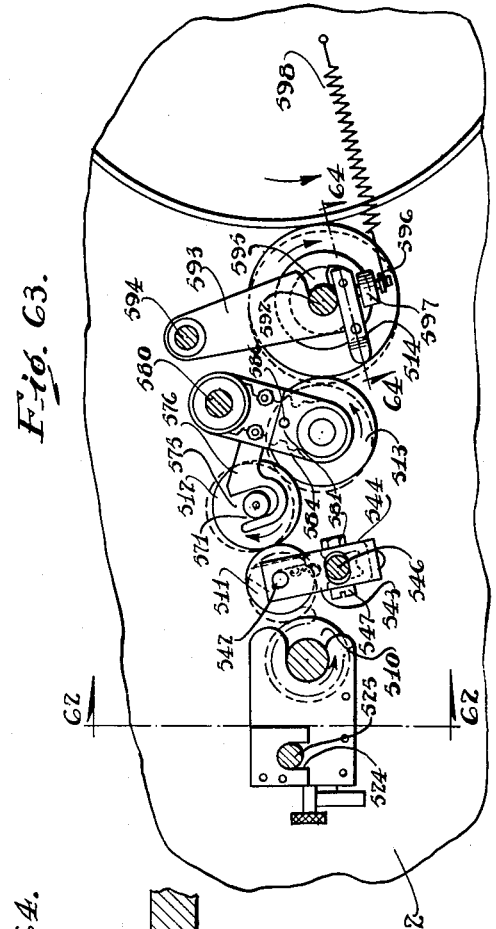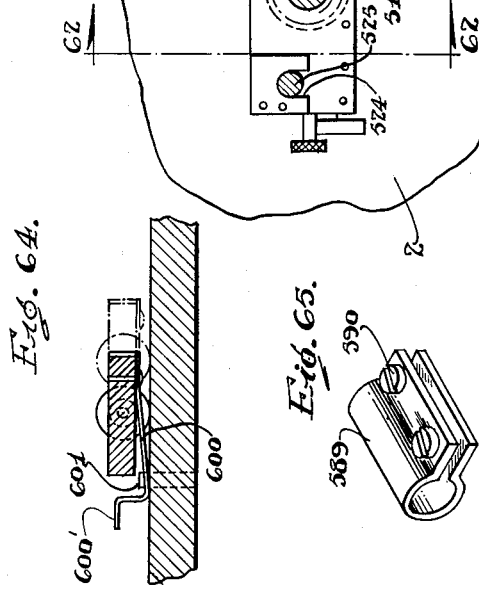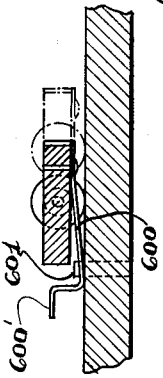

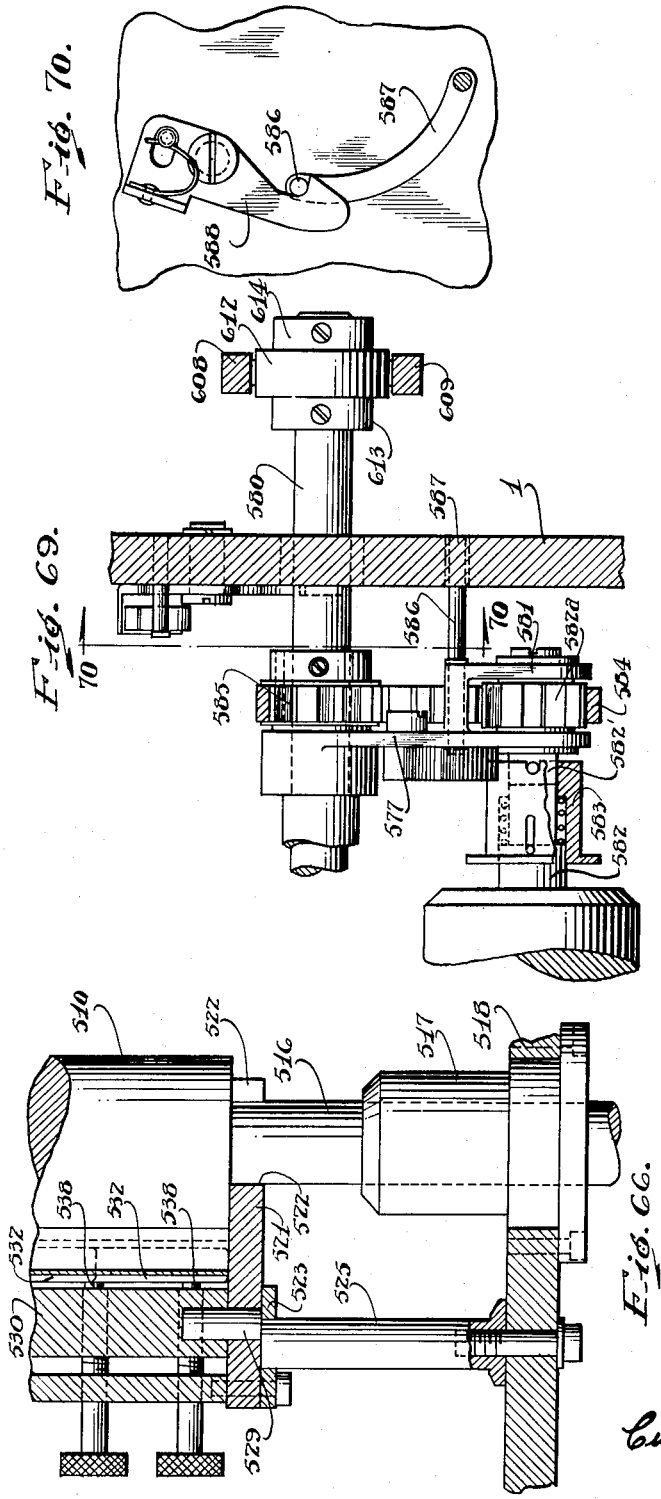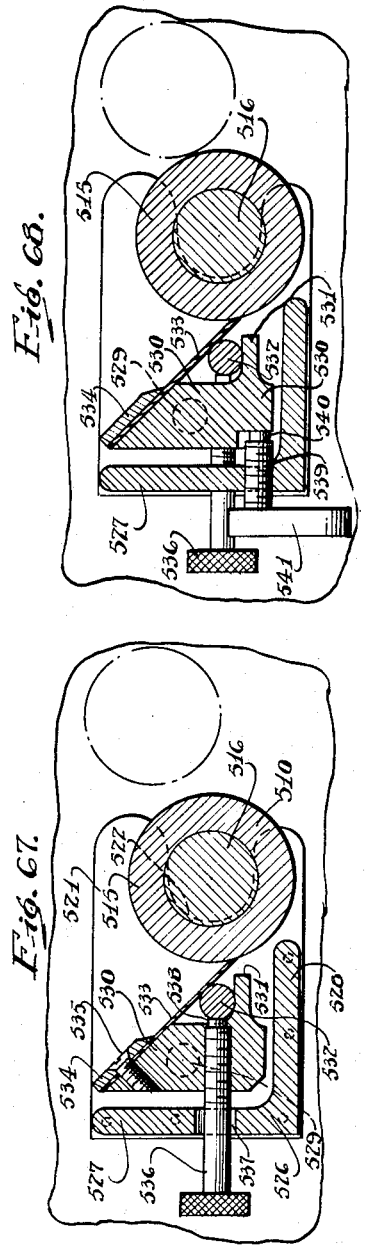

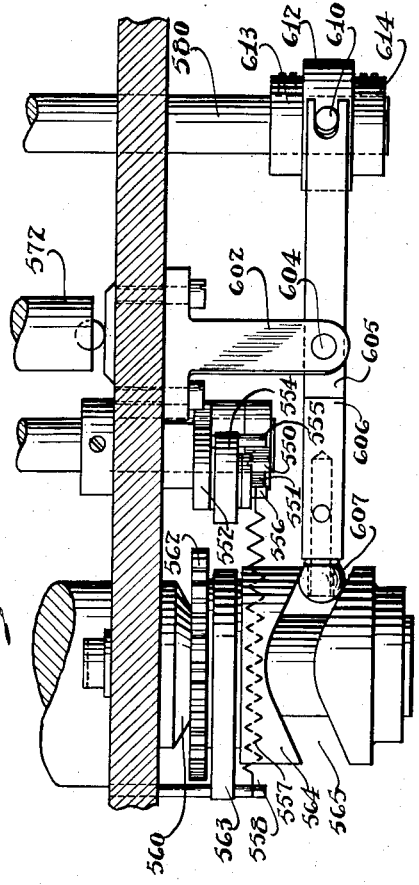

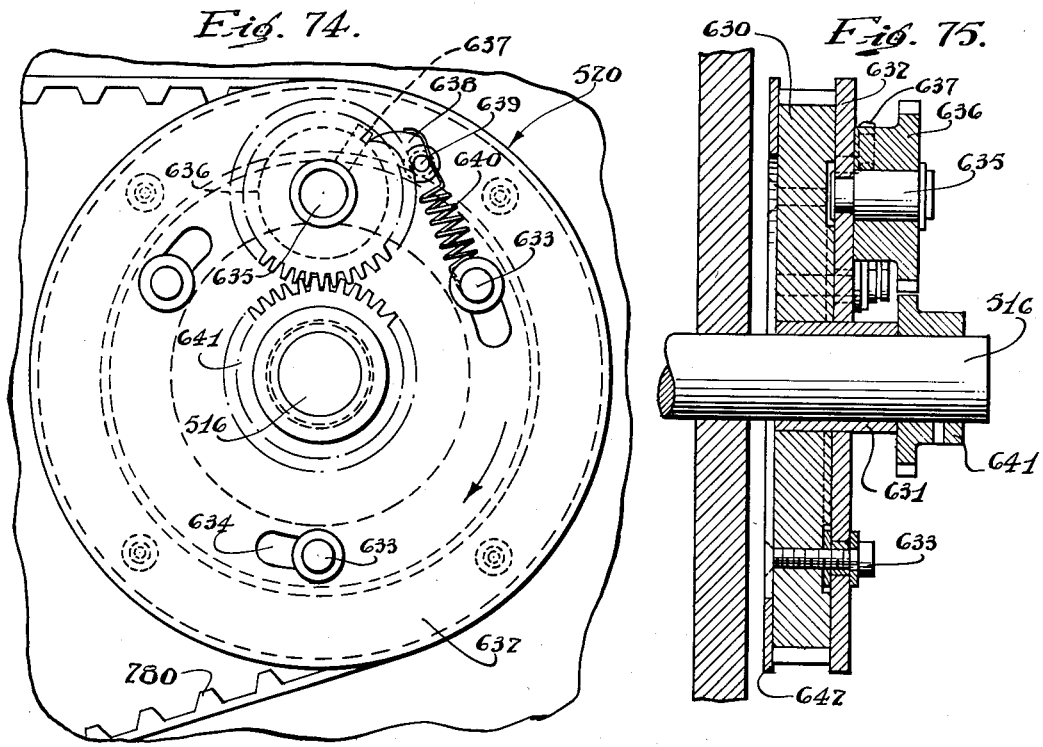
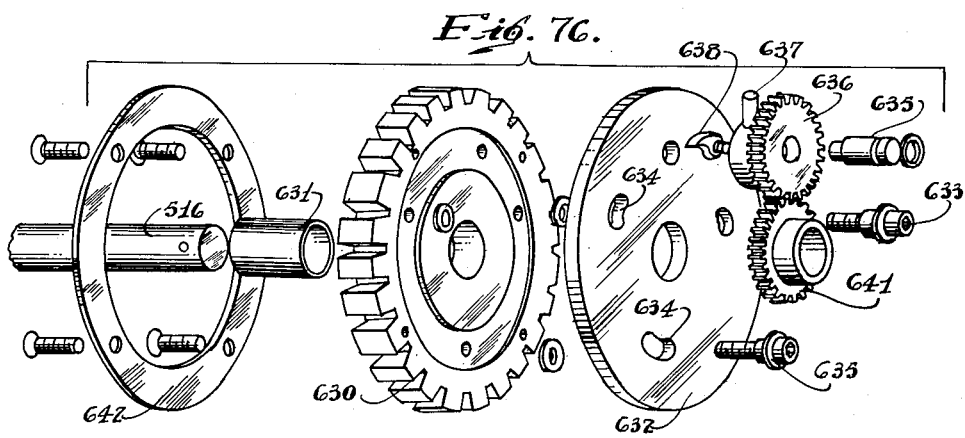
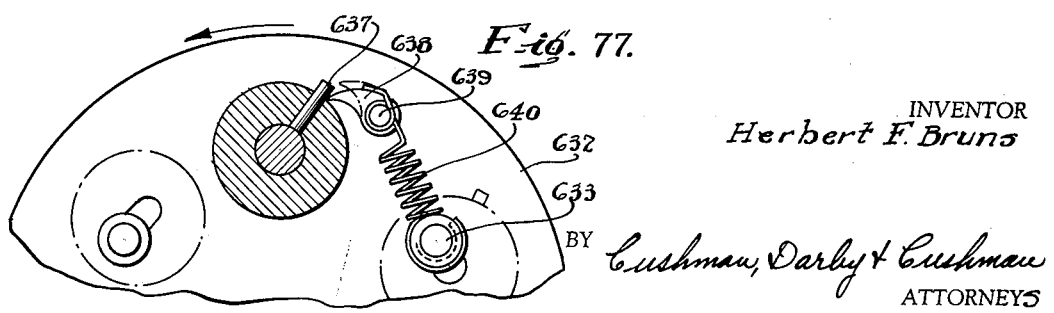

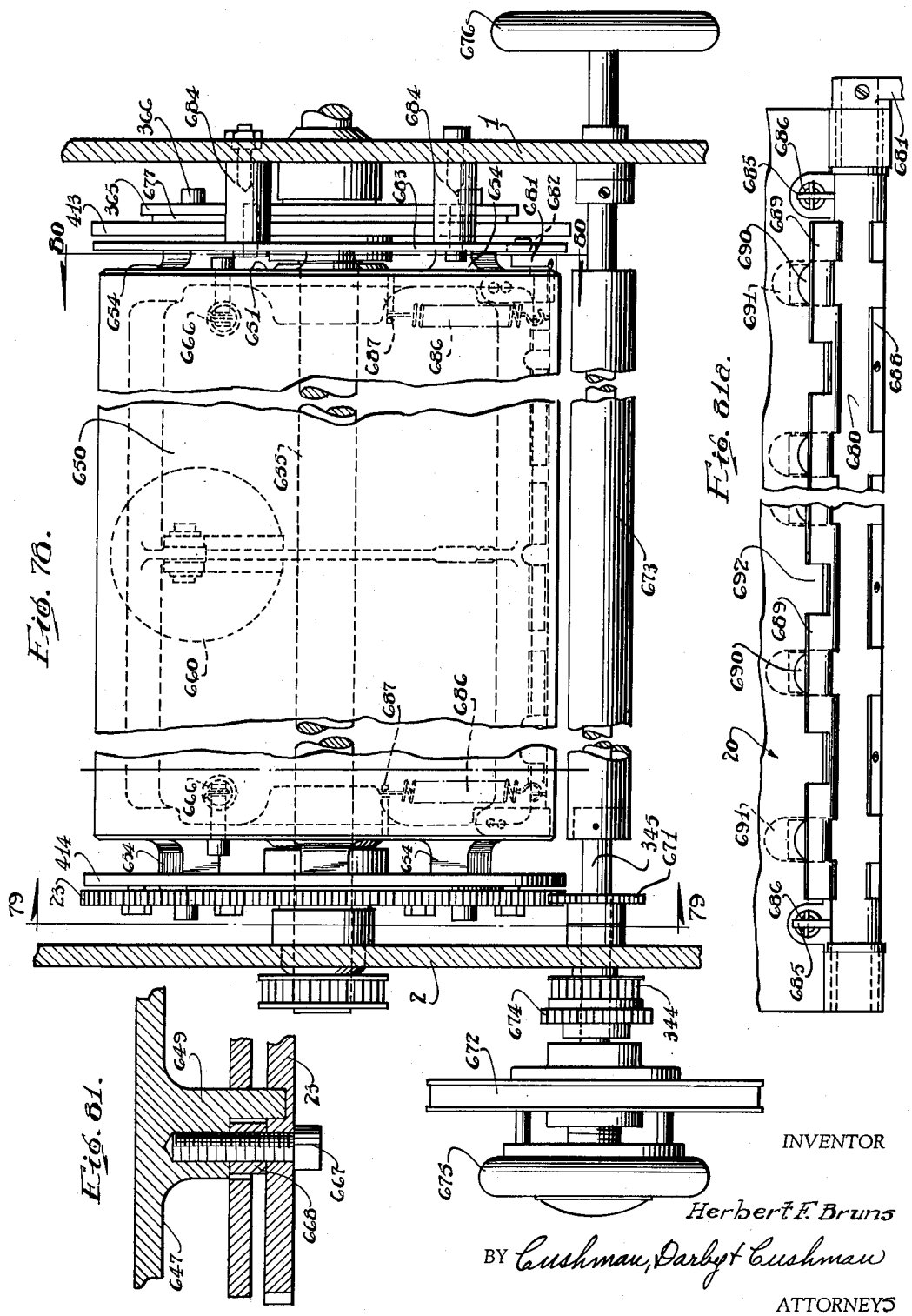

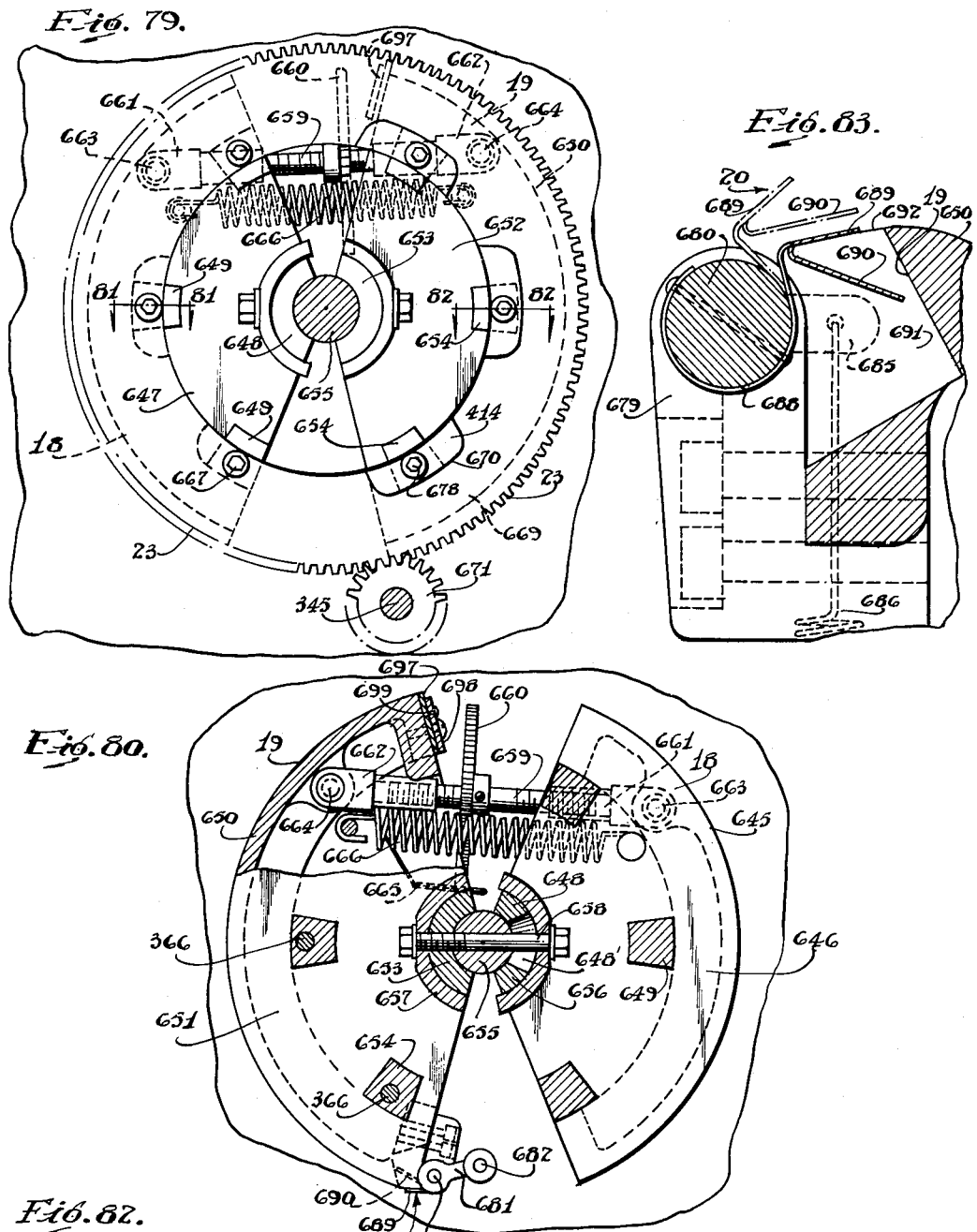

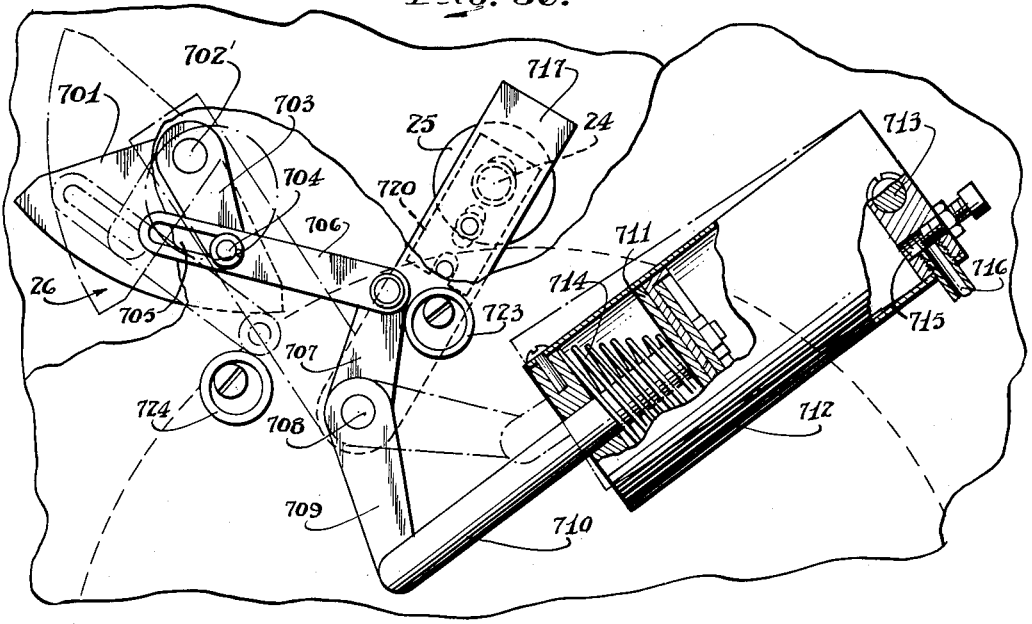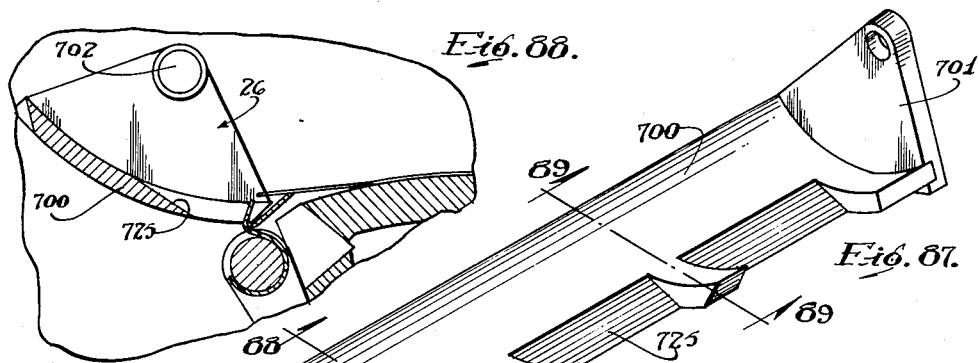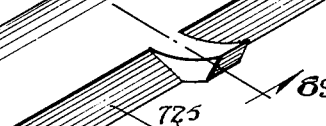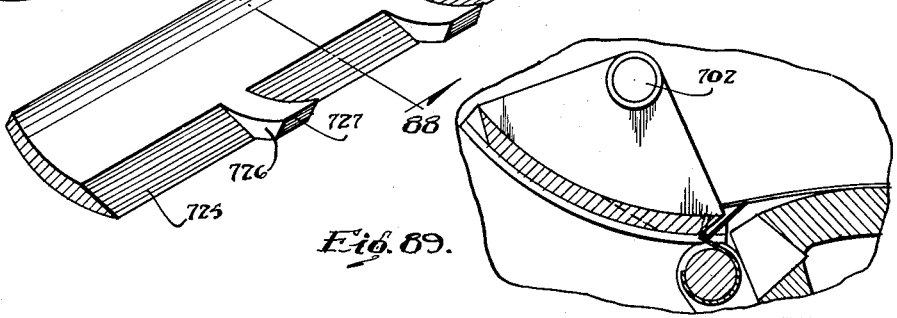

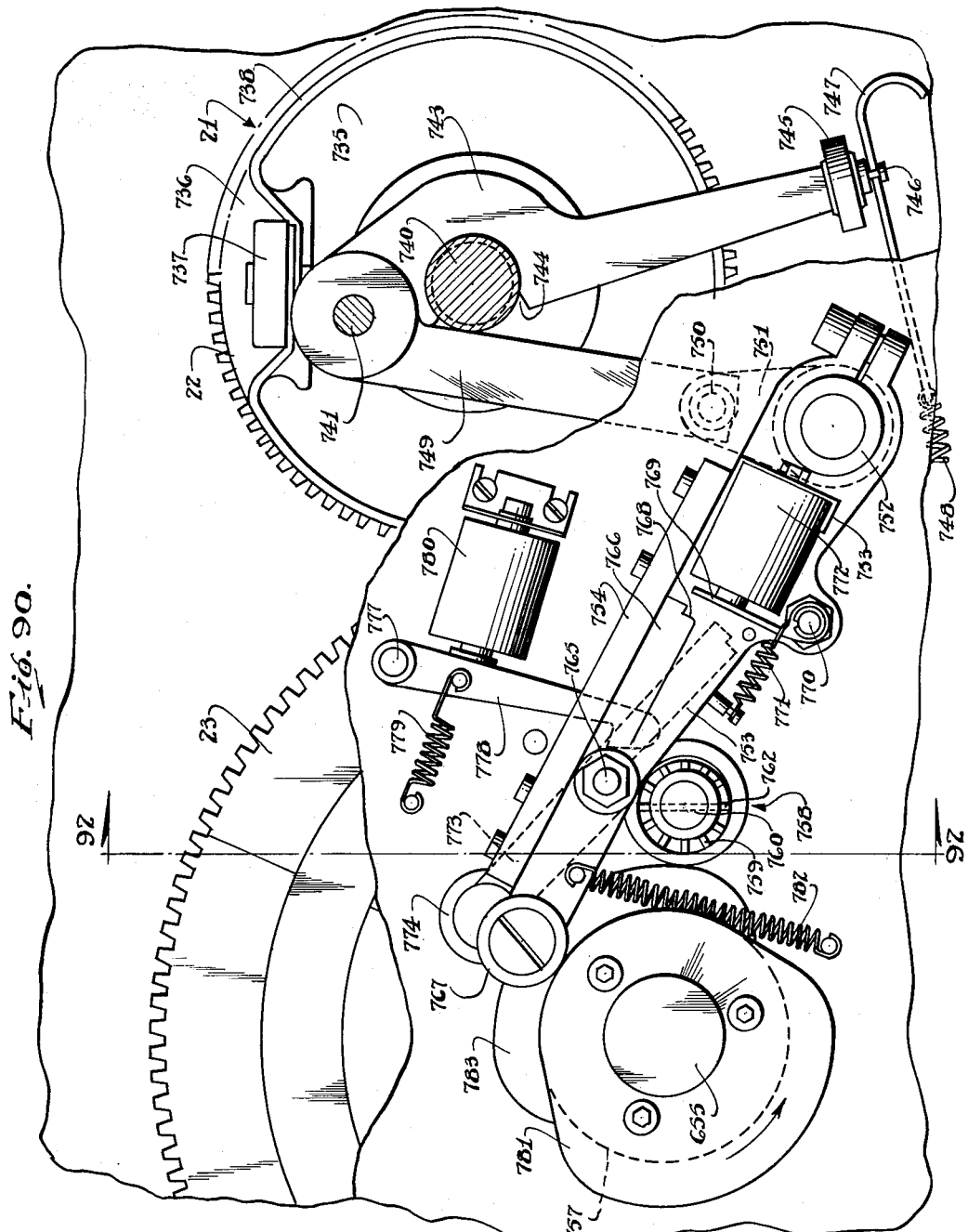

July 10, 1956 H. F. BRUNS 2,753,795
ROTARY OFFSET DUPLICATING MACHINE
Filed April 5, 1950 39 Sheets-Sheet 33
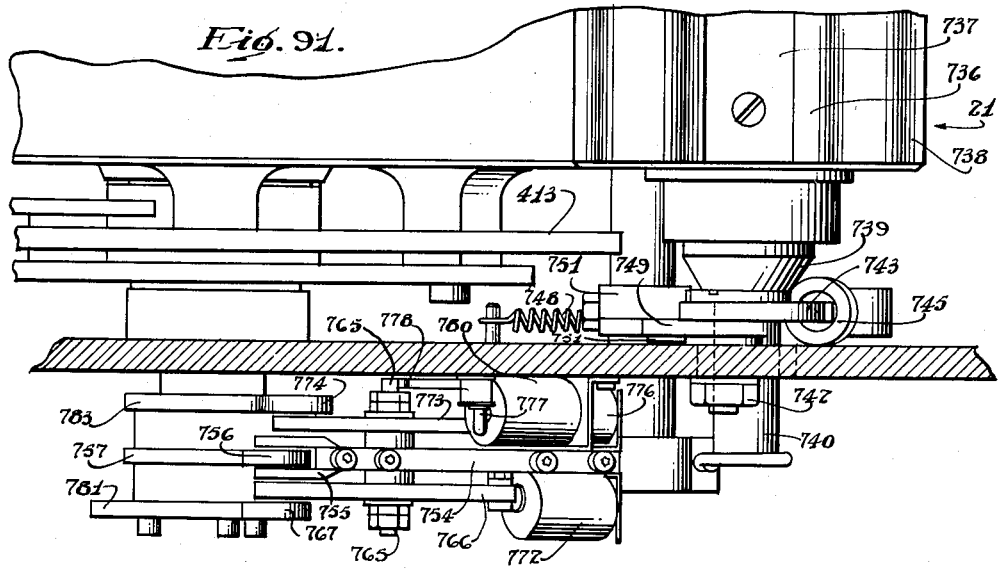
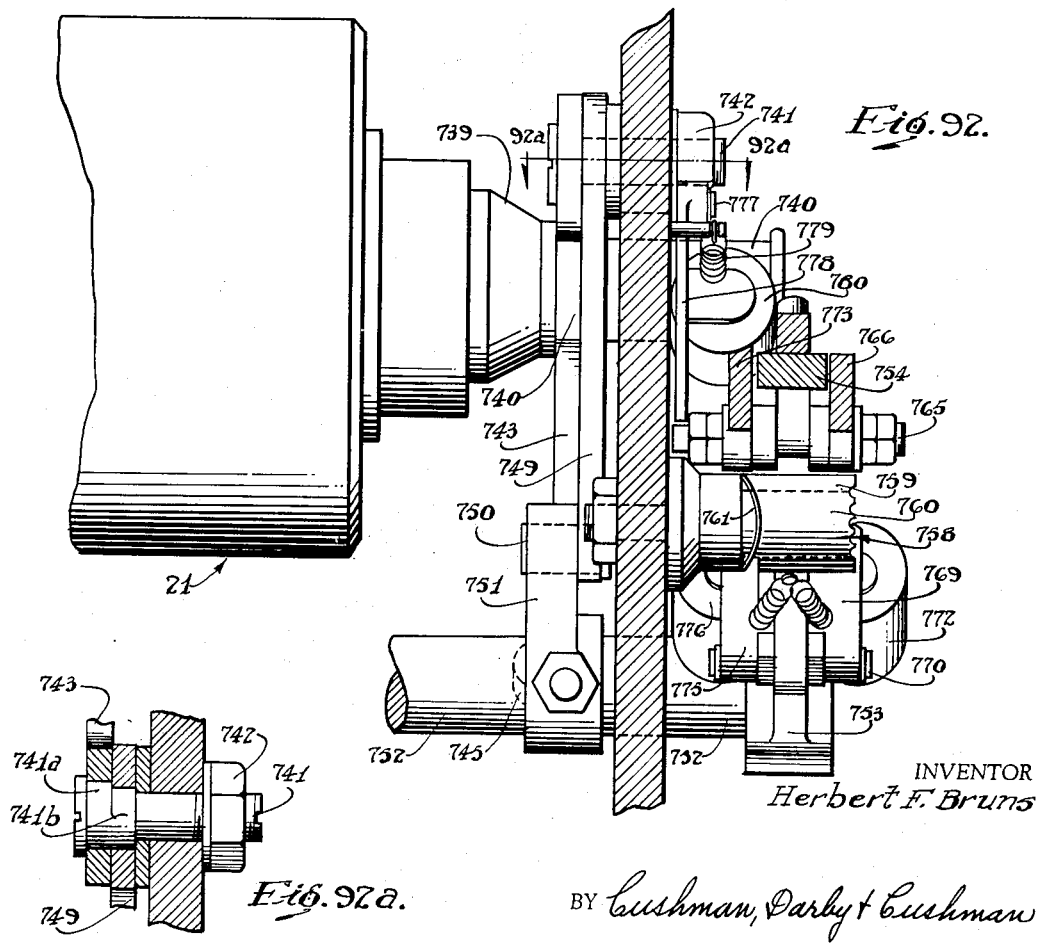
INVENTOR
Herbert F. Bruns
BY Cushman, Darby & Cushman
ATTORNEYS

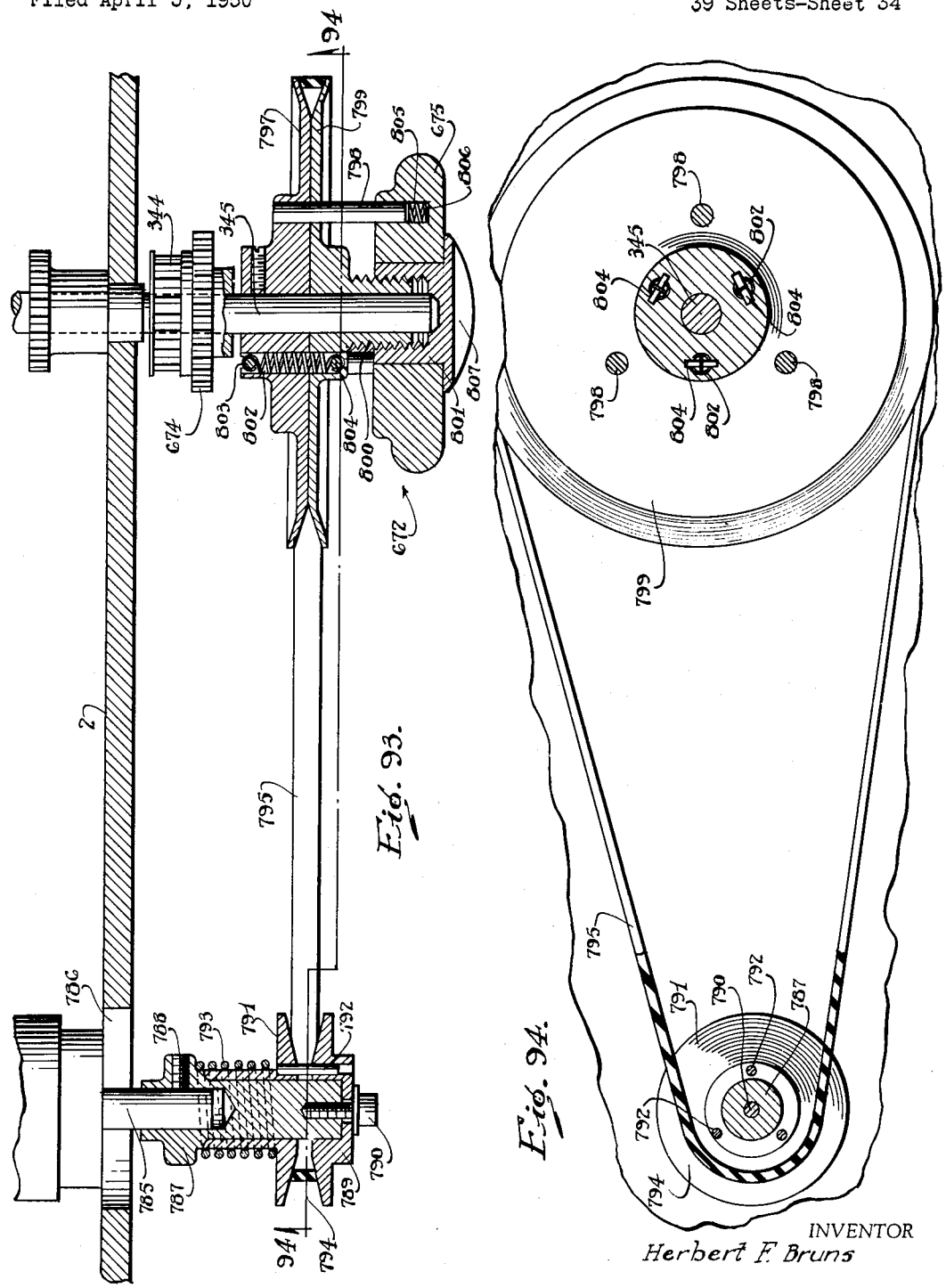

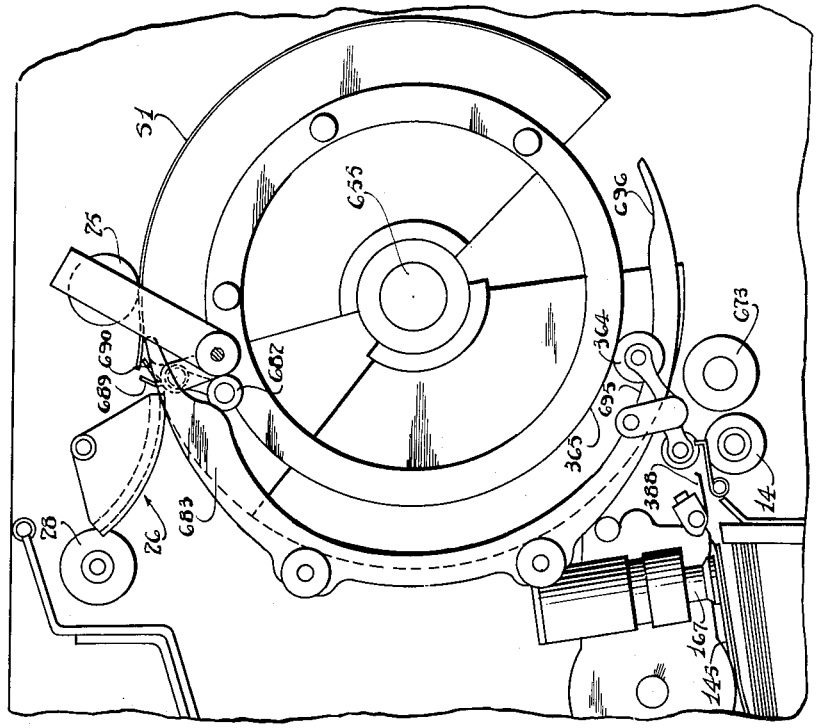
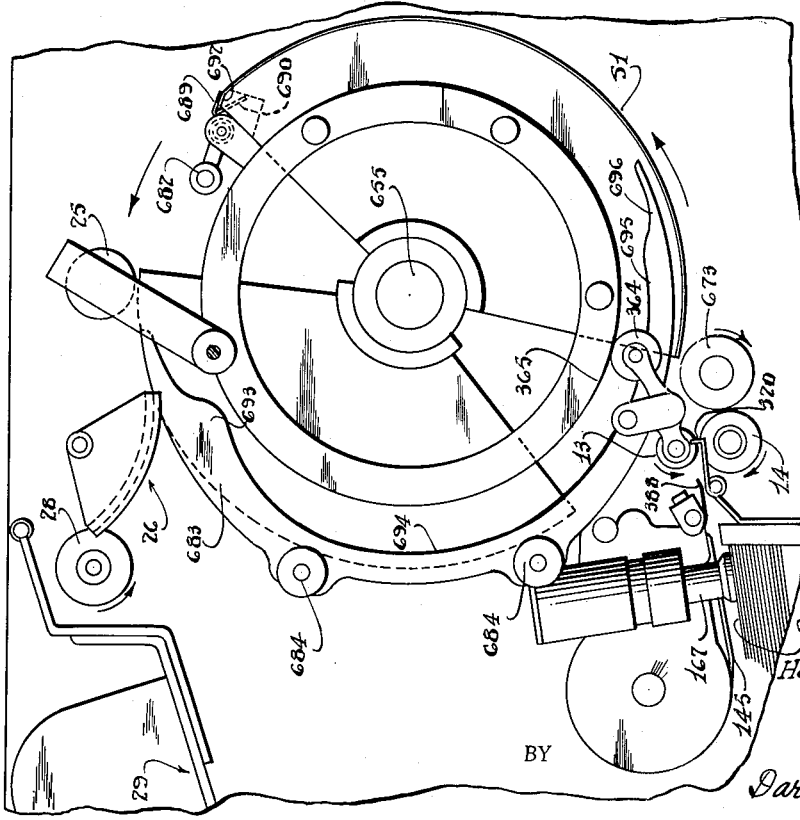

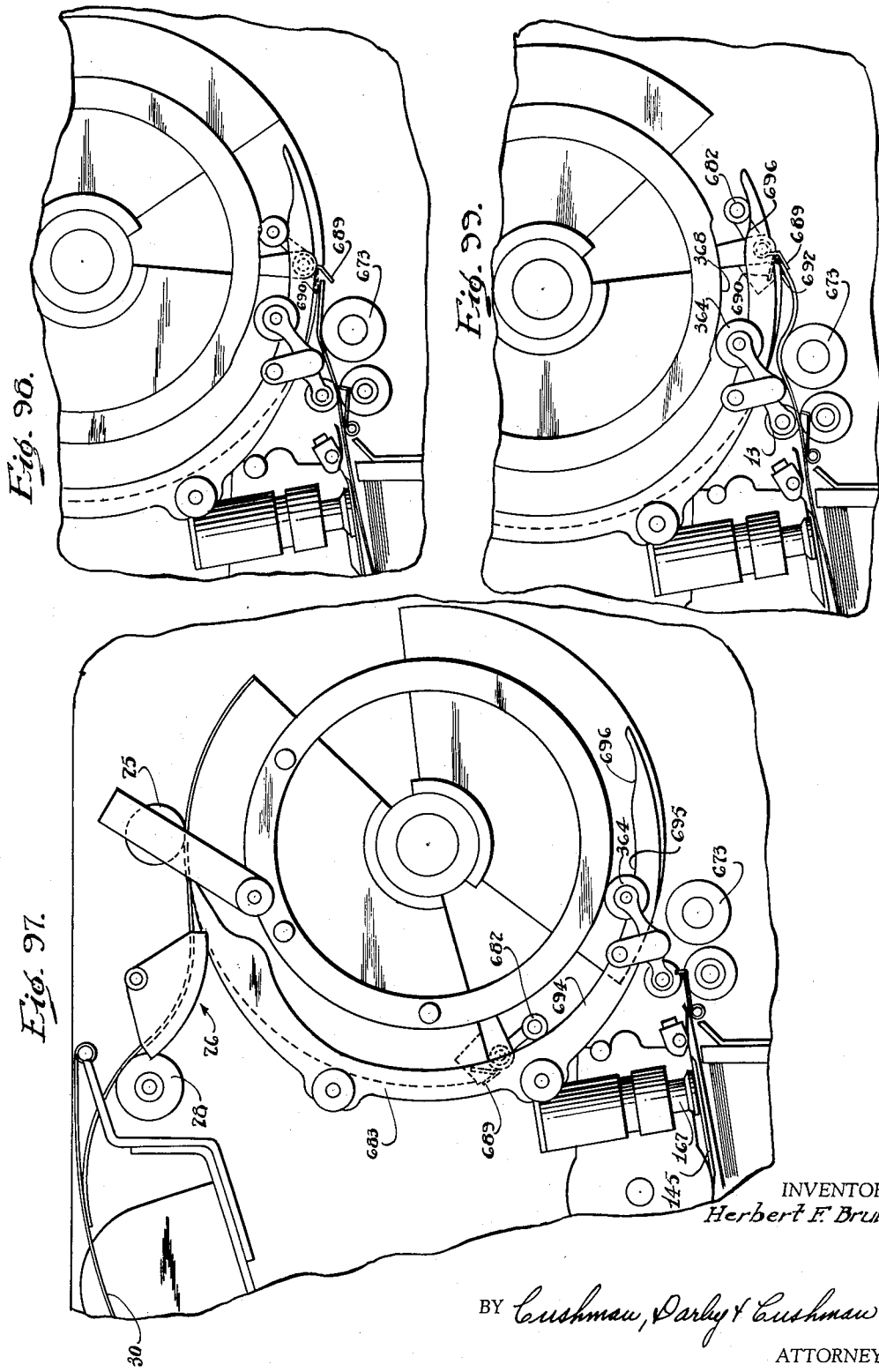

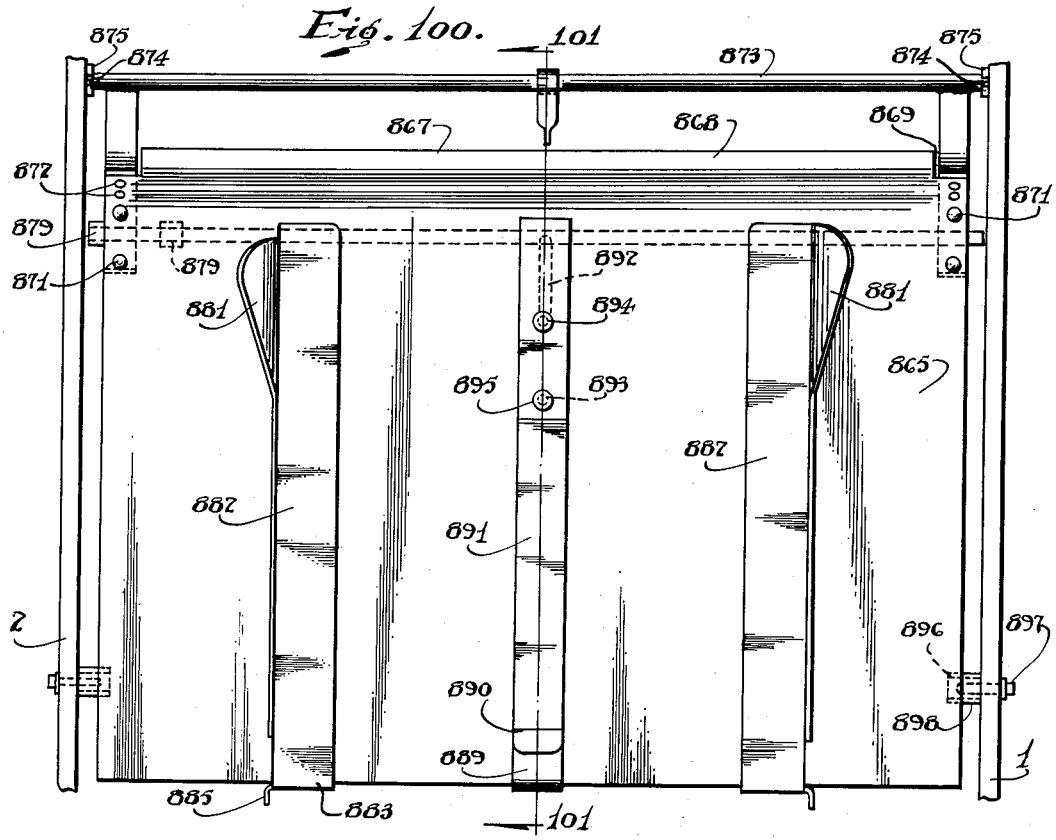
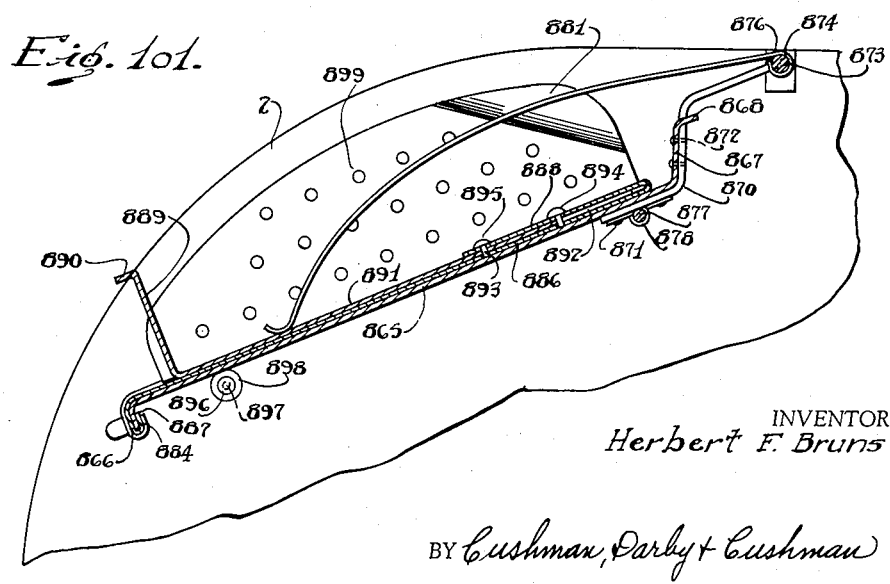

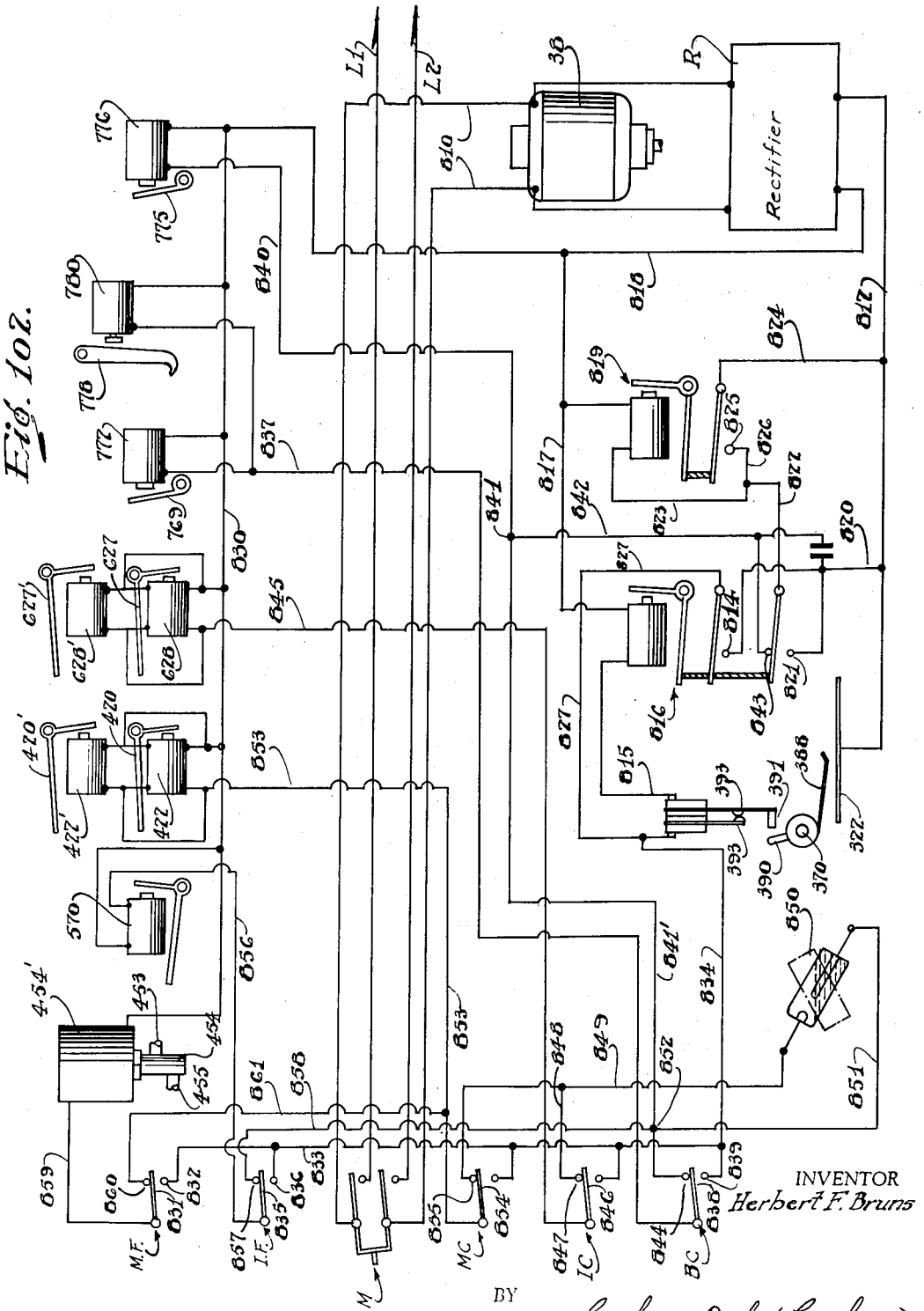

July 10, 1956                H. F. BRUNS                2,753,795

ROTARY OFFSET DUPLICATING MACHINE

Filed April 5, 1950                                  39 Sheets-Sheet 39

INVENTOR
Herbert F. Bruns

BY Cushman, Darby & Cushman
ATTORNEYS

United States Patent Office 2,753,795
Patented July 10, 1956

2,753,795

ROTARY OFFSET DUPLICATING MACHINE

Herbert F. Bruns, Chicago, Ill., assignor, by mesne assignments, to Ditto, Incorporated, Chicago, Ill., a corporation of West Virginia Application April 5, 1950, Serial No. 154,009

12 Claims. (Cl. 101—144)

The present invention relates to a new and improved duplicating machine of the offset, lithographic type and to certain improved auxiliary mechanisms adapted for use therewith, but having wider application and numerous other uses.

The invention provides a new general arrangement of the essential elements in an offset duplicating machine, having new and improved cooperative relationships, providing a new and improved mode of operation.

One of the primary objects of the invention is to simplify a duplicating machine of the offset type, to eliminate many of the parts heretofore used in such machines, to improve the efficiency of the apparatus, by the new arrangement of the essential elements.

Another major object of the invention is to provide an offset duplicating machine in which the work of the operator is greatly simplified, to the end that a skilled duplicating machine technician is not required, to operate the machine. In this connection, the invention aims to provide a machine in which manual adjustment of various mechanisms are eliminated as far as possible; in which there is semi-automatic control of many of the instrumentalities and automatic control of others; and in which the few manual adjustments which need be made from time to time are greatly facilitated, not only because of the convenient location of the control devices, but because of the rapidity of response of the machine to manual adjustments.

Another object of the invention is to so arrange the several sets of instrumentalities in an offset duplicating machine that the machine may be made at less cost than similar machines of the prior art.

Another object is to provide a machine which is more compact and occupies less space than comparable machines heretofore placed on the market. Another object is to provide a machine in which the various mechanisms are more accessible, for repair and replacement of parts, than heretofore available.

Other important major objects of the invention are to improve each of the individual mechanisms which, by the nature of things, are necessarily present in a duplicating machine of the offset, lithographic type. More particularly, the invention aims to provide a new and improved mechanism for feeding paper sheets, one by one, into the machine, including an improved support for a stack of sheets and an improved mechanism for controlling the height of the support, to maintain the top of the stack substantially constant, as the sheets are fed therefrom.

Another major object of the invention is to produce a duplicating machine which is capable of unusually high speed operation and a high rate of production, in the neighborhood of 6,000 to 10,000 printed sheets per hour.

Another object is to provide a sheet feeder, for delivering sheets one by one from a stack to a sheet receiving mechanism, which is capable of operating efficiently at higher speeds than other sheet feeders known to the art. To this end, the invention provides a feeder which is capable of delivering sheets accurately and efficiently, one by one, at rates as high as from 12,000 to 15,000 per hour.

The invention also provides new and improved sheet handling mechanisms, for receiving the paper sheets from the sheet feeder; for accurately delivering them to the sheet gripping devices associated with the main cylinder; for gripping and holding the sheets on the cylinder as the printing operation is performed; for stripping and ejecting the sheets from the main cylinder, after the printing has been performed; and for receiving the printed sheets.

Another important object of the invention is to provide, in conjunction with the above-mentioned sheet handling mechanisms, an improved, automatic throw-out mechanism, adapted to be actuated by the absence of a sheet or sheets, to render the several sets of mechanisms inoperative, to prevent the excessive build-up of ink and moisture and to shift the blanket roll to an inoperative position. An important feature of the sheet detector and throw-out mechanisms is the use of simple electromagnetic latches to hold the various rolls in their inoperative positions, when a sheet or sheets are not fed through the machine in the normal manner, and to provide positive, cam actuated means for shifting the rolls to the inoperative positions. As a result of this system, the electromagnetic latches may be relatively weak, light, simple, and inexpensive, consuming a minimum amount of current, since the power required to shift the rolls to their inoperative positions is supplied by cams driven by the main driving motor for the machine.

Another object of the invention is to provide an improved main cylinder construction, having a plate holding segment and an impression segment, mounted for relative adjustment in a new and improved manner and having associated therewith improved plate holding and sheet gripping an ejecting devices. Another advantage of the main cylinder construction of the present machine is the provision of means for preventing the accumulation at the trailing end of the impression segment, of droplets of moisture, transferred thereto by the blanket roll in the normal operation of the machine, and not absorbed by the paper sheet on that segment. Such droplets, if permitted to accumulate are thrown off by centrifugal force and are quite troublesome. The present invention provides improved means for disposing of this moisture, before it accumulates in an excessive amount.

Another object of the invention is to provide an improved mounting for the blanket roll to the end that adequate printing pressures may be employed, between the blanket roll and the paper sheets, while limiting the transfer pressures between the lithographic plate and the blanket roll. In this connection, the mounting of the blanket roll cooperates with the above mentioned throw-off mechanism in a new and improved manner so that the blanket roll is shifted to the inoperative position, in the absence of paper sheets on the sheet holding segment of the main cylinder, in a most efficient manner.

Another object of the invention is to provide a new and improved moistening mechanism, for applying moisture to the lithographic plate carried by the main cylinder; to provide variable means for delivering moisture, which is adjustable not only as to the rate of moisture delivery, but is adjustable locally, so that different and variable amounts of moisture may be applied to different portions of the lithographic plate. Another object is to provide a moisture delivery booster, effective to apply to the form roll an abnormal amount of moisture when the machine is started and before paper sheets are fed, and to provide automatic means for cutting the rate of delivery back to an adjustable normal rate when the sheet feeder starts, said booster being also operable for temporary, rapid moisture build-up, during normal printing operations, by manual control means. The invention also provides an improved system for supplying the moisture applying mechanism with liquid, which is entirely automatic in operation.

Another important object of the invention is to provide an improved inking mechanism for supplying ink to the lithographic plate on the main cylinder. In this connection, the invention includes an improved ink fountain for holding the ink and for delivering the same to the ink fountain roll in an improved manner, with a master, overall adjustment and with localized adjustment from point to point, throughout the length of the fountain roll. Features of major importance in the inking mechanism are an arrangement of fountain, ductor, rider, oscillator, and form rolls, and the drive therefor so that an improved system of ink transfer and distribution is effected, positively preventing an excess build-up of ink on the form roll and effecting an automatic feed-back of ink from the form roll to the fountain, to maintain a film of the desired thickness on the form roll, constantly and automatically, in accordance with the fountain blade setting.

Another object of the invention is to provide improved control means for the ink and moisture applying mechanisms so that the correct balance of ink and moisture may be readily effected and maintained, with great facility by an unskilled operator. In the past, one of the great difficulties in operating offset duplicating machines has been to achieve this correct ink and moisture balance, and the difficulty has stemmed from the very substantial time lag between a change of adjustment and the effect of the change in the application of ink and moisture, so that, unless, the operator is quite skilled, a condition of insufficiency or excess of ink or moisture delivery is often over-corrected, with unsatisfactory results. In the present machine, a change in the moisture and ink supply adjustment is substantially immediately effective, so that the most inexperienced operator can readily maintain the desired balance, by simply watching the results of the printing operation, as the printed sheets are delivered forwardly, face up, in position where they can be continually inspected.

A further important object of the invention is to provide a machine in which the ink and moisture delivery can be changed from work with one kind of paper stock to operation on another kind, or from one type of printing operation (for instance, a heavy coverage job), to another type of operation (for instance, a light coverage job such as a lined form), with a minimum of adjustments by the operator.

A further important object of the invention is to provide, in conjunction with the above mentioned automatic control of the various sets of mechanism in the machine, a plurality of manual controls therefor, to the end that each mechanism may be rendered operative, substantially independently of the others, under manual control, for instance, for initially supplying moisture to the moistening roll or for increasing or decreasing the moisture supply from to time when the machine is in operation; for initially supplying ink to the ink rolls and for increasing or decreasing the supply, from time to time during the operation of the machine; and for initially moistening and inking-up the plate and the blanket roll at the start of operations and before sheets are fed through the machine.

Another object of the invention is to provide, in a machine of the character described, an improved vacuum and air pressure distributing system, which is extremely simple, efficient, and not likely to get out of order. By the use of a simple combined vacuum and air pressure pump and suitable valves and conduits, suction is delivered to the sheet feeder and to the sheet counter; air under pressure is delivered to the sheet separator, for separating the sheets in the stack, for handling by the suction feeder; air under pressure is delivered to the stack supporting table, to control its height and to raise the table as the sheets are removed from the top of the stack; air under pressure is delivered to the moisture applying mechanism for spraying the same upon the moisture form roll; air is delivered to and cut off from the moisture booster for quick acting wide variation in amount of moisture sprayed upon the form roll; air is delivered to the automatic mechanism for supplying liquid to the moisture applying mechanism; and air under pressure is delivered to the sheet stripper mechanism, for shifting the same to the operative position, when the machine is in operation.

Other and further objects and advantages of the invention will be apparent from a consideration of the following description of certain preferred embodiments, shown for purposes of illustration in the accompanying drawings, in which Figure 1 is a side elevation of the right-hand side of the machine, with the cover plates or enclosing housings, which may be employed, removed;

Figure 2 is a side elevation and partial section, taken just inside of the side plate or frame shown in Figure 1;

Figure 3 is an elevation, similar to Figure 1, showing the opposite side of the machine;

Figure 4 is a plan view with the receiving tray removed;

Figure 5 is a horizontal section taken on a plane above the sheet feeder and feedrolls, but below the inking mechanism, the main cylinder and the blanket roll;

Figure 6 is a front elevation, with the receiving tray removed;

Figure 7 is a rear elevation, with certain guard plates removed, and other parts omitted.

Figure 8 is a front elevation, with many parts removed, showing a preferred form of sheet feeder;

Figure 9 is a plan view of Figure 8;

Figure 10 is a rear elevational view, similar to Figure 8, looking from the opposite direction;

Figure 11 is an elevation of the right-hand side of the feeder, on an enlarged scale;

Figure 12 is a longitudinal section of Figure 11;

Figures 13, 14 and 15 are longitudinal sectional views of one suction operated paper lifting foot in three different positions;

Figure 16 is a fragmentary view of a modified suction foot;

Figure 17 is a diagrammatic view of the air supply for the stack supporting table or platform;

Figure 18 is an exploded, isometric view of one of the suction operated paper lifting feet and associated parts;

Figures 19, 20, 21 and 22 are transverse sections taken on correspondingly numbered section lines in Figure 13;

Figure 23 is an exploded, isometric view of the sheet feeder, with the suction operated suction feet removed;

Figure 24 is a perspective view of a suction box adapted to be associated with the perforated sheet advancing belt;

Figure 25 is a similar view, with the suction box inverted;

Figure 26 is an elevation of one form of feeder timing valve and its actuating mechanism;

Figure 27 is a plan view of a modified form of feeder having a built-in timing valve;

Figure 28 is a side elevation of the parts shown in Figure 27;

Figure 29 is a sectional view taken just inside the right-hand side plate of the feeder, with certain parts shown in elevation;

Figure 30 is a section on line 30—30 of Figure 29;

Figure 31 is an elevation of the inside of the right hand side plate of the feeder, with one of the suction feet, the left hand side plate and the main pulley, removed;

Figure 32 is a fragmentary elevation and section of the right hand side plate, looking at the outer face thereof;

Figure 33 is a view of the left hand side plate, looking at the inner face;

Figure 34 is a horizontal section, taken substantially on line 34—34 of Figure 29, with certain parts removed;

Figure 34a (Sheet No. 2) is an elevation of the main feeder control valve and a mercury switch associated therewith;

Figure 37 is an exploded, isometric view of the drive;

Figure 38 is an elevation and vertical section through the main side plate of the machine, showing the intermittent feeder shaft drive and associated parts;

Figure 44 is a horizontal section and plan view of a portion of the machine, showing the paper feed rolls and associated parts;

Figure 45 is a front elevation of the parts shown in Figure 44;

Figure 46 is a view similar to Figure 44, on an enlarged scale, with portions of the rolls broken away;

Figure 47 is a front elevation of the parts shown in Figure 46;

Figure 52 is a front elevation and partial section of the mechanism for applying moisture to the master plate on the main cylinders;

Figure 53 is a section on line 53—53 of Figure 52;

Figure 53a is a sectional detail of left end of trough and shaft;

Figure 54 is a similar view, showing a modified form of receptacle for the liquid in the moistening apparatus;

Figure 55 is a side elevation and partial section of the right-hand end of Figure 52, showing the moisture adjusting means and the moisture booster;

Figure 56 is a horizontal section and plan view of the parts shown in Figure 55;

Figure 57 is a vertical section on line 57—57 of Figure 55;

Figure 58 is a fragmentary section of a control valve and push button, associated with the control panel, for the air supply for the moisture booster;

Figure 58a is a sectional detail view of one end of the moisture form roll;

Figure 59 is a fragmentary, isometric view of the train of rolls in the inking mechanism and associated parts, with other parts omitted for the sake of clarity;

Figure 60 is a plan view of the inking mechanism;

Figure 61 is a detail view showing the supporting means for one end of the ductor roll shaft;

Figure 62 is a front elevation of the inking mechanism, with the ink fountain removed;

Figure 63 is an end elevation, taken just inside of the right-hand side plate of the machine, showing the inking rollers and the fountain;

Figure 65 is a perspective view of a clamping sleeve which may be used with the oscillator roll supporting sleeves;

Figure 66 is a fragmentary horizontal section and plan view of one end of the ink fountain and fountain roll;

Figure 67 is a vertical section through the ink fountain and fountain roll, showing one of the blade adjusting screws;

Figure 68 is a similar view, taken through the master adjusting screw;

Figure 69 is a substantially vertical section and elevation, showing the means for supporting, driving, and reciprocating the oscillator roll;

Figure 70 is an elevation and section taken on line 70—70 of Figure 69, showing a latch for the oscillator roll bracket for holding the same out of engagement with the ink form roll;

Figure 71 is a horizontal section, through the right-hand side plate, showing, in plan, the cams for swinging the ductor roll bracket and for reciprocating the oscillator roll drive shaft and supporting bracket;

Figure 72 is an elevation of the mechanism shown in Figure 71, with certain parts broken away, to expose other parts;

Figure 72a is a downward continuation of Figure 72, showing an electromagnetic latch for the ductor roll bracket shaft;

Figure 73 is a vertical section through the side plate, looking from the left in Figures 71 and 72;

Figure 74 is a side elevation of a special pulley and drive for the fountain roll shaft, including a one-way clutch and a phase correcting arrangement;

Figure 75 is a vertical section through the mechanism of Figure 74;

Figure 76 is an exploded, isometric view thereof;

Figure 77 is an elevation and section of a pin and pawl drive connection;

Figure 78 is a vertical section through the machine, showing the main cylinder and the drive shaft therefor in elevation;

Figure 78a is a fragmentary plan view of the leading edge of the impression segment of the main cylinder, showing the paper clamping mechanism in closed position;

Figure 79 is a section and elevation, taken on line 79—79 of Figure 78;

Figure 80 is a section and elevation, taken substantially on line 80—80 of Figure 78;

Figure 81 is a sectional detail on an enlarged scale, taken on line 81—81 of Figure 79, showing the connection of the main cylinder driving gear to the plate carrying segment of the main cylinder;

Figure 82 is a similar section taken on line 82—82 of Figure 79, showing one of the ring cams, for controlling the ink form roll and the moisture form roll, fixedly secured to the paper holding segment of the main cylinder;

Figure 83 is an enlarged radial sectional view through the leading edge of the impression segment, showing the paper gripper and ejector mechanism;

Figure 84 is a plan view and horizontal section of a portion of the machine, showing the main cylinder, the sheet stripper and certain guide rolls for the paper sheets;

Figure 86 is a side elevation, with certain parts broken away, showing the mechanism for moving the stripper plate and the hold-down roll between operative and inoperative positions;

Figure 87 is an isometric view of a portion of the stripper plate;

Figures 88 and 89 are radial sectional views, showing the ejector fingers and the stripper plate at different points, corresponding to section lines 88—88 and 89—89 on Figure 87;

Figure 90 is a side elevation and partial vertical section of a portion of the machine, showing the blanket roll supporting means and the control devices therefor;

Figure 91 is a horizontal section and plan view of the mechanism shown in Figure 90;

Figure 92 is a vertical section and elevation, taken substantially on line 92—92 of Figure 90, with the main cylinder omitted;

Figure 92a is a detail sectional view taken along line 92a—92a of Figure 92;

Figure 93 is a horizontal section showing a preferred form of variable speed, main drive for the machine;

Figure 94 is a vertical section and elevation taken on line 94—94 of Figure 93;

Figures 95, 96, 97, 98 and 99 are diagrammatic views, showing successive steps in the handling of a sheet of paper, from the top of the stack, through the machine until discharge into the receptacle for the printed sheets;

Figure 100 is a plan view of a preferred form of receiving tray;

Figure 101 is a longitudinal section taken substantially on line 101—101 of Figure 100;

Figure 102 is an electrical circuit diagram; and

Figure 103:
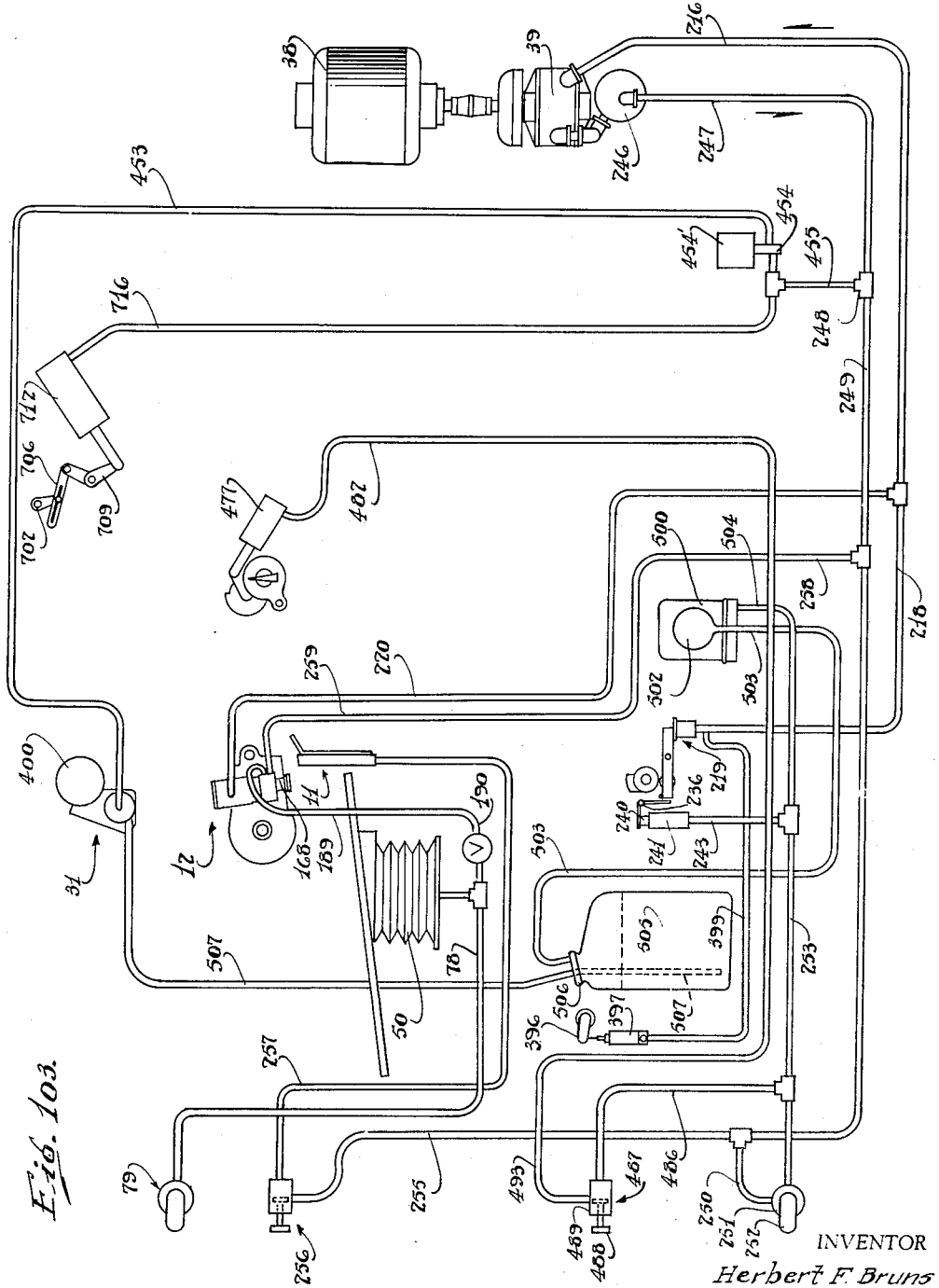

Figure 103 is an air flow diagram.

General organization

The various sets of instrumentalities making up the duplicating machine of the present invention are supported by a pair of upright side plates 1 and 2, secured in spaced relation by a plurality of tie rods, including those indicated at 3, 4, 5, and 6. Between the side plates, adjacent the forward end of the machine, there is mounted a stack supporting platform or table 10, having capability of vertical movement as explained below. At the rear end of the table, there is a fixed guide and air separator 11, adapted to facilitate the delivery of sheets one by one by the sheet feeder, represented generally at 12. The sheets are picked up individually and advanced rearwardly by the feeder, between the upper and lower feed rolls 13 and 14, against stop fingers 15, and below a detector finger 16.

The main cylinder 17 comprises a plate segment 18, and an impression segment 19 having a sheet gripper 20 associated with its leading edge, which receives the paper sheet from the feed rolls, clamps the leading edge of the same against the surface of the cylinder and carries it around past the blanket roll for printing.

The plate holding segment of the main cylinder has associated with its leading and trailing ends, plate holding clamps which may be of the type shown and described in my copending application Serial No. 84,509, filed March 31, 1949, so that the lithographic master plates may be applied and removed from the cylinder with facility.

Behind the main cylinder, there is journalled a blanket roll 21, having a rubber surface adapted to make rolling contact first with the moistened and inked lithographic plate, for the transfer of an image to the blanket roll, and then to make contact with the paper on the impression segment, to transfer the image to the paper. The blanket roll and the main cylinder are interconnected for rotation in unison by gears 22 and 23 whose pitch diameters are substantially equal to the effective diameters of the blanket roll and the main cylinder, respectively.

Above the main cylinder there is mounted a sheet hold-down shaft 24, having a plurality of rotatable disks or wheels 25 mounted thereon, overlying the path of movement of the sheet carried by the impression segment of the main cylinder. A sheet stripper 26 is disposed ahead of the hold-down wheels 25, in position to cooperate with the gripper-ejector on the main cylinder, as the latter forces the leading edge of the sheet outwardly. In front of the sheet stripper 26, there is a rotatable shaft 27 having a plurality of disks or wheels 28 thereon, serving as a sheet delivery roll, to discharge the printed sheet, face up, into the receiving tray 29, disposed in the front of the machine, and having a spring finger, sheet hold-down device 30 associated therewith.

Below the sheet stripper 26 and at the upper, front side of the main cylinder, is a moistening assembly 31, described in detail below.

Below the moistener and above the sheet feeder 12, is an inking mechanism, represented generally at 32 and described in detail below.

At the rear of the machine, there is a platform 35, suspended from resilient mounts 36, associated with angle brackets 37, carried by the side frames 1 and 2, respectively. Supported upon the platform 35 is an electric motor 38 constituting the main drive for the machine and also connected, through a coupling to a combined air compressor and vacuum pump 39 of conventional design. The pump delivers air under pressure to, and creates suction in various mechanisms in the machine as described below.

At the front of the machine, disposed between the lower ends of the side plates, there is a control panel 40, upon which are mounted all of the control levers, buttons and knobs for all of the different mechanisms in the machine, as described in detail below.

At the rear of the machine, in front of the platform 35 and the motor 38 and compressor and vacuum pump 39, there is a downwardly extending baffle plate 41, supported from the side frames and arranged to prevent the inadvertent delivery of a sheet of paper into the vicinity of the motor and the parts driven thereby, and to guide any mis-fed sheets downwardly to a position below the platform. Above the motor and compressor is a removable plate 42, slidably mounted in guideways formed in brackets 43 carried by the side plates 1 and 2 projecting inwardly therefrom. The plate 42 isolates the motor and the compressor from the rest of the machine, but may be removed to give access thereto, whenever desired.

The foregoing general description will serve to identify the various mechanisms in the machine. The several sets of instrumentalities and the relation of each to the others will now be described.

Stack supporting feed table

The table or platform 10 for supporting a stack of paper sheets to be fed into the machine is best shown in Figures 1, 2, 3, 5 and 6. Many of the features of the table and the stack guides associated therewith are shown and described in my copending application Serial No. 86,325, filed April 8, 1949.

Referring to Figure 2, a bellows 50 of flexible material, having a rigid bottom plate 51, is supported by the tie rods 4 and 5. The upper end of the bellows is constituted by a wedge-shaped block 52, having a downwardly and forwardly inclined upper surface, upon which the platform 10 is mounted, in forwardly and downwardly inclined relation. Secured to the side edges of the platform 10 are plates 53 and 54, each having a pair of outwardly projecting studs 55, upon which are mounted guide rollers 56, disposed in vertical slots 57 and 58 in the side plates 1 and 2. A transversely extending shaft 59, journalled in the plates 53 and 54 has pinions 60 and 61 on its opposite ends, in mesh with fixed racks 62 and 63 carried by the main side plates adjacent the guide slots 57 and 58. The shaft 59, gears 60 and 61 and the stationary racks serve as a stabilizer for the platform and prevent lateral tipping thereof as the table rises and falls. The guiding plates 53 and 54 may also each carry a roller 64, adapted to make rolling contact with the inner face of the adjacent machine side plate.

Mounted upon the upper surface of the platform 10 are adjustable side guides 65 and 66, each having an outwardly turned lower flange 67, secured by a cap screw 68 to a block slidable in a transversely extending slot 69 of inverted T-section, the blocks being adapted to be held in the desired position of lateral adjustment by clamping screws 70, as explained in the above-identified application.

The side guides each have laterally turned, apertured ears 71, 72 adjacent their upper corners, in each pair of which a shaft 73 is mounted for rotation, the shafts having knobs 74 at their forward ends. A tail guide 75 is secured to each shaft 73, for longitudinal adjustment therealong, by means of a set screw 76. The details of construction of the tail guides are described in the above-identified application. Suffice it to say at the present time that the tail guides may be swung from the position shown in Figure 6, upwardly and laterally by turning the associated knobs 74, thereby facilitating the placing of a stack of sheets on the table. Thereafter, they may be swung downwardly and forwardly to make firm engagement with the stack on the table.

Air is delivered to the bellows by a line 189 as hereinafter explained, to raise the table with the stack of sheets thereon, at the start of operations of the machine and substantially continuously, as the sheets are removed from the upper surface of the stack, to maintain the uppermost sheet in proper relation to the sheet feeder. Air is exhausted from the bellows, to lower the table, by a line 78 and a valve 79 (Figure 5) under the control of a handle 80, as explained below in connection with the operation of the machine.

The sheet separator

The combined sheet separator and guide for the leading edges of the sheets in the stack, indicated generally at 11 is best shown in Figures 2, 6, and 39–43 both inclusive.

Figure 40:
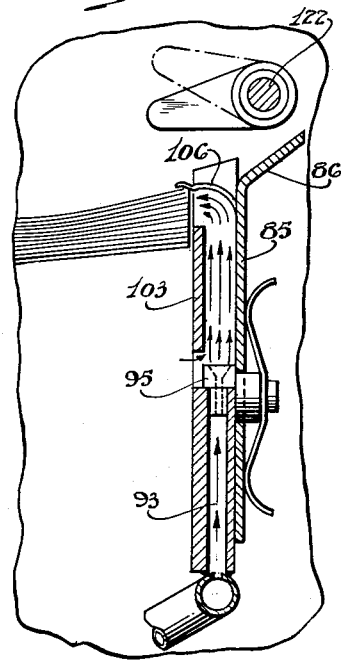
Figures 40, 41, 42 and 43 are sections taken on correspondingly numbered section lines on Figure 39.

A transversely extending, vertical plate 85, secured at its ends to the side plates 1 and 2, has a rearwardly and upwardly inclined flange 86 along its upper edge. The plate is horizontally slotted as at 87 so that the guides for the leading edges of the sheets, may be shifted laterally. The guide and air separator comprises a block 90 having an air header pipe 91 secured along its lower edge, communicating with three upwardly extending bores 92, 93 and 94, the upper ends of which are fitted with orifice plugs 95. The block 90 is provided with a plurality of pairs of upwardly projecting arms or extensions 96, 97, 98, 99, 100 and 101, to which are secured face plates 102, 103 and 104, respectively, the lower edges of the plates being spaced above the upper edge of the block 90, as indicated in Figure 40. Spaced above the face plates 102–104 and secured at their ends to the extensions 96–101 are three forwardly curved baffles 105, 106 and 107. It should be noted that the end baffles 105 and 107 are pitched outwardly and downwardly somewhat, toward the sides of the machines and that the central baffle is horizontally disposed.

Figure 41:
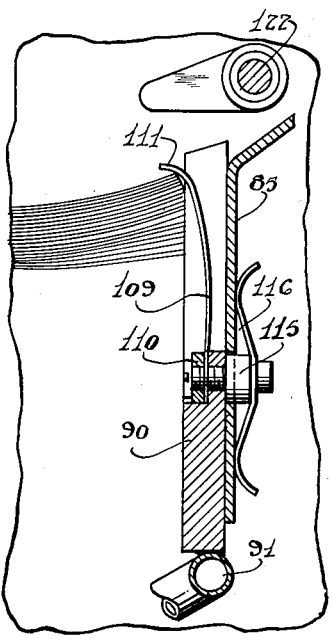
Figure 42:
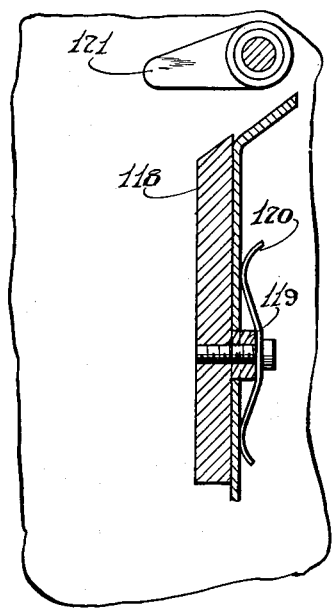

In the spaces between the several pairs of upwardly extending arms are two pairs of upwardly and forwardly projecting leaf springs 108 and 109, each pair being secured in a stepped back portion of the block 90 by a clamping plate 110. The leaf springs, adjacent their upper ends are curved forwardly with a gradual curve, as indicated in Figure 41, and have their tip ends 111 bent over somewhat, to overlie the sheets and to exert a catching or combing action thereon, as the sheets are lifted by the suction feeder as hereinafter explained.

The block 90 has a pair of slots 112 and 113, through which screws 114 extend into shoes 115 riding in the slot 87 in the supporting plate 85. The shoes carry leaf springs 116, bearing against the rear face of the plate 85 with the desired pressure, so that the block 90 and the shoes may be shifted back and forth, as desired. A limited amount of vertical adjustment may be effected by loosening the screws 114 and raising or lowering the block relative to the shoes, the movement being accommodated by slots 112 and 113.

Beyond the ends of the air separator are a pair of end guide blocks 117 and 118, each secured to a shoe 119 slidable in the slot 87 and held therein by a leaf spring 120. Thus, the guide blocks may be shifted laterally relative to the air separator and to each other so as to be positioned near the front corner of the stack of sheets on the table.

A pair of guide fingers 121 may be positioned above the guide blocks 117 and 118, to prevent the corners of the sheet from curling upwardly unduly and to guide the corners below a transversely extending, oscillating shaft 122, the purpose of which is explained below. Preferably, the fingers 121 are mounted upon sleeves 123 having a frictional sliding fit with the shaft 122.

Air under adjustably controlled pressure and rate of flow is delivered to the header pipe 91 by a nipple 91a from a hose 257 (Figure 5). The air projected upwardly through the orifice pieces 95 spreads out and strikes the baffles 105, 106 and 107, by which it is turned forwardly, to engage the leading edges of the uppermost sheets in the stack. The air flowing upwardly through the orifice pieces is joined by additional, atmospheric air drawn inwardly below the plates 102, 103 and 104, by an aspirating action, as indicated by the arrows in Figure 40. As a result, the leading edges of the sheets in the stacks are subjected to a plurality of continuous, laterally elongated drafts of air of substantial vertical thickness, all portions of which flow in substantially parallel relation, as distinguished from diverging jets of air concentrated at particular points. These drafts of air result in an improved separating action and facilitate the supply of air below the uppermost sheet, so that the latter may be lifted very rapidly, without hindrance by a vacuum condition between its lower surface and the upper surface of the next sheet. The spring fingers 108 and 109 cause the leading edge of the uppermost sheet to be snapped past their forwardly turned upper tip ends, and the latter ends catch the next sheet and prevent it from being lifted with the first sheet.

Figure 39:
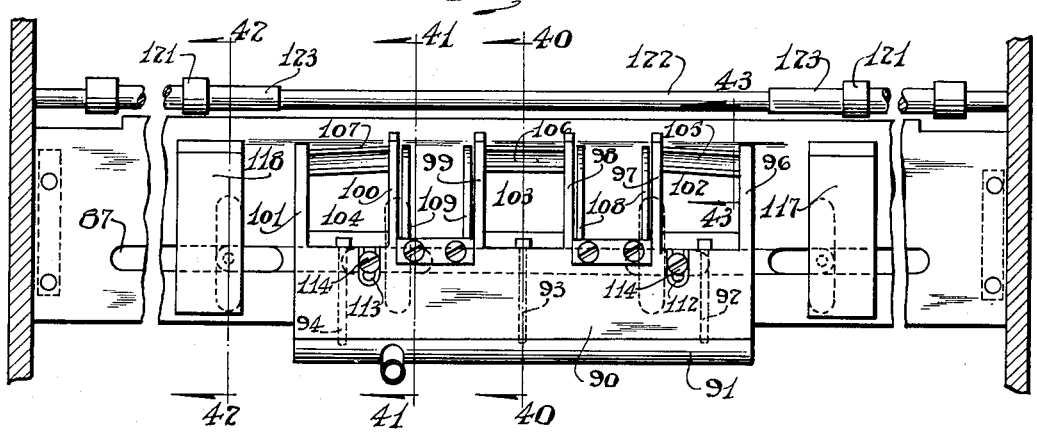
Figure 39 is a front elevation of a sheet separator, associated with the feeder and the stack supporting platform.
Figure 43:
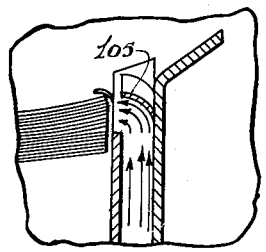

Referring to Figures 39, 40 and 43, it will be noted that the middle baffle 106 has its free edge turned slightly downwardly and extends forwardly to the plane of the face of the plate 103, so that the draft of air is directed forwardly on a substantially horizontal path, while the end baffles 105 and 108 have their free forward edges cut back somewhat, to lie behind the plane of the faces of the plates 102 and 104, with the result that the draft of air deflected forwardly by these baffles follows an upwardly inclined path. Also, the end extensions 96 and 101 are shorter than the middle extensions 98 and 99.

As explained below in connection with the description of the feeder, each sheet is lifted by suction feet at two points spaced laterally from its longitudinal center line and is supported and advanced by a suction belt extending substantially along the center line. Any tendency of the uppermost sheet to droop at its forward corners, when lifted and advanced by engagement in a zone adjacent the mid-section of its leading edge, is overcome by the upwardly directed drafts of air leaving the end baffles 105 and 106. By shortening the end supporting arms 96 and 101, their clearance by the advancing sheet is facilitated. The endwise inclination of the baffles 105 and 107 also gives to the drafts of air, a laterally inward component of flow and prevents the wasteful escape of air in a laterally outward direction.

The sheet feeder

Two forms of sheet feeder are shown in the accompanying drawings and reference is made to Figures 1, 2, 3, and 8–26, both inclusive, for a disclosure of the first form; and to Figures 27–34, both inclusive, for the second form. The principal difference between the two is in the construction, positions and actuation of the atmospheric air valve which, when closed, establishes sub-atmospheric air pressure or suction conditions. In one case, this valve is mounted upon the side plate of the machine, for purposes explained below, while in the other, it is built into the feeder proper, so that such a feeder, can be used with any type of sheet handling machine, without any modification of the machine.

The feeder of the present invention comprises a pair of vacuum operated, substantially vertically reciprocating suction feet and an intermittently movable perforated belt, travelling along and under a suction box, for receiving the sheets from the feet and for advancing them one by one into the machine. An advantageous feature of the mechanism is that the transfer suction from the feet to the box associated with the belt is automatically controlled by the movement of the feet, as they approach their upward limit of movement. This arrangement provides positive and accurate timing of the transfer of suction from the feet to the belt, regardless of the speed of the lifting of the feet, which is variable and is controlled by the weight of the sheet and the degree of suction and which cannot be timed mechanically with any other part of the machine. Another feature of importance is the use of the downward travel of the suction feet, under the influence of an initial spring impulse, followed by the force of gravity alone, to control the delivery of air under pressure to the means for supporting the stack table or platform, so that, when the feet have moved downwardly to engage a sheet, air is delivered to the stack supporting means, to compensate for the sheet or sheets previously removed by the feeder.

In Figures 8, 9 and 10, the stack supporting table and many other parts have been omitted for the sake of clarity. The feeder includes a pair of spaced, parallel side plates 125 and 126, having openings therein through which the main feeder shaft 127 extends. As noted below, the shaft is connected to stub shafts 282 and 302 journalled for rotation and supported by the main side frames of the machine. The feeder side plates are recesesd at 128, at their forward edges (considered from the aspect of sheet movement) as shown in Figures 11, 12 and 23, to engage a supporting rod 129, having its ends secured to the machine side frames by screws 130 extending into eccentric, threaded bores. The forward ends of the feeder side plates are secured together in properly spaced relation by a sleeve 131 held in position by screws 132, extending from opposite ends into the threaded bore thereof. The feeder side plates have a number of internal passages formed therein as explained below, and their inner faces are shaped to provide inwardly extending circular bosses 133 and 134, between which the web 135 of a pulley 136 is disposed. See Figure 23. A lower forwardly positioned idler roller 137 is journalled upon a shaft 138 having its ends disposed in sockets in the feeder side plates, while a belt tensioning pulley 139 is journalled on a shaft 140 having its ends disposed in slots 141 in the feeder side plates. The ends of the shaft 140 are provided with diametric threaded bores 142 which receive the ends of screws 143 extending downwardly through non-threaded bores 144 in the side plates communicating with the slots.

An endless perforated belt 145 is trained about the pulley 136, the idler roll 137 and the tension roll 139. Above the lower run of the belt, there is positioned a suction box 146, having a lower face plate 147 provided with a pair of slots 148 positioned to register with the rows of perforations 149 in the belt. Extending upwardly and laterally from the suction box is a pipe connection 150, connected to a passage in the side plate 125 as hereinafter explained. The pulley 136 is non-rotatably connected to the main feeder shaft 127 by a set screw 151 having a reduced end disposed in a keyway 152 in the shaft. The web 135 of the pulley has a plurality of apertures 153, extending therethrough, adapted to register with openings in the bosses 133 and 134, indicated at 154 and 155, respectively. The former aperture communicates with a passage 156 in the feeder side plate 125, leading to the pipe connection 150 to the suction box 146 while the former is connected to a suction pipe coupling 157, described below.

Secured to the outerside faces of the plates 125 and 126 by screw and slot connections for angular adjustment, are angle brackets 158 and 159. The brackets are welded, brazed, or otherwise secured to the upper sections 160 and 161 of cylinder assemblies, the lower sections 162 and 163 of which are secured to the brackets by screws 164, disposed in vertically extending slots 165 in the brackets.

The structure of the cylinder assemblies and of the pistons associated therewith is best shown in Figures 13–16 and 18–22. Since both are substantially alike, only one will be described in detail.

The lower cylinder section 163 is disposed in telescopic relation to the upper section 161, as shown in Figures 13–15 and is held in adjusted relation with respect thereto by the screw 164, as previously mentioned in connection with Figure 8. Within the axial bore 166 in the lower cylinder section, there is disposed a tubular piston 167, which may have a flared foot 168 at its lower end or which, preferably, may be of the form shown in Figure 16, in which the lower end thereof is of the same diameter as the remainder and in which the lower face is slightly inclined upwardly and inwardly on a frusto-conical surface, as indicated at 169. In both cases, the lower end of the internal bore 170 of the plunger 167 is open. The upper end is closed by a cap 171, having an upwardly facing recess in which there is disposed a circular rubber pad 172, for purposes hereinafter described. The upper side wall of the plunger is provided with a plurality of radial passages 173, disposed between outwardly facing circumferential grooves, in which are positioned outwardly extending rubber rings 174 and 175, respectively, the former extending outwardly beyond the latter, but having its circumference clear of the inner surface of the upwardly extending portion 176 of the lower cylinder section 163. The ring 174 may abut the shoulder 177 as indicated in Figure 15, to prevent the plunger from dropping out of the cylinder.

The lower cylinder section 163 is provided with a second bore having an upper portion 178 of reduced diameter, an intermediate portion 179 of intermediate diameter and a lower portion 180 of enlarged diameter, the connection between the latter two portions being shaped to provide a valve seat 181. A valve 182, disposed in the lower portion 180, has a stem 183 extending upwardly through the intermediate portion 179, and with a loose sliding fit, through the reduced portion 178, with its end disposed below the ring 174 carried by the plunger 167. Two lateral bores 184 and 185 communicate respectively with the bores or chambers 180 and 179 at their inner ends. The enlarged bore 180 is closed at its lower end by a plug 186 having an upwardly extending pin 187, arranged to limit the downward movement of the valve 182. Air under pressure is delivered to the port 185 by a pipe 188 and, when the valve is open, from the port 184 to a pipe 189 and from the latter to the bellows 50 through a check valve 190, as indicated diagrammatically in Figure 17.

The upper cylinder section 161 has an enlarged bore 191, in which the upward extension 176 of the lower section is slidably received. The top wall 192 of the section is provided with an axial bore 193 of reduced diameter, sized to receive, with slight clearance, the upper end 194 of the plunger 167, above the upper ring 175, the latter being adapted to seat against the end surface 192, as indicated on Figure 14, when the plunger is at its upper limit of movement.

The axial bore 193 is provided with one or more radial bores 195 and 196, connected by pipes 197 and 198 to a source of suction, intermittently, as hereinafter described. At its upper end, the bore or chamber 193 has an axial opening or port 199 in an end wall 200, the upper face of the wall, surrounding the opening being disposed on a frusto-conical surface, as indicated at 201 in Figure 14, to provide a seat for a valve body 202, mounted on a stem 203, extending upwardly through an opening 204 in a cap 205 secured in place by a screw 206. The cap has a downwardly facing annular groove 207, constituting a seat for a compression spring 208 bearing against the valve body 202 and tending to hold the latter closed on the seat 201. The lower end of the valve stem 203 carries a foot 209, adapted to be engaged by a pad 172 carried by the upper end of the plunger, to lift and open the valve.

The spring 208 performs the additional important function of giving to the plunger an initial impulse, to start the plunger on its downward movement when the vacuum in the bore 193 is cut off, as explained below. This spring impulse not only augments the force of gravity in accelerating the downward movement of the plunger, but tends to break the rubber ring 175 away from the surface 192, since high speed operation is essential.

Above the cylinder end wall 200 is a chamber 210, communicating through a radial bore 211 with pipe 157, described above, and connected in turn to the feeder side plate 126.

Referring to Figures 5, 2, and 1, in that order, the connection 215 of the combined air compresssor and vacuum pump is on the suction side thereof. An adjustable, vacuum relief valve, not shown, is connected in the vacuum system, preferably at the elbow connection 215. This valve performs the dual function of limiting the degree of vacuum which may be created in the machine and of providing a supply of air for the compressor, whenever vacuum conditions exist in the sheet feeder. A flexible hose 216 leads to a Y-connection 217, from which one branch goes to an atmospheric relief valve 219 on the outside of the machine and the other branch 220 leads to a connection with a hose 221 arranged in the form of a continuous, endless loop and trained about lower pulleys 222 and upper pulleys 223 carried by brackets secured to the side frames of the machine. As shown in Figure 9, the upper run of the looped hose 221 is connected to branched fittings 224 and 225. One branch of each fitting may be constituted by the connection 197, referred to above, and leading directly to the interior of the associated suction foot cylinder. The other branch 226 bridges the feeder proper, as shown in Figure 9 and is provided with two connections to the cylinders which may be the connections 198 referred to above. In many cases, only a single suction connection to each cylinder suffices, in which case, one may be eliminated and the opening plugged.

The purpose of having the suction line in the form of a continuous loop is to facilitate lateral adjustment of the feeder as a whole, along the main feeder drive shaft 127. As indicated in the drawings, the pulleys 222 and 223 are provided with grooved peripheries, substantially semi-circular in cross-section, to accommodate substantially one-half of the section of the hose, thereby to prevent collapse of the hose at the bends, under the influence of internal suction and external atmospheric pressure.

As shown in Figures 1, 5 and 26, the flexible conduit 218 extends outwardly through the side plate 1 and upwardly to the lower end of a metallic nipple 227 clamped to the side plate 1. The upper end of the nipple 227 carries a short rubber cylinder or tube 228, having an open upper end constituting a valve seat adapted to be closed by a valve plate 229, carried by an arm 230, pivoted to the side frame on a stud 231 and urged downwardly to closed position by a tension spring 232. The arm carries a cam following roller 233, on the opposite side of the pivot from the valve plate, in position to be engaged by a cam 234 fast on a stub shaft 302, to which the intermittently rotated main feeder shaft is connected.

The shape of the cam 234 is of importance. The cam, rotated intermittently in the direction of the arrow (Figure 26) by the mechanism described below, has slowed down nearly to its position of no motion, when it is desired to close the valve 219. Hence, the drop 234' of the cam must be quite abrupt so that the valve will move from the fully opened to the fully closed position quickly, with only very slight rotational movement of the cam.

Pivoted to the side frame on a pin 235 is a bell crank latch lever 236, having a leaf spring secured thereto with its free end 237 disposed under a pin 238, above the horizontally projecting arm of the bell crank. The spring tends to swing the lever in a counterclockwise direction so that the lower end tends to snap over a lip 239 on the forward end of the pivoted arm 230, when that end of the arm is depressed by the cam 234 to open the valve 219. The spring 237, however, is normally rendered ineffective by a piston 240, slidably mounted in a cylinder 241 secured to the side plate 1 by a bracket 242 and having an air pressure delivery pipe or hose 243 connected to its lower end. Thus, when air is delivered by the pipe 243 to the cylinder, the plunger holds the latch 236 in the position shown in Figure 26, permitting the cam 234 to open and close the valve 219. Upon the failure of the delivery of air to the cylinder 241, however, the lower end of the latch 236 is swung to the right and the valve is maintained open, breaking the vacuum in the system and preventing the delivery of suction to the feeder.

Air under pressure is delivered from the pump 39 through pipe connections 245 to a trap or filter 246 and from the latter to a main pressure supply line 247. Associated with the delivery pipe leading from the trap is an adjustable pressure relief valve, not shown, so that the pressure delivered to the line may be accurately controlled. The line 247 extends forwardly through a T-fitting 248 to a line 249, where it is curved to extend along behind the control panel 40. A branch 250 leads to the feeder control valve 251, secured to the control panel 40 and having a handle 252. A line 253 leads from the control valve and is connected by a T-fitting 254 with pipe 243, referred to above, leading to the latch controlling cylinder 241. Hence, when valve 251 is open, air under pressure is delivered to the cylinder 241 and the latch is held in its inoperative position and the valve 219 is opened and closed by the cam 234.

The cam 234 and the lip 239 on arm 230 and the latch 236 are of such relative dimensions that, on each rotation of the cam, the lip is depressed beyond the end of the latch so that the latter may clear the lip, but the piston 240 cannot free the latch from the arm and thereby close the valve 219, until the arm and the lip have been depressed by the cam. Hence, the valve plate 229 is always lowered to its closed position in properly timed relation, under the control of the cam 234. Similarly the valve can be latched open, only in properly timed relation to the machine under the influence of the cam 234 which must lower the lip 239 below the latch 236, before the latter can swing in the clockwise direction (Figure 26) under the influence of spring 237.

A continuation 255 of the main compressed air supply line leads to a needle valve behind the control panel 40 adapted to be controlled by a knob 256 to deliver air in varying amounts to a line 257 leading to the header pipe 91a connected with the air separator. Thus, the force of the draft of air blowing against the sheets may be controlled.

A small branch line 258 (Figure 2) leads from the air pressure supply pipe 249 to a flexible hose 259 (Figures 8 and 9), trained about the left-hand pulleys 222 and 223 in substantially parallel relation to the looped suction hose 221. The flexible hose 259 is connected to the lowermost port 185 (Figure 15) of the left-hand suction foot cylinder and may be the pipe 188 shown in Figures 13–15. The upper port 184 is connected directly to the bellows previously described, but, preferably, a line 189' leads to the lower port 185 of the right-hand suction foot cylinder assembly. To the upper port of the last mentioned pair, the line 189 is connected. The latter, as shown in Figures 8 and 9, is trained about the right-hand pulleys 223 and 222 and leads to the bellows 50. Preferably, the hose 259 and the hose 189 are tied together where they overlap, as indicated in Figure 8, so that the two lines where they encircle the four pulleys are in the form of a loop, to accommodate the above-mentioned lateral adjustment of the feeder.

The operation of the sheet separator and sheet feeder will now be briefly described. When the switch in the center of the control panel 40 is thrown to the right, the electric motor 38 is energized and the combined compressor and vacuum pump 39 is driven. Also, through driving belts and gears described below, the main cylinder and the blanket cylinder are rotated, with the blanket cylinder out of contact with the main cylinder and the feeder drive shaft 127 is given an intermittent rotary motion by the mechanism described below. In this condition, the machine is running idly. A stack of sheets is placed upon the platform 10 and the tail guides 75 are swung into place against the rear edges of the sheets. If the knob 256, controlling the variable delivery of air to the sheet separator has been left open as is usually the case, a draft of air is delivered by the sheet separator.

With the parts in this condition, air under pressure is delivered from the line 249 to the branch pipe 258 and the continuation 259 thereof to the lower port 185 in the suction foot cylinder. Since the stack is now in its lowermost position, the suction feet 167 both hang downwardly, holding the valves 182 open, so that air is delivered through the pipes 189' and 189 in series to the bellows. The bellows, however, are not expanded because the air escapes through line 78 to and through the valve 79 to atmosphere. When the handle 80, at the left end of the control panel is shifted to close the valve, however, the air raises the bellows and the table, until the uppermost sheet in the stack lifts the suction feet 167 sufficiently to allow air pressure below the valves 182 to close the same or, in other words, from the position shown in Figure 15 to that of Figure 13. The valves 182 cut off the supply of air to the bellows and the stack remains in the elevated position, with the uppermost sheet in contact with the lower ends of the suction feet.

After the lithographic plate on the main cylinder has been moistened and inked, and after the image has been transferred to the blanket roll, as hereinafter described, the machine is ready for printing and the feeder may be set into operation. This is accomplished by shifting the handle 252 of valve 251 toward the right, thereby delivering air from the lines 249 and 250 to the lines 253 and 243, to the feeder latch release cylinder 241. This air projects the piston 240 upwardly, releasing the latch 236 and permitting the valve plate 229 to move downwardly under the influence of spring 232. When this atmospheric air valve is closed, a partial vacuum is created in the suction line 220 and in the looped hose 221. Vacuum is immediately created in the cylinders 160 and 161, through vacuum connections 195 and 196. Since the lower end of the suction feet are in contact with the paper, the uppermost sheet is sucked into sealing contact therewith and the feet are immediately raised, with the sheet held against their lower surfaces by atmospheric air pressure. Just before the suction feet reach their upper limit of movement, the upper ends 194 of the plungers enter the bores 193 in the upper ends of the cylinders. At this instant, each valve 202 is opened. The upwardly projecting end 194 of each plunger, above ring 175, and its cooperation with the cylindrical bore 193 have important functional advantages. The plunger enters the bore with a piston-like action and assures the full travel of the plunger to its uppermost limit of movement, so that the ring 175 is firmly seated against the surface 192. Thus, in the very last portion of the upward travel of the plunger, reliance is not placed upon the paper sheet sealing the lower open end of the plunger. This is important, since the paper makes contact with the suction belt just before the suction feet reach their upper limit of movement and there is a tendency for the sheet to be broken away from the feet by this contact with the belt. Even though the paper is so broken away, the vacuum, working on the piston portion 194 completes the stroke of the plunger and seats the ring 175 into sealing relation upon the surface 192. Furthermore, since the plungers move quite rapidly, there is a tendency for the plunger and the ring 175 to bounce downwardly away from the surface 192. If the upward, piston-like extension 194 were not provided, the vacuum would be broken by such a bouncing action, assuming that the paper sheet had been separated from sealing relation to the lower, open end of the plunger. However, the bounce-back is never sufficient to break the loose seal between the extension 194 and the bore 193 and the plunger is firmly raised to its upper limit of movement and held in that position by the suction operating on the upper surface of cap 171.

When the plungers are in their uppermost position, each ring 175 constitutes a seal, preventing the application of suction from the lines 196 and 197, through bores 173 to the interior of the plungers. Thus, the application of suction to the sheet at the lower end of the plungers is cut off, but the plungers are held in their uppermost position by the suction on their upper end.

Opening of one or both of the valves 202 transfers suction through the port 211 and pipe 157 to the side plate 126 of the feeder. Suction is transferred through the openings in the web 135 of the main pulley, to the passage 156 in the other side plate 125 and from the latter passage to the suction box 146, overlying the lower run of the perforated belt 145. At this time, the feeder shaft 127, the pulley 136 and the belt 145 are at the stationary portion of their cycle, so that, when the suction is transferred from the suction feet to the suction box above the belt, and the sheets are released by the feet and gripped by suction against the belt, the belt will not be moving and there will be no possibility of skidding or slipping between the belt and the sheet, which might result in the sheet not reaching the stop fingers.

It will be understood, by reference to Figure 14 that each suction foot is maintained in its elevated position by the suction working on the upper surface of the head of the plunger; or stated differently, by atmospheric air pressure working against the lower surface of the cap 171. The suction feet will be maintained in this position, until atmospheric pressure conditions are re-established in the space above the head of the plunger.

Substantially immediately after the sheet is gripped by the belt, by the suction working through the perforations therein, the shaft 127, the pulley 136, and the belt are given a forward, accelerating rotational movement so that the sheet is advanced to the stop fingers in the machine. When the last one of the openings in the web 135 of the pulley has passed beyond the ports 155 and 154 in the side plates, the web cuts off the continued application of suction to the suction box 146 and the paper sheet is released. Shortly thereafter, it is gripped by the feed rolls associated with the machine and hereinafter described in detail, and rapidly fed to the grippers on the main cylinder, for completion of the printing operation.

The cam 234, of course, rotates with the shaft 127. At the proper instant, it raises the valve plate 229 and permits atmospheric air to flow into the system and, more particularly, into the space above the suction foot plungers, permitting them to drop by gravity, assisted by an initial spring impulse, onto the sheet which is now uppermost in the stack. When the cam 234 again moves away from the roller 233, the valve seat 228 is again closed by plate 229, and the cycle of operations is repeated.

As the sheets are successively removed from the top of the stack, the suction feet drop down to a slightly greater extent, thereby slightly opening the valves 182 and delivering small puffs of air to the bellows, to raise the platform sufficiently to compensate for the removed sheets. Thus, the table is maintained at all times at exactly the right height, in relation to the suction feet.

By reference to Figure 13, it will be noted that the suction feet 167 are preferably mounted on an axis tipped forwardly a slight amount as compared to a line normal to the upper surface of the uppermost sheet so that there may be a slight rearwardly facing gap or angle between the lower surface of the foot and the sheet. It will also be noted that, as a result of the combination of elements incorporated in this feeder, the suction feet may be placed extremely closely to the leading edges of the sheets in the stack. This arrangement greatly facilitates the separation of the upper sheet from the one therebelow. Not only is the separating force applied by the feet substantially at the edge, but the upper sheet tends to bend upwardly and peel away from the lower sheet. This action is assisted by the air draft delivered by the separator and by the action of the spring retarding fingers.

One of the important advantages of the feeder of the present invention is that it is unnecessary to change the degree of suction (partial vacuum), when different weights of paper are being handled. The suction feet are entirely self-compensating in their operation, and the same degree of vacuum may be employed with all weights and types of stock. With prior suction feeders, it has been necessary to vary the degree of suction in accordance with the weight of paper being fed. This not only necessitates a troublesome adjustment, but makes the feeders unsuitable for use in systems work, where sheets of paper and card stock of widely varying weights and sizes are handled in immediate succession.

Manifestly, more suction is required to lift a heavy sheet, such as card stock, than light stock, such as tissue. When handling any type of sheet, the vacuum in the system builds up progressively, from atmospheric pressure (which exists before the valve 219 is closed) to a degree sufficiently high to lift the feet and the associated sheet. If the sheet is light, the feet lift when a relatively low vacuum has been built up; the vacuum in the feet is immediately cut off when the feet approach their upper limit of movement, and is then transferred to the suction belt. When a heavy sheet, such as card stock, is being handled, there is a slight relative delay in the lifting of the feet, until a higher partial vacuum has been created, sufficient to lift the feet and heavier sheet, whereupon the vacuum is cut off and transferred, when the feet approach their upper limit of movement. Thus, the timing of the actual lifting action and of the transfer of the vacuum to the belt is controlled by the feet themselves, and is regulated automatically by the weight of the sheet. This time, therefore, is not mechanically tied to other operations of the machine, as is always the case where suction lifting devices are mechanically actuated and where mechanical valves are employed to control the suction.

The form of feeder shown in Figures 27–34 is identical to that described above in most of its particulars, and differs therefrom only in minor respects, primarily in regard to the atmospheric air relief valve which constitutes the timing means for initiating each cycle of operations of the feeder. The construction of the suction foot cylinders and associated devices are identical to that previously described and the description need not be repeated. The looped suction hose 221' may be substantially identical to the one described above, except that it is not connected to a branch line leading to an atmospheric air relief valve on the outside of the machine. Instead, a branch line 260 is connected thereto, at a point between the connections 198' to the suction cylinders, and this branch leads to a block 261 mounted in a gap 262 in the right hand side plate or block 125'. The block 261 is adjustably carried by an arcuate slotted plate 263. The block has an opening 264 therein, surrounded on its inner face by a resiliently backed sealing element 265, making sealing contact with the web 135' of the pulley 136'. The other side plate 126' is out of sealing contact with the web 135' and is in free communication with the atmosphere, through holes 262a and 262b. The web 135' has a plurality of radially elongated apertures 153' formed therein, adapted to register with the opening 264 in the block 261 as the pulley is rotated, to establish communication between the branch pipe 260 and the atmosphere and thus break the vacuum in the system. Conversely, when the imperforate portion of the web of the pulley is in sealing contact with the opening 264, the communication with the atmosphere is cut off and vacuum is established in the system through the vacuum line 221' and connections 198'.

Pipe 157' leads from the upper chamber in the suction foot cylinder as previously described, and delivers suction to the suction box 146' in a similar manner. The pipe 157' is connected through a port 267 to a bore 268 in the side plate 126' which, in turn, communicates with a second bore 269 leading downwardly, as shown in Figure 33, to an inwardly facing port 270. The latter port is bounded by a sealing ring consisting of a rubber packing strip 271 and a sealing plate 272, held in place by the surrounding metal of the side plate, the fiber washer being arranged to bear against the adjacent face of the web 135' of the pulley. As shown, the outer ends of the bores 269 and 268 are closed by suitable plugs.

The side plate 125' is provided with a substantially horizontally disposed bore 273, having its front end plugged and having communication through a port 274 with the inner face of the plate. Rubber and fiber sealing rings 275 and 276 surround the port 274 and make sealing contact with the adjacent face of the web of the pulley. The rear end of bore 273 communicates through the face of this side of the plate to a port 277, to which is attached the pipe coupling 150' leading to the suction box 146'.

Thus, when one or another of the openings 153' is in registry with the ports 270 and 274 in the side plates 126' and 125', suction is communicated from the line 157', connected to the upper end of the cylinder, to the suction box 146', above the perforated belt; and as soon as the last opening 153' has passed these ports, the suction is cut off by the imperforate portion of the web 135' of the pulley.

In the operation of this form of the feeder, the main drive shaft 127' is given an intermittent rotary motion, in timed relation to other parts of the associated machine, by any suitable mechanisms but, preferably by the intermittent motion device described below. As the last port 153' in the web of the pulley passes beyond the port 264 in the adjustable block and the pulley and belt come to rest, the first or second port 153' is in registry with the ports 270 and 274. Vacuum is established in the system, when the atmospheric air relief port 164 is thus closed by the web of the pulley, and the suction feet are immediately lifted, thereby raising the uppermost sheet of paper into contact with the now stationary perforated belt and simultaneously transferring vacuum to the suction box 146', as the feet reach their upper limit of movement, by opening the transfer valve 202. The pulley and the belt are rotated to advance the sheet into the machine. When the last port 153' in the web of the pulley passes beyond the ports 270 and 274, the suction to the suction box 146' is cut off and the sheet is released by the belt, to be taken over by the feed rolls or the like. The suction feet remain elevated, however, until the vacuum in the system is broken by the first port 153' in the web of the pulley coming into registry with the vacuum relief port 264 in the block 261, whereupon the feet drop into contact with the uppermost sheet. The feet remain in the lower position until the last port 153' has again moved past the vacuum relief port 264, whereupon vacuum is re-established and the cycle of operations is repeated.

It should be understood that the same table height control mechanism is built into this feeder, as indicated by the parts shown in the accompanying drawings, corresponding to those embodied in the first form, and indicated by primed reference characters.

The intermittent drive for the feeder shaft

Referring to Figures 3, 5, 8–10 and 35–38, continuous rotation is imparted by a belt 280 to a pulley 281 which constitutes the driving element of the intermittent motion mechanism now to be described. Preferably the pulley has formed on its periphery alternating ribs and grooves, designed for cooperation with a flexible, toothed, Gilmer timing belt, so that slippage between the pulley and belt is impossible and the various devices driven by the belt are maintained in accurately timed relation. The pulley is journalled for rotation on the end of a stub shaft 282, mounted for rotation, in turn, in a bearing sleeve 283, projecting axially from a circular mounting plate 284, secured in fixed position in an enlarged opening 284 in the main machine side plate 2. A collar 281', set screwed on the shaft, holds the pulley in place. The plate 284 is provided with a circular shoulder 286 adapted to be clamped against the margin of the openings in the side plate, in angularly adjusted relation by a plurality of bolts 287.

Adjustably secured to the outer face of the pulley 281 by cap screws 288 are a pair of cams 289 and 290 with a spacer plate 291 interposed, but since these cams do not form a part of the intermittent motion device, their function will not be described at this point.

Pivotally secured to the inner face of the pulley 281 by a pin 292 is a gear sector 293, having a series of teeth 294 thereon, the sector being pivoted off-center with respect to the pulley fairly near the periphery thereof. Secured to the sector gear adjacent one end thereof is a pin 295, carrying on its inner end a cam following roller 296, disposed in engagement with the periphery of a cam 297, secured to the inner face of the bushing plate 284 by cap screws 298.

A sector gear 299, secured to the stub shaft 282 by a pin 300 is provided with a series of teeth 301, meshing with the teeth 294 of the sector gear 293.

Figure 35:
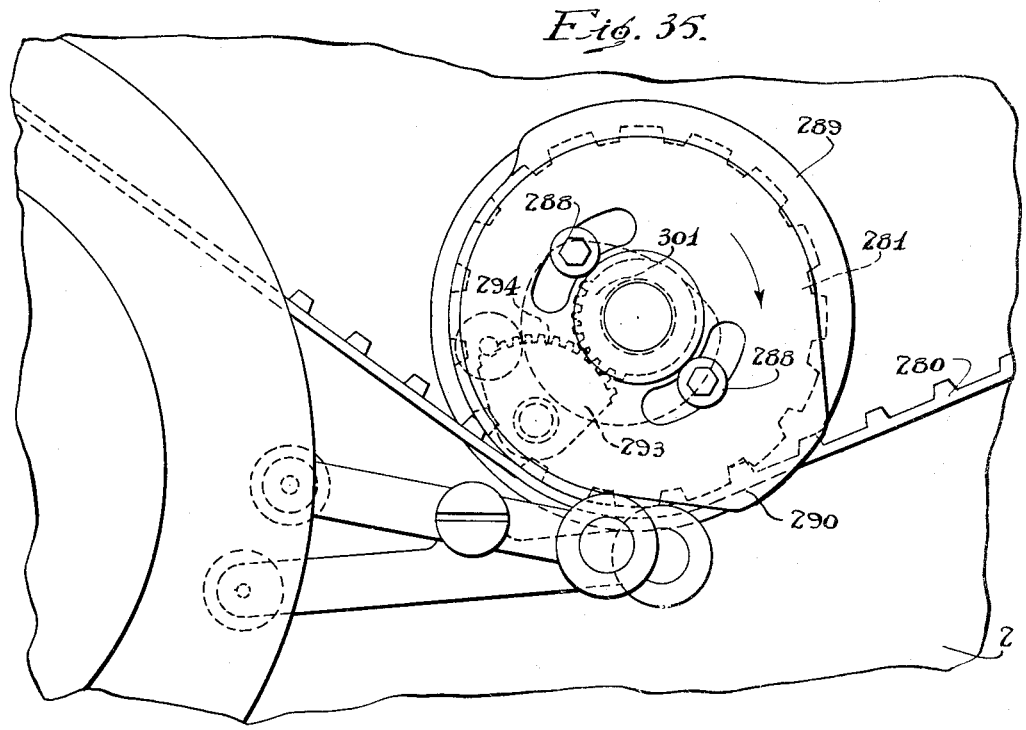
Figure 35 is a side elevation of an intermittent drive device for the feeder shaft, also showing certain associated mechanisms.
Figure 36:
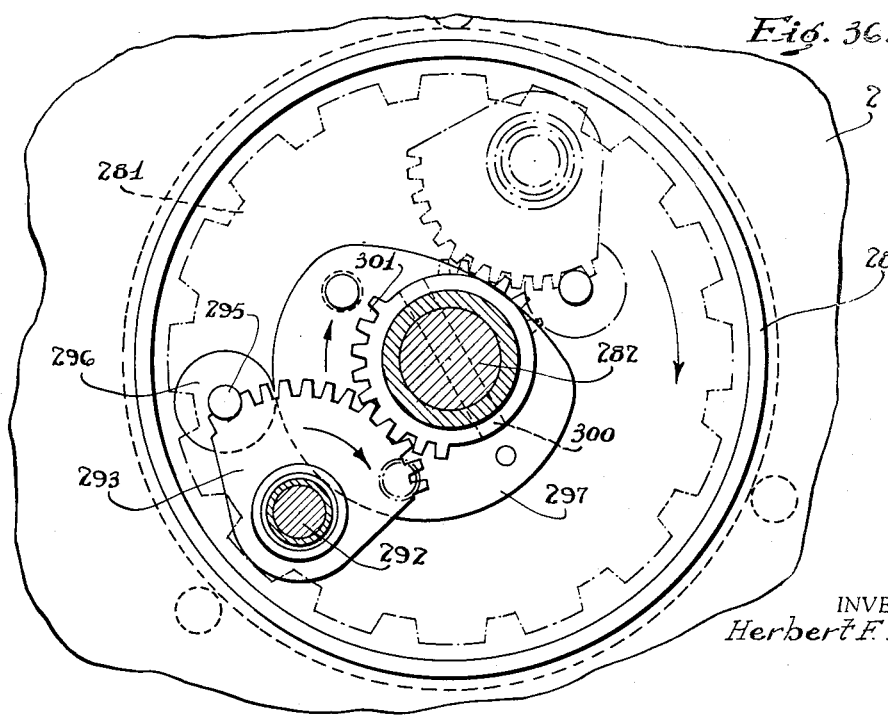
Figure 36 is a radial sectional view of the intermittent drive, on an enlarged scale.

As the pulley 281 rotates in the direction of the arrows in Figures 35–37, the sector gear pivot pin 292 is caused to revolve around the axis of the shaft 282. If the sector gear 293 did not swing about the axis of its pivot pin 292, continuous rotation would be imparted to the shaft 282 by the driving connection between the teeth 294 on the sector gear 293 and the teeth 301 on the sector gear 299, fast on the shaft. However, because of the shape of the cam 297 and the engagement of the cam following roller 296, carried by the sector gear 293, the latter is caused to swing back and forth during each rotation, from the position shown in full lines in Figure 36, to the position shown in dot-dash lines therein. This swinging movement of the gear 293 imparts a relative oscillating movement to the gear 299 and to the shaft 282. Since the parts are rotating with the pulley 281, this oscillating movement results in a deceleration of the gear 299 and the shaft 282, followed by a period of actual stoppage of the shaft, then a period of accelerating movement, and a momentary period of movement in unison with the pulley.

Because of the resistance to movement of the feeder shaft, which is transmitted through the teeth 301 on the gear 299 to the sector gear 293, the cam following roller 296 is maintained constantly in engagement with the cam 297 and it is unnecessary to provide an encircling cam surface. When the machine is turned by hand in a reverse direction, for one purpose or another, the cam follower swings outwardly and may roll along the inner surface of the opening 285 in the side plate, without swinging back and forth, which results in a continuous rotation in a rearward direction of the main feeder shaft.

In order that the feeder as a whole may be removed from the machine, if desired, the main feeder shaft 127 is provided with detachable couplings at opposite ends, for connection to the stub shaft 282 of the intermittent motion device at the left hand end (Figure 9) and for connection to a stub shaft continuation 302 at the other end. The latter stub shaft is journalled in a bushing 303 carried by the right hand side plate 1 and has the cam 234 secured for angular adjustment to its outwardly projecting end. As shown in Figures 8, 9, and 38, the coupling at the left hand end of shaft 127 comprises a flanged collar 304 secured to the stub shaft 282 by a set screw 305 in abutting relation to the bearing sleeve 283, the end of the collar being slotted as indicated at 306. The feeder shaft 127 is preferably tubular and is drilled to receive a pin 307 acting as a seat for a compression spring 308, bearing against a pin 309 having its ends extending through elongated slots 310 formed in the shaft 127 and extending into diametric holes in a sleeve 311, the latter having a flange 312 at its inner end so that it may be grasped and drawn inwardly, out of telescopic relation to the projecting end of the collar 304. The end of the shaft 127 is provided with diametrically projecting tongues 313, adapted to be received in the slots 306. Thus, when the sleeve 311 is drawn inwardly against the force of the spring 308, the feeder shaft may be removed by lateral movement of the tongues 313 relative to the slots 306.

The connection at the right hand end of the shaft 127 may be identical, except that the collar 304 is omitted and the slots for the tongues on the shaft 127 are formed in the stub shaft 302.

Preferably, the two diametric tongues and the mating diametric slots at both ends are of unequal size or shape, so that the shaft 127 may be coupled with the stub shaft 282 and the stub shaft 302 in only one position of angular adjustment, to the end that the feeder may be maintained in proper timed relation to the intermittent motion mechanism, the cam 234 and the other mechanisms in the machine.

As a result of the features of construction described above, the timing of the intermittent motion mechanism with respect to the other instrumentalities in the machine, and the timing of the feeder may be readily effected. Certain parts are fixed with respect to each other and other parts are relatively adjustable. The pulley 136 for the perforated feed belt in the feeder is fixed with respect to the shaft 127. The gear 299 of the intermittent motion mechanism is fixed with respect to the shaft 282 and, although the pulley 281 has relative motion with respect to the shaft 282, it is not angularly adjustable thereon. However, the plate 286 carrying the cam 297 of the intermittent drive is angularly adjustable in the opening 285 in the side plate, to adjust the point at which the stopping of the stub shaft 282 occurs with respect to other mechanisms in the machine, driven by the same belt 280. The main feeder shaft 127 is angularly adjustable relative to the stub shaft 282, by changing the adjustment of the coupling sleeve 304. The cam 234 at the other side of the machine, is angularly adjustable relative to the stub shaft 302, which is driven by shaft 127. Angular adjustment of the cam 234 controls the time of closing of the atmosphere relief valve 219.

In the second form of the feeder, the movable segment block 261 is also angularly adjustable, to control the time of closing of the atmospheric air relief valve constituted by the port 264.

Stop fingers, sheet detector and feed rolls

The details of construction of the stop fingers 15, the sheet detector 16 and the feed rolls 13 and 14 are best shown in Figures 44–51, while certain actuating cams are shown in Figures 35, 37, and 38.

The stop fingers are constituted by upwardly bent, rear ends 320 of rearwardly projecting extensions 32 of a transversely elongated plate 322, having its forward portion wrapped around and secured to a shaft 323 having its right hand end secured in a bushing 324 carried by the right hand side plate and its other end secured in a socketed stub shaft 325 (Figure 50) rotatably mounted in a bushing 326 carried by the side frame 2. Secured to the outwardly projecting, reduced extension 327 of the stub shaft 325 by a screw 329 (Fig. 51) is a collar 328, having an arm 330 projecting therefrom. The screw 329 is engaged by a light tension spring 331 having its other end pinned to the side plate, and the arm 330 overlies a roller 332 carried by a lever arm 333 fulcrumed on a pin 334 threaded into the side plate 2. The rearwardly projecting end of the lever arm 333 is urged downwardly by a tension spring 335 having its lower end secured to a pin carried by the machine side plate 2. The forwardly projecting end of the lever carries an outwardly projecting roller 336, disposed below the innermost cam 289 secured to the pulley 281, described above in connection with the intermittent motion device. As the cam rotates, the cam following roller 336 is depressed, raising the roller 332 on the opposite end, raising the arm 330 and rocking the stub shaft 327 and the stop fingers carrying shaft 323 in a counterclockwise direction, as viewed in Figure 51, to lower the upwardly projecting ends 320, constituting the stop fingers. When the cam following roller 336 passes off of the rise of the cam 289, the parts pivot in the opposite direction, under the influence of springs 335 and 331, to project the stop fingers upwardly into the path of movement of the leading end of a sheet of paper, as explained in detail below.

The spring 335 serves to maintain the cam following roller 336 continuously in contact with the cam 289 and may be a fairly strong spring. The spring 331 swings the stop finger shaft 323 and its extension 327 in a clockwise direction, Figure 51, to project the stop fingers 320 upwardly into the path of movement of the incoming sheet, whenever permitted to do so by the lowering movement of the roller 332. The tension spring 331 is quite weak, however, to the end that, should a paper sheet fail to be carried away by the grippers on the main cylinder, so as to lie above the fingers, they will not be projected upwardly with sufficient force to penetrate the sheet and prevent its moving rearwardly with the next operation of the feed rolls. If a sheet were so punctured and caught by the stop fingers projected upwardly with substantial force, a jam in the feeding of sheets might occur. Hence, a relatively light spring is used to project the fingers upwardly, and a stronger spring maintains the cam following roller 336 in contact with its actuating cam, for high speed operation of the machine.

The lower feed roll 14 comprises a shaft 337, journalled in large bushings 338 and 339 carried by the side plates 1 and 2. Mounted on the shaft 337, in suitably spaced relation, are a plurality of rubber rings 340 of substantial thickness, preferably vulcanized in place. The spaces 341 between the rubber rings accommodate the stop fingers 320, when lowered, so that the tip ends thereof lie below the plane of the upper surfaces of the rings. On the left hand end of the shaft 337, there is a small grooved and toothed pulley 342, about which is trained a driving belt 343 of the toothed type described above. The belt derives rotation from a pulley 344, fast on the main drive shaft 345. Hence, the lower feed roll is constantly rotated at a relatively rapid rate. As explained below, it is important that its peripheral speed be greater than the peripheral speed of the main cylinder.

The upper feed roll 13 preferably is constituted by an accurately machined hollow shaft, having enlarged portions 346 and intermediate grooved portions 347, the former registering with the rubber rings 340 and the latter with the spaces 341. The end faces of the upper feed roll are provided with conical indentations to receive the pointed ends of supporting pins 348 and 349, which act as bearings for the roll. Referring to Figures 46–49, the pin 348 at the right hand end is secured in accurately adjusted relation in the forwardly projecting end of a lever 350, by means of a lock nut 351. The lever is fulcrumed on the reduced end of a shaft 352 extending into a socketed boss or sleeve 353 projecting laterally from a link 354 having a circular opening 355 adjacent its upper end and a vertically elongated slot 356 at its lower end. The link is adapted to be secured to the side plate 1 by a bolt 357 extending through the side plate and having a nut 358 on its outer end. The bolt, adjacent the head 359 thereof has a cylindrical, eccentric section 360 of a length slightly less than the thickness of the link 354 and of a diameter to fit the opening 355. Hence, when the nut 358 is drawn up tightly the link 354 is clamped firmly against the inner surface of the machine side plate. The outer end of the bolt is provided with a kerf 361 for the reception of a screw driver, so that, when the nut 358 is loosened, the bolt may be turned, to raise or lower the link 355 by means of the eccentric 360. A cap screw 362 is threaded into an opening in the side plate 1 with its reduced end 363 projecting into the slot 356, thereby guiding the link and the parts supported thereby for vertical movement and preventing substantial forward or rearward shifting thereof.

The rearwardly and upwardly projecting arm of the lever 350 carried a cam following roller 364, disposed in engagement with a ring cam 365 carried by the main cylinder and secured thereto for circumferential adjustment by a plurality of cap screws 366 extending through arcuate slots 367. When the cam following roller 364 enters the depression 368 on the ring cam 365, out of contact with the surface thereof, the lever arm 350 is rocked in a counterclockwise direction, Figure 48, under the influence of tension springs 369 having their upper ends secured to pins 348 and their lower ends secured to the machine side plates 1 and 2, thereby dropping the upper feed roll onto the surface of a sheet of paper fed below it, and pressing the sheet firmly against the continuously rotating lower feed roll. It will be understood, of course, that the cam 289 and the depression 368 in cam 365 are so related that the stop fingers 320 are lowered out of the path of movement of the paper sheet, prior to the dropping of the upper feed rolls.

Figure 50:
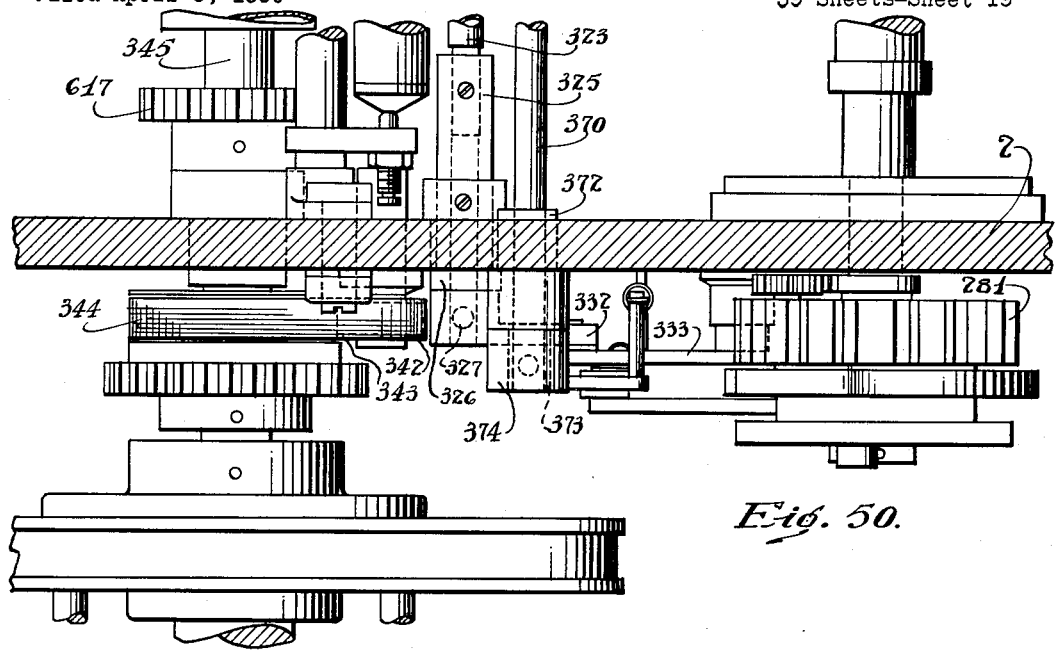
Figure 50 is a horizontal section on line 50—50 of Figure 51, through a portion of the left-hand side plate, showing certain parts in plan, such as the intermittent drive for the feeder shaft, the means for actuating the stop finger supporting shaft and the detector finger shaft.

The sheet detector shaft 370 is journalled at opposite ends in bushings of electrical insulating material, indicated at 371 and 372. Outwardly beyond the left hand side plate 2, and as shown in Figure 50, the shaft 370 carries a collar 374, insulated from the shaft by a split sleeve 373. An arm 375, projecting from the collar 374 overlies a roller 376 on the end of a lever arm 377, pivoted on the stud 334 and having a cam following roller 378 projecting outwardly from its other end, in engagement with the cam 290, secured to the pulley 281, as previously described. As the cam 290 rotates, the rise therein depresses the roller 378, rocks the lever arm 377 in a clockwise direction, lifts the arm 375, against the tension of a spring 379 connected at one end to the arm and at the other end to the machine side frame, and rocks the shaft 370 in a counterclockwise direction. When the rise of the cam 290 leaves the roller 378, the parts oscillate in the opposite direction, under the influence of spring 379, and the shaft 370 is rocked in a clockwise direction.

Mounted upon the detector shaft 370 is a U-shaped bracket 380 (Figures 46 and 47) having apertured forwardly turned ends 381 and 382, through which the shaft extends. A screw 383 extends through an opening in the back of the bracket and has its reduced end slidably disposed in a slot or keyway 384 in the shaft 370 so that the bracket may be moved transversely of the machine along the shaft, but is restrained against rotation with respect thereto.

Surrounding the shaft 370, between the ends 381 and 382 of the bracket 380 is a sleeve 385 of insulating material having a cut-out portion 386 for the accommodation of the screw 383. The sleeve insulates the shaft from the suction feeder side plates 125 and 126, which are disposed in close proximity thereto.

Clamped to the inner surface of the bracket 380 by a nut 387 is a spring detector finger 388, having a forwardly extending U-shaped bend and a rearwardly projecting elongated portion terminating in an upwardly curved end portion, overlying the plate 322 of the stop finger assembly.

Figure 48:
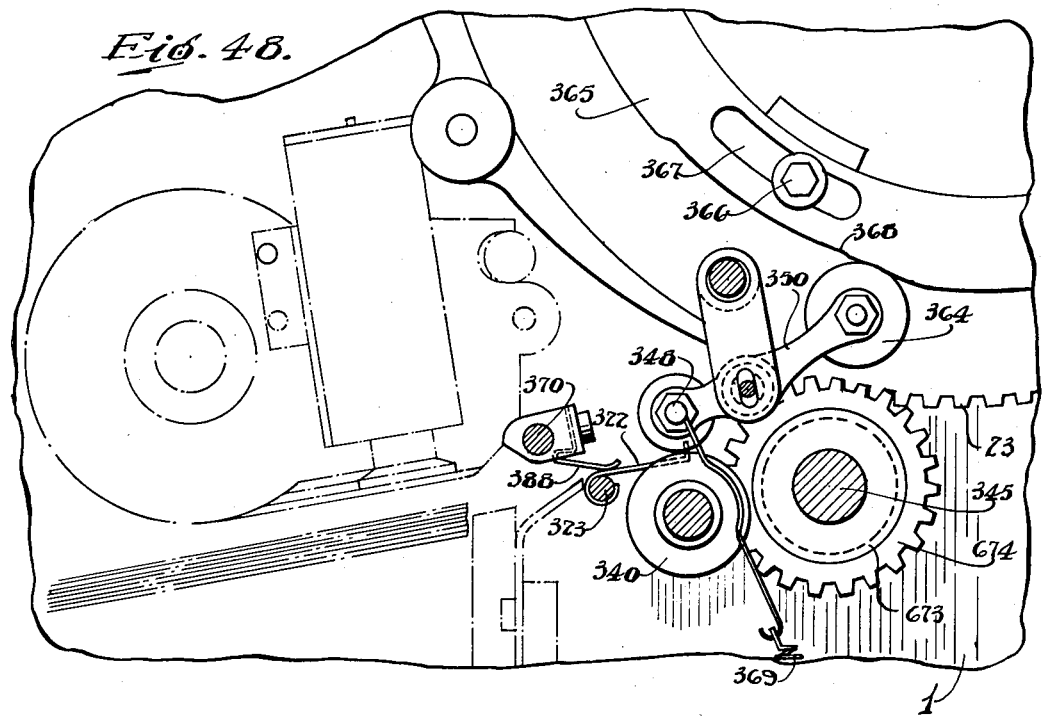
Figure 48 is a longitudinal section through a portion of the machine, showing the upper and lower feed rolls, the stop fingers, and the sheet detector finger.
Figure 49:
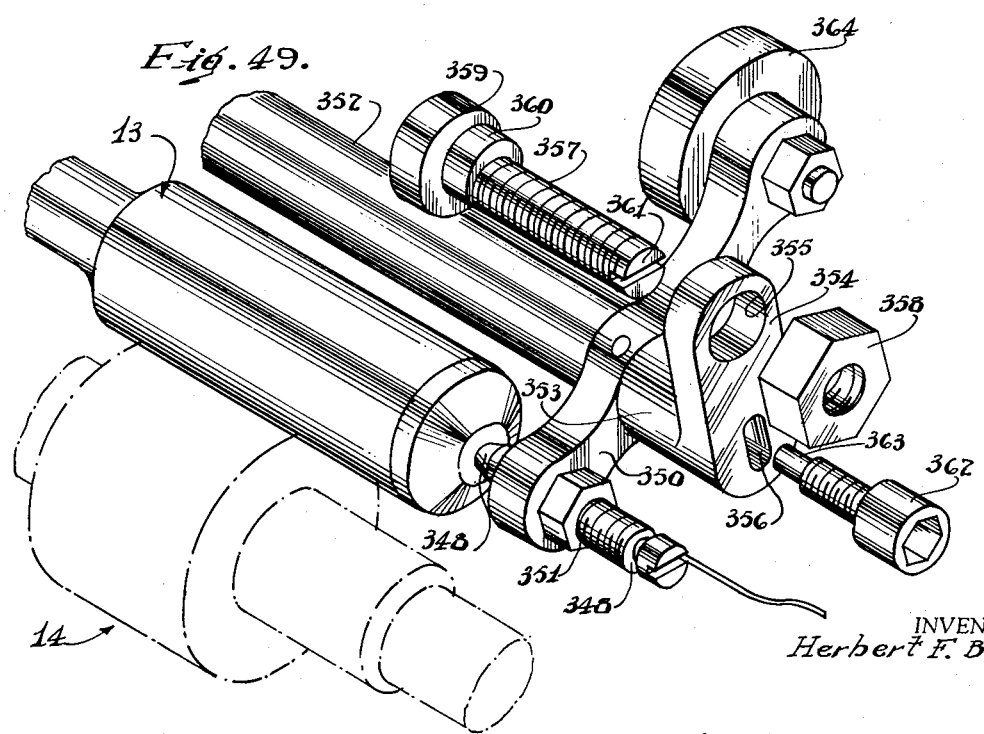
Figure 49 is a partially exploded, isometric view of the means for supporting the upper feed roll.
Figure 51:
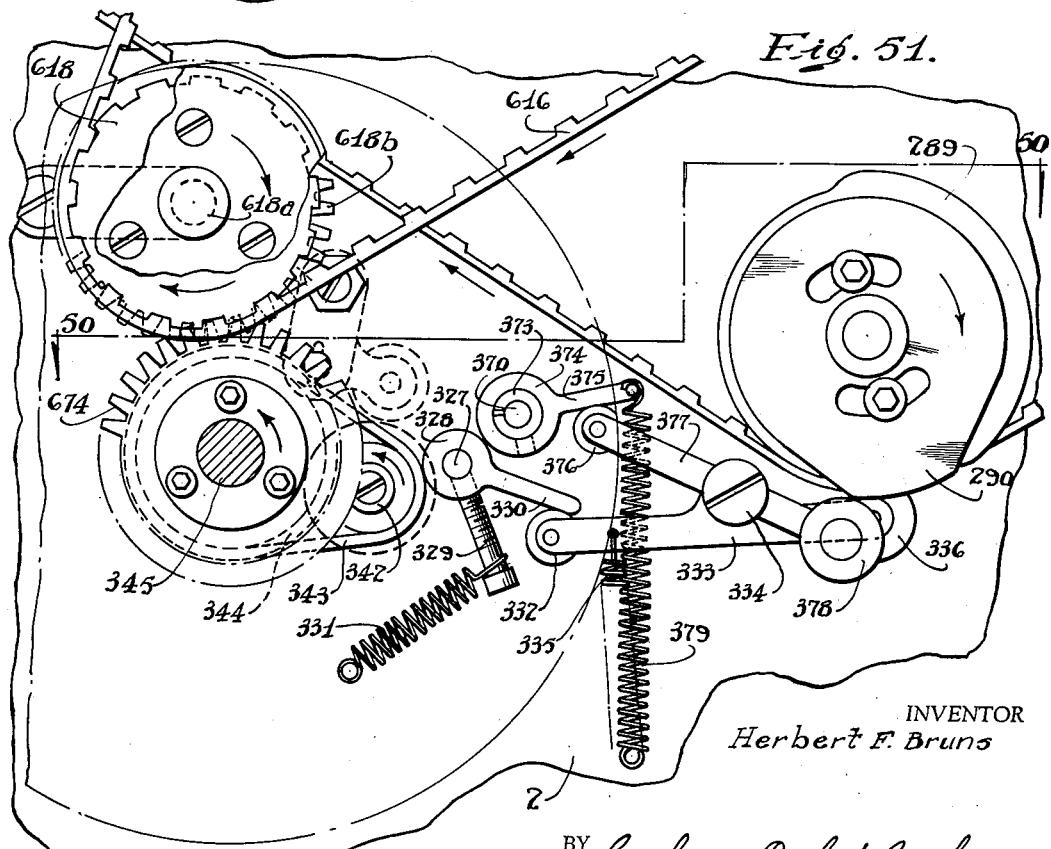
Figure 51 is a side elevation, with certain parts broken away, showing the mechanism illustrated in Figure 50.

Every time the shaft 370 is rocked in a clockwise direction, as viewed in Figure 48, or in a counterclockwise direction in Figure 51, the detector finger 388 swings downwardly and makes contact with a sheet of paper lying on the stop finger plate 322, if a sheet be present, or, if not, makes contact with the plate. When the shaft is rocked in the other direction, the finger is lifted clear of the sheet and plate.

As explained below in connection with the electrical control system for the machine, a circuit is completed whenever the finger 388 makes contact with the plate 322, thereby actuating certain control devices in the machine.

Referring to Figures 1, 44, 45, and 102, a collar 389 is secured upon the right hand end of the detector shaft 370, in electrical connection therewith and spaced from the outer surface of the side plate 1 by the bushing 371 of insulating material. The collar carries an upwardly projecting arm 390, adapted to make electrical connection with a contact element 391 of a switch 392 and to separate the contacts 393 thereof for purposes explained below, in connection with the description of the circuit diagram.

It is thought that the operation of the stop fingers, sheet detector and feed rolls will be apparent from the foregoing description. At the commencement of each cycle of operations, the feed rolls are separated, the stop fingers are raised and the detector finger is raised. The perforated belt associated with the sheet feeder takes a sheet from the suction feet and advances it between the feed rolls, up against the stop fingers. The detector finger is imediately depressed, to "feel" the paper and to perform the additional function of preventing the sheet from bouncing or sliding back, away from the upwardly projecting stop fingers. The stop fingers are next lowered into the spaces between the ruber rings on the lower feed roll. When the fingers reach their lower limit of movement, the upper feed roll is lowered upon the sheet and the detector finger is raised. The sheet is rapidly fed forwardly by the feed rolls into the gripper associated with the main cylinder, as explained below. As a result of the use of the detector finger to hold the sheet in position, the relation of the removal of the stop fingers and the dropping of the upper feed roll is not critical, and the stop fingers can be moved well out of the way before the sheet is propelled forwardly.

Reference is made to Figures 95–98 for the cycle of operations just described.

The sheet counter

In Figure 1, one end of a counter 395 of conventional design is shown, mounted on the side plate, in an aperture therein, so that the digit cylinders thereof project inwardly in the opposite direction, in position to be viewed by the operator. The upwardly spring pressed actuating arm 396 is disposed on the outside of the side plate. The counter is of the type which registers an additional number, each time the actuating arm is lowered. A cylinder 397 secured to the outer face of the side plate 1 has a piston therein, adapted to be drawn downwardly by suction, against the force of the spring in the counter, the piston being connected to a link 398, attached at its upper end to the actuating arm 396. A suction hose 399 connected to the cylinder 397 is in communication with the conduit 218, leading to the atmospheric air relief valve for actuating the feeder. Hence, every time that the valve 219 is closed, to create suction in the sheet feeder and to feed a sheet, a partial vacuum is created in cylinder 397 and the counter is actuated, if a sheet is present, sealing the suction feet. When the vacuum is broken at the end of each feeding cycle, the counter actuating arm rises in position for another counting cycle. A set screw 399' projecting into the passage leading to the cylinder 397 is adjusable, to vary the effective size of the passage to dampen the movement of the piston under the influence of partial vacuum and the return movement, when atmospheric air pressure is restored in the line 399, upon opening of valve 219.

Moisture supplying means and plate moistener

Figure 64:
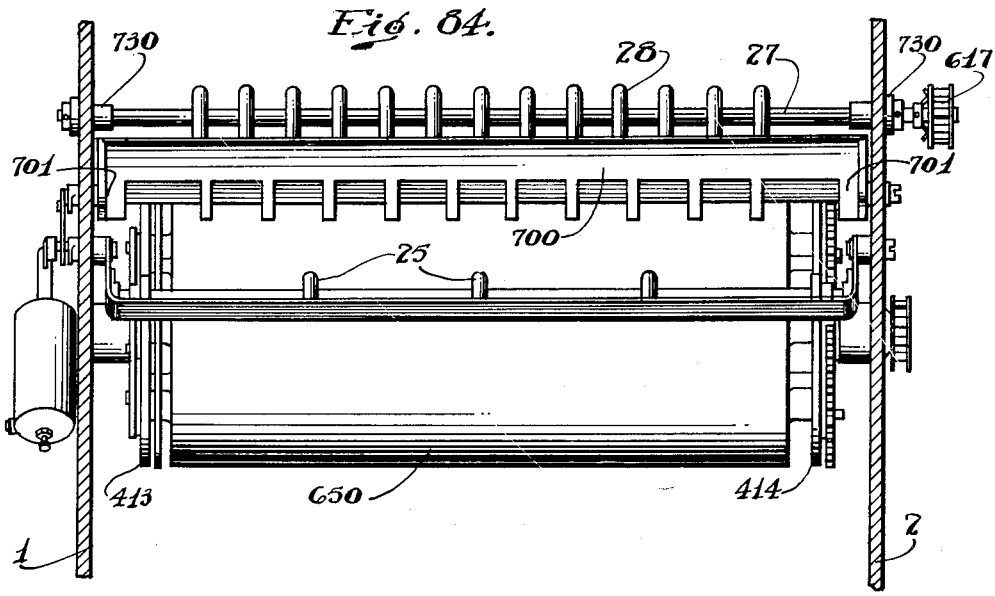
Figure 64 is a section taken on line 64—64 of Figure 63, showing a spring clip latch for one of the ink form rolls.

The means for applying moisture to the lithographic pltae on the main cylinder and for supplying the moisture to that means are best shown in Figures 1, 2, and 52–57. The moisture applying mechanism, indicated generally at 31, comprises a moisture form roll 400 journalled for rotation on a non rotatable shaft 401 having its ends mounted in the notched ends of hangers 402 and 403, pivoted to the side frames as hereinafter explained. The shaft at one end is preferably notched to provide a non-circular section engaging a correspondingly shaped seat in the associated hanger, while the other end of the shaft may be peripherally grooved to engage a seat in the associated hanger. Each hanger carries an outwardly biased leaf spring latch 405, which may be identical to the latch associated with the ink form roll hanger, shown in detail in Figure 64 and described below.

A pin 406 projects outwardly from the upper end of each hanger, to which a tension spring 407 may be attached, to urge the form roll toward the main cylinder. A roller 406' journalled on pin 406, bears against the inner surface of the adjacent side plate.

The moisture form roll 400 comprises an inner metallic tube 408, a cylindrical body 409 of rubber or the like, and a covering 410 of suitable absorbent material. The ends of the tube 408 are closed by tubular plugs 408a, journalled on suitable antifriction bearings, such as needle bearings 408b, surrounding the shaft 401, so that the shaft may be withdrawn by axial movement, toward the right.

Mounted on the tube 408, beyond the ends of the roll body 409, with suitable anti-friction bearings interposed, are a pair of cam following wheels 411, held against axial movement by conventional snap rings 412. Hence, the wheels are free to rotate relative to the moisture form roll 400. The wheels are provided with rubber tires of substantially the same diameter as that of the roll and are positioned to engage the ring cams 413 and 414 on the main cylinder, to move the form roll outwardly, out of contact with the impression segment of the main cylinder so that moisture is not applied thereto. The ring cams are shaped to drop the wheels 411 inwardly, to bring the moisture form roll into contact with the plate on the plate holding segment of the main cylinder as the latter passes the moisture form roll.

The shaft 401 projects with substantial clearance through openings 415 and 416 in the side plates 1 and 2 and on the right hand end carries a knob 417 to facilitate its endwise removal, as hereinafter explained. A small latch lever 419 (Figure 1) is pivoted to the outer face of the side frame and underlies the end of the shaft, the arm being urged by a spring into contact with the shaft, to follow the back and forth movements thereof. A bell crank lever 420, pivoted at 421 to the side plate 1 has a downwardly projecting arm positioned behind an electromagnet 422 and an upper arm, extending upwardly to a point adjacent the upper end of the latch arm 419. When the electromagnet is energized, as shown in Figure 1, the upper arm is raised clear of the latch arm 419; but when the electromagnet is de-energized, the upper arm 420 drops down under spring pressure and, as soon as the latch arm 419 is moved forwardly by the outward movement of the moisture form roll, caused by the cam following wheels 411 riding on the high part of the cams, the end of the upper arm of the bell crank lever 420 drops behind the latch lever 419 and the moisture form roll is prevented from dropping back into contact with the plate, when the dwells of the cams pass the cam following wheels 411.

By reference to Figure 3, it will be noted that the opposite end of the shaft 401 is arranged in the same manner, the parts of the latching mechanism being represented by primed numbers.

The parts are so proportioned that, when the high portions of the ring cams engage the cam following wheels, the ends of the shaft 401 move forwardly a slight distance, even when the roll is latched out, so that the pressure between the end of the latch arm 419 and the end of the bell crank lever is relieved, thereby permitting the bell crank lever to swing to the release position, under the relatively light pull of the electromagnet 422. When the dwells of the cams are opposite the cam following wheels, however, the force of the springs 407 is borne directly by the ends of the bell crank levers 420 and 420', and the electromagnet has insufficient pull to move the bell crank to the release position, until the force of the springs is relieved by the high portions of the cams.

As shown in Figures 52 and 53, the moistener includes a pan or receptacle 425 having a front wall 426, a bottom wall 427, a back wall 428, and end walls 429 and 430. Secured to the back wall is an upwardly and forwardly projecting baffle 431 having its upper edge adjacent the surface of the form roll 400. The baffle 431 joins the rear wall 428 below the upper edge of the latter providing a trough 431' for the reception of any moisture collecting on the rear, upper surface of the baffle. This moisture may be returned to the receptacle through appropriate holes in the baffle, or through spaces between the ends of the baffle and the end walls of the receptacle.

Secured to the inner face of the front wall is an angle strip 432, the free flange of which is provided with a plurality of slots 433. Slidably mounted on the rear face of this flange are a plurality of independently shiftable baffle plates 434, secured in place by pins 435 extending through the slots. The lower edges of the adjustable baffles approach the edge of the fixed baffle 431, to provide a slot, the width of which may be varied from point to point, or closed entirely, by shifting the positions of the baffles.

A cylindrical screen 436, secured at its ends to circular blocks 437 and 438 is mounted for rotation in the receptacle 425. The block 438 is fast on a stub shaft 439 by a right hand screw thread connection. The stub shaft extends through the end wall 430 and has a groove in its end face adapted to engage a transverse pin 440 in a coupling sleeve 441, carried by a stub shaft 442 extending through a bushing in the side plate and carrying a pulley 443 on its outer end. The pulley 443 is connected to the shaft 442 by a one way clutch so that when the pulley is rotated in the reverse direction, the shaft 439 will not be unscrewed from block 438. The inner end of the shaft 439 is reduced as at 444 and serves as the support for an air tube hereinafter described.

As shown in Figure 53a the left hand end 430 of the container 426 carries an outwardly dished baffle 430a, having a central opening through which the shaft 439 extends in closely spaced relation. Any moisture tending to creep along the shaft 439, outwardly through the bearing in the end wall 430, will collect in droplets on the shaft and will drain downwardly when it contacts the baffle 430a. The end wall 430 is provided with an opening 430b, communicating with this space, for the return to the container 425 of this moisture.

The circular block 437 at the right hand end of the cylindrical screen is mounted for rotation upon an air pipe 445, extending through the end wall 429.

Thus, the cylindrical screen is mounted to rotate in the liquid in the trough, the average level of which is indicated at L, Figure 53, so that the liquid is raised by the openings in the screen.

Disposed eccentrically within the cylindrical screen is an air tube 446 having a longitudinal row of perforations 447 therein, directed generally toward the gap between the baffles 431 and 434. At the left hand end, the tube is closed by a plug 448 having a socket in which the reduced end 444 of the shaft 439 is journalled, to support the tube. At its other end the tube is closed by a plug 449 having an opening into which the inner end of the air supply pipe 445 projects in non-rotatable relation. Air is delivered to the pipe 445 by branch 450, to which an air hose 451 is connected. Air is supplied to the latter by a tube 453 (Figure 1) of heat dissipating metal, leading from a valve 454 controlled by a solenoid 454'. Air is delivered to this valve from the main air pressure line 248 (Figure 5) by a hose 455 extending through an opening in the side plate 1 and connected to the main air pressure line 248.

The air spray tube 446 is mounted for rotational adjustment, to direct the jets of air and the moisture blown from the screen more or less toward the gap between the baffle plates, to vary the amount of moisture blown upon the surface of the moisture form roll. The end of the air supply pipe 445 carries a coupling member 456 adapted to make connection with a diametric pin 457 carried by a stub shaft 458 rotatably mounted in the side plate 1 and having its end extending therethrough. Turning movements imparted to the shaft 458 are thus transmitted to the air spray tube 446.

It is important to have the air tube 446 disposed in non-concentric relation to the inner surface of the screen 436, so that the air delivery perforations or jets 447 may be disposed quite close to the screen, while leaving a substantial space between the screen and tube throughout the upwardly moving portion of the screen, to prevent the carrying up of large masses of moistening liquid in said space. In the embodiment shown, the tube is simply mounted eccentrically with respect to the screen, but other arrangements could be employed, such as a tube of oblong cross-section, projecting upwardly from the axis of the screen.

The amount of moisture delivered by the spray device to the moisture form roll may be varied by other means than by changing the angular position of the air spray tube 446. For instance, the present invention contemplates providing a variable drive for the screen cylinder 436, so that its speed of rotation can be varied relative to the speed of the machine as a whole. In such case, the angular position of the air spray tube may be fixed. The amount of moisture delivered to the moisture form roll is thus controlled by the amount of moisture raised by the screen into proximity to the air blast, which is a function of the speed of rotation of the screen.

Another modification is to change the angular position of the receptacle 425 relative to the spraying mechanism, thereby changing the position of the baffles and the slot therebetween relative to the moisture blast or spray, so that more or less of the sprayed material is blocked off and returned to the receptacle. This change of adjustment of the receptacle can readily be accomplished in the form of the invention shown in Figures 52 and 53, as explained below.

A rod 426a, secured to the front wall 426 of the receptacle 425 carries an outwardly spring pressed sleeve 426b adapted to enter a recess 426c in the side plate to hold the receptacle in place. At the inner end of the sleeve is a knurled flange 426d, by which it may be retracted, against the force of an enclosed spring bearing against the end of rod 426a, for withdrawal from the recess 426c. Another recess 426c' may be provided in the side plate so that, when the trough as a whole is swung forwardly about the axis of shaft 439 and pipe 445, it may be held in the desired position, to facilitate access to the adjustable baffles 434, for adjustment of the latter.

If the angular position of the receptacle 425 is to be adjusted, to control the amount of moisture applied to the moisture form roll, leaving the air spray tube 446 in fixed position, the side plate 2 may be provided with a plurality of closely spaced notches, arranged along an arcuate path, and the end of the spring pressed sleeve 426b may have a knife-like end, adapted to be received in any one of these notches, depending upon the position of adjustment of the receptacle.

Referring to Figures 55-57, the shaft 458 has secured to its outer end, by a set screw or the like, a collar 459 provided with a radially projecting arm 460, by which the shaft may be oscillated. The arm carries a pin 461 having pivotal connection with a piston rod 462 at one end, and projecting inwardly at the other, to lie in an arcuate notch 463 formed on the periphery of a gear 464 loose on the shaft 458 and spaced from the side plate 1 by a nut 465. It should be noted that the hanger 402 is pivotally mounted on stub shafts 458.

A pinion gear 466 in mesh with the gear 464 is secured to a shaft 467 mounted for rotation in bracket plates 468 and 469, spaced apart by a sleeve 470 surrounding a cap screw 471, threaded into the side plate 1. Also mounted on the shank of this cap screw is a spacer sleeve 472, a dial plate 473, and a spring detent 474.

Cooperating with this spring detent is a peripherally notched disk 475, fast on the pinion carrying shaft 467. A pointer knob 476 is secured to the outer end of the shaft 467 in cooperative relation to the dial plate 473.

The piston rod 462 extends into an air cylinder 477, pivotally secured to the side plate 1 by a pin 478, and is connected to a piston 479 therein. A spring 480, bearing against the cylinder head 481 at one end and against the piston at the other tends to retract the piston to the position shown in Figure 55. However, when air is delivered to the cylinder through a variable orifice 483 by a hose 482, the piston is advanced, the arm 460 is moved forwardly and the stub shaft and air spray tube are rocked in a counterclockwise direction, as viewed in Figures 53 and 55.

Air is delivered to the flexible conduit 482 as follows, referring to Figures 1, 2, 5 and 58: From the air pressure line 253 (Figure 5) on the delivery side of the feeder control valve 252, there is a branch pipe 486, leading toward the left, behind the control panel 40 to a valve 487 (Figure 58) having a pushbutton 488 projecting through the control panel. The valve comprises a cylindrical casing 489 having a valve body 490 therein, normally held in spaced relation to the inlet opening 491 and uncovering a discharge opening 492, formed in the casing side wall and communicating with a pipe 493 which may be connected to or constitute a continuation of the conduit 482, which delivers air to the cylinder 477. Manifestly, when the button 488 is depressed, the supply of air through pipe 486 to pipe 493 is cut off and air from the cylinder may exhaust through pipes 482 and 493, for escape above the valve body 490, through the space surrounding the button 488.

It will be apparent that, when the feeder valve 252 is opened, as previously explained, to deliver air under pressure to the feeder latch release cylinder 241, air is also delivered through the valve 487 to the cylinder 477, thereby advancing the piston rod 462 toward the left and rocking the shaft 458 counterclockwise to bring the moisture spray down to normal, in accordance with the setting of pointer 476. Prior to the opening of the feeder valve, however, no air is delivered to the cylinder 477 and the moisture spray is at the increased setting, since the piston 479 is withdrawn by the spring 480 and the shaft 458 is rocked to its right-hand limit.

A plurality of radial bores 484 may be formed in the bottom of the arcuate notch 463, adjacent to, but in successively spaced relation from the right hand end of the notch, behind the pin 461, to receive an abutment pin 485 in one of a plurality of positions. This pin limits the extent to which the arm 460 may be rocked in a clockwise direction by the piston 479 and piston rod 462, under the influence of spring 480.

In the normal operation of the machine, air is delivered to the cylinder and the piston rod and arm 460 are moved to the left until the pin 461 strikes the left end of the peripheral notch 463 in the gear 464. The setting of this gear is controlled by the knob 476, working through the pinion 466, the setting being maintained by the spring detent 474 locking in the selected notch in plate 475. As the air spray tube 446 is swung more in a counterclockwise direction, a greater portion of the moisture, sprayed from the screen by the jets of air, will be intercepted by baffle plates 434 and returned to the supply, so that less moisture is applied to the form roll. Conversely, as the air spray tube is rotated to the right, in a clockwise direction, more of the moisture will pass directly through the gap between the baffles and the supply of moisture to the form roll will be increased. Thus, by changing the position of the gear 464, the normal position of the air spray tube, rocked toward the left by the air piston may be controlled.

When the air supply to the air cylinder is cut off, however, the spring 480 retracts the piston and moves the arm 460 toward the right, until the pin 461 strikes the pin 485 or the right hand end of notch 463, thereby shifting the orifices 447 in the air spray tube 446 more nearly into alignment with the gap between the baffles, so that an increased supply of moisture is sprayed upon the form roll.

If, during a normal printing operation, it is desired to increase the amount of moisture applied to the form roll, temporarily, with a booster action, this may be accomplished by simply pressing the button 488. This cuts off the supply of air to the cylinder 477, exhausts the air therein, and permits the spring 480 to retract the piston and turn the air spray supply tube to the increased position.

The modified form of moistener, shown in Figure 54, differs from the one described above primarily in the construction of the moisture holding pan or receptacle 425'. The object of the modification is to prevent the possibility of droplets of moisture escaping between the lower baffle and the roll from contacting the main cylinder or dropping downwardly onto mechanisms positioned therebelow. As shown in Figure 54, the rear wall 428' extends rearwardly a substantial distance beyond the vertical plane passing through the axis of shaft 401', and the fixed baffle 431' is less steeply inclined, thereby forming a larger moisture collecting trough, of V-shaped cross-section, as indicated at 495. One or more apertures 496 may be formed adjacent the bottom of this trough, in the fixed baffle 431', for the return to the receptacle 425' of collected moisture, or the liquid may return through spaces between the ends of the baffle and the end walls of the receptacle.

The front wall 426' is constituted by a lower, fixed section and an upper section 426", connected thereto by a hinge 497. The angle strip 432' is secured to the inner face of the upper, hinged section and carries a plurality of adjustable baffles 434' as previously explained. The container 425' is suitably supported from the main side plates, for instance, by angle strips 498, instead of by the pin and sleeve construction, 426a, 426b of the first form.

Access may be had to the adjustable baffles 434' by swinging the upper front wall section 426" forwardly on hinge 497. Preferably, the section 426" is maintained in the desired position by a spring pressed sleeve similar to the one described above and indicated at 426b, adapted to be projected into one or another of a pair of recesses formed in the side plate 2, to hold the section open or closed.

Any moisture, in the form of minute droplets which tends to pass between the baffle 431' and the lower surface of the roll, as a result of air drafts or from any other cause, will impinge against the upwardly extending portion of the rear wall 428', the edge of which is disposed in closely spaced relation to the roll. This moisture will flow into the trough 495 and will be returned to the receptacle, as described above.

An important advantage of the moistener of the present invention are the elimination of the usual liquid fountain, fountain roll, and distributing rolls and the substitution therefor of a single moisture form roll and the moisture spraying device just described. The rotating screen has the important advantage of acting as a metering device, to bring into spraying position, an adequate supply of liquid directly in proportion to the speed of operation of the machine and the speed of rotation of the screen. As a consequence, when the machine is speeded up or slowed down, no adjustment in the setting of the moistener is required, since the amount of liquid blown from the screen is in direct proportion to the speed of the machine, and the fraction thereof sprayed upon the moisture form roll remains constant, in accordance with the setting of the air spray tube relative to the baffles.

Changes in adjustment of the position of the air spray tube in the moistener result in a substantially immediate response in the application of moisture to the form roll and to the plate and in the effects in the printing operation, as contrasted with the delayed action and over-correction of moisteners of the prior art.

Another advantageous feature results from the fact that the amount of moisture applied to the form roll and to the plate can be varied in amount throughout an infinite range of adjustment, from end to end of the roll, by shifting the positions of the adjustable baffles. This is a marked improvement over prior construction where it was merely possible to block off a fixed amount of moisture to certain sections of the moisture form roll.

Automatic means are provided for supplying the receptacle 425 or 425' with moistening solution. Preferably, the arrangement is such that the liquid is delivered, in a substantially predetermined amount, every time the feeder is placed in operation. The amount so delivered is more than sufficient to supply the requirements of the machine for printing the maximum number of sheets which can be placed on the table at a time. When the supply of sheets is exhausted and the feeder stopped, any excess liquid remaining in the receptacle above the supply opening described below, will drain back to the supply container. When a new stack is placed on the table, and the feeder again started, another quantity of moistening liquid will be delivered to the receptacle.

As shown in Figure 1, an inverted container 500 is removably secured to a closure cap 501 carried by the side plate of the machine. Within the container is a collapsible bulb 502 having its interior in communication with a pipe 503 extending in sealed relation through closure 501. A second pipe 504 communicates through the closure 501 with the space within the container, surrounding the bulb 502. The latter pipe is connected to the air pressure line 253 leading from the feeder control valve to the latch release cylinder 241, as previously described.

The first mentioned pipe 503 communicates with the interior of a moisture supply receptacle 505, through a closure 506, so that air under pressure may be delivered from the interior of the bulb 502, to the space in the receptacle above the liquid therein. A liquid delivery pipe 507 extends through the closure 506 to a point near the bottom of the receptacle, below the liquid therein. The pipe 507 extends through an opening in the side plate 1 and is connected to or constitutes a continuation of a tube 507a (Figure 52) leading to the trough 425 through an opening 507'. The closure 506 may be provided with a filling opening, normally closed by a supplemental cap 508.

In operation, whenever the feeder is started, compressed air is delivered by pipe 504 to the space within the airtight container 500, exteriorly of the bulb 502, thereby collapsing the bulb and maintaining it collapsed, so long as the feeder is in operation. When this collapsing occurs, a definite amount of air is delivered from the bulb to the receptacle 505, above the liquid level therein, thereby forcing a predetermined amount of liquid through the pipe 507, tube 507a, and opening 507' into the receptacle 425 of the moistener, to bring the liquid level above the level of the opening 507'.

When the feeder is turned off, the compressed air in the container 500 surrounding the bulb escapes to atmosphere and the bulb expands, thereby withdrawing a certain amount of air from the receptacle 505. Any liquid in the moistener receptacle 425 above the level of delivery opening 507' will flow back to the supply receptacle 505 and an amount of air, corresponding to the amount of liquid consumed in the preceding printing operation, will flow into the receptacle, bubbling up through the liquid therein from the lower end of pipe 507.

*The ink fountain and the ink applying mechanism*

Referring to Figures 2 and 59–76, the inker of the present invention, indicated generally at 32 in Figure 2, comprises a continuously rotating fountain roll 510, a swinging ductor roll 511, a rider roll 512, with which the ductor makes periodic contact, a longitudinally reciprocating oscillator roll 513 and an ink form roll 514, arranged to make rolling contact with the lithographic master plate on the main cylinder and to be cammed out of contact with the platen segment of the main cylinder.

The fountain roll 510 (Figures 59, 60, 62 and 66–68) comprises a cylindrical rubber body 515 of relatively hard rubber, vulcanized to a shaft 516, having its ends journalled in enlarged bushings 517, mounted in openings 518 in the side frames 1 and 2, of sufficient size to permit removal of the roll therethrough, when the bushings are removed.

The fountain roll is continuously driven from the left hand end by a pulley, one way clutch and phase compensating device, represented generally at 520 in Figure 74 and described in detail below.

The ink fountain comprises a pair of end plates 521 having recesses in their rear ends, as indicated at 522, shaped to closely fit the roll shaft 516. To the outer surface of each end plate, there is secured a supporting plate 523, having a downwardly facing socket 524, arranged to engage a post 525, projecting inwardly from the adjacent main side frame, to support the fountain as a whole.

Connected between the fountain side plates 521 is an angle frame member 526, having a vertically extending web 527 and a horizontal, rearwardly extending web 528. Pivotally mounted on pins 529 carried by the fountain end plates 521 is a rigid bracket 530 having a rearwardly projecting lip 531, upon which a plurality of short rollers 532 are disposed in endwise abutting alignment. The bracket 530 has a downwardly inclined upper surface, upon which a fountain blade 533 is clamped by a strip 534 and a plurality of screws 535. A plurality of blade adjusting screws 536 extend through enlarged openings 537 in the web 527, into tapped bores in the bracket 530, with their reduced ends 538 bearing against the abutting ends of each pair of rollers 532, as shown in Figure 66. This arrangement is much preferred, as compared to having adjustment screws bearing against the mid-points in the lengths of the rollers, since it permits the rollers to rock or swing slightly from the points of application of pressure by the screws. This pressure is applied to the blade more nearly at a point and distributed laterally therefrom, instead of being applied along a line equal to the length of the roller. In the latter arrangement adjustment of adjacent rollers is required to compensate for the adjustment of one, whereas a finer adjustment from point to point along the length of the blade is possible in accordance with the present arrangement.

Threaded in a centrally positioned bore in the web 527 of the frame 526 is a master adjusting screw 539 having its end 540 bearing against the bottom of a recess formed in the forward surface of the bracket 530. Rotation of the screw 539, by the handle 541 swings the bracket 530 as a whole about the pivot pins 529, to move the blade 533 toward or away from the roll 515, for master adjustment of the thickness of the ink film delivered to the roll. Adjustment of the screws 536 provides a fine adjustment, from point to point, longitudinally of the blade and roll.

The ductor roll 511 comprises a cylindrical rubber body vulcanized upon a shaft 542 having its ends journalled in the upwardly projecting legs 543 of an inverted U-shaped bracket 544, the central portion of which carries an upwardly projecting U-shaped clip 545, by which the bracket is secured to an oscillating shaft 546, by a screw 547. The reduced, right hand end of the shaft 542 is journalled in a circular bore in the right hand leg 543, while the left hand end is removably held in place in an upwardly facing seat 543a of the left hand leg by a spring pressed, pivoted hook 543b, Figure 61. The shaft 546 extends with clearance through elongated openings 548 in the legs 543 and has its left hand end journalled in a bushing carried by the side plate 2 and its right hand end extending through a bushing carried by the side plate 1. Fixedly secured upon the outwardly projecting extremity of shaft 546 (Figures 71 and 72) is a collar 549, having an integral upwardly extending finger 550, to which a leaf spring 551 may be attached. Loose upon the ductor bracket supporting shaft 546 is a second collar having an upwardly projecting arm 552 and a downwardly projecting finger 553. The arm 552 carries, at its upper end, a cam following roller 554 and a pair of spaced pins 555 and 556, disposed on opposite sides of the upper end of the finger 550. A tension spring 557 connected between a pin 558 on the side plate 1 and the pin 556 tends to swing the arm 552 forwardly or to the left as viewed in Figure 72.

Fast upon the fountain roll shaft 516 is a spur gear 559, having a predetermined number of teeth as explained below. Above the gear 559 and mounted upon the side plate 1 is a stub shaft 560, upon which is journalled a gear 562, in mesh with gear 559 and having one tooth less than the latter for purposes explained below. Secured to the gear 562 and journaled for rotation on the stub shaft 560 is a cam 563, having a peripheral cam surface, and a barrel cam 564 having a cam groove 565 in its surface. The first cam 563 is in alignment with the cam following roller 554 and is arranged to swing the arm 552 rearwardly, toward the right, against the action of spring 557, the latter tending to swing the arm forwardly when permitted by the dwell in the cam. Rearward movement of the arm 552, to the right in Figure 72, is transmitted by pin 556 and leaf spring 551 to the finger 550 and collar 549, fast on the rock shaft 546. As a consequence, the bracket 544 is swung rearwardly, to move the ductor roll 511 from a position in rolling contact with the fountain roll, to a position in contact with the rider roll 512. Since the cam following arm 552 is connected to the rock shaft 546 through spring 551, the ductor roll is swung rearwardly with resilient pressure against the rider roll, but this is not essential, as the rider roll may have capability of sufficient rearward movement to accommodate slight over-travel of the ductor roll, should a rigid connection be desired.

The ductor roll is swung forwardly into contact with the fountain roll under the resilient force of the spring 557.

As best shown in Figure 72a a bell crank latch lever 566 is pivoted to a pin carried by the side frame, with its lower leg 567 arranged to be swung upwardly by a leaf spring 568, into the path of swinging movement of the finger 553 projecting downwardly from the cam following arm 552. The upwardly projecting arm 569 of the bell crank is disposed adjacent the core of an electromagnet 570 mounted upon the side frame 1. When the magnet is energized, as in the normal operation of the machine, the bell crank is swung in the counterclockwise direction, against the force of spring 568, to lower the latch arm 567 out of the path of movement of the finger 553 so that the ductor roll may swing back and forth. When the electromagnet is de-energized, however, the latch arm 567 swings upwardly into the path of movement of the finger 553, when permitted to do so by the rearward swinging movement of the ductor roll and the forward swinging movement of the finger, to lie behind the finger and to latch the ductor roll out of contact with the fountain roll.

The parts are so proportioned that, during each rotation of the cam 563, the finger 553 is moved slightly out of contact with the end of the latch arm 567 to relieve the pressure thereon, so that the magnet 570 may move the latch to the inoperative position without the necessity of overcoming the frictional resistance to movement of the engagement between these parts.

The next roll in the train of rolls is the rider roll 512, which comprises a cylindrical rubber body vulcanized upon a shaft 571. The shaft ends are socketed and have hardened steel balls 572 fixed therein, to act as thrust bearings working against hardened steel disks 573 (Figure 62) carried by the inner faces of the main side plates. Each end of the shaft is supported in an upwardly facing seat 575 formed in an arm 576 projecting from a bracket 577, suspended from a sleeve 578 or 579 surrounding a shaft 580, the latter being mounted for rotation and for reciprocating movement as hereinafter explained.

Secured to each bracket 577, at opposite sides of the machine is an outwardly projecting angle member, providing an apertured plate portion 581, having a bearing aligned with a similar bearing in an opening in the lower end of bracket 577.

The oscillator roll shaft 582 is mounted for easy removal from the machine. Since the connector is the same at both ends, only one is shown in Figure 69. The shaft end is connected to a stub shaft 582' journalled in bearings carried by the hanger bracket 577 and the plate element 581 associated therewith. The connection comprises a sleeve 583 slidably mounted on the reduced end of the shaft 582, spring pressed outwardly, and having diametric notches in its outer end face, engageable with the ends of a diametrically extending pin carried by the stub shaft 582'. The oscillator roll may be removed, by simply shifting the two sleeves 583 toward the ends of the roll body, so that the sleeves clear the stub shafts 582'.

Between the bracket arm 577 and plate 581, and fast on the stub shaft 582' is a small pulley 582a (Figure 69), about which a toothed timing belt 584 is trained. Each belt is driven by a similar pulley 585, fast on the shaft 580. A pin 586 projects outwardly from the face of the right-hand plate 581 and is received in an arcuate slot 587 in the side plate 1, in position to be engaged by a latch 588 (Figure 70) to hold the bracket 577 and the oscillator roll 513 in an upwardly swung, inoperative position, when desired.

The two sleeves 578 and 579 surrounding the shaft 580 are normally disconnected from each other, for slight relative rotation, to the end that the oscillator roll 513 may find its own level relative to the form roll 514 by slight relative movement of the ends thereof. However, a clamping sleeve 589 may be drawn up by screws 590 to clamp the sleeves together, so that they act as one. This is advantageous in certain cases for instance, when a short form roll is used with a longer oscillator roll of standard length.

The ink form roll 514 (Figure 60) comprises a rubber cylindrical body, vulcanized upon a tubular shaft 591, journalled by means of roller bearings or the like upon a non-rotatable shaft 592, in substantially the same manner as described above in connection with the moisture form roll. The non-rotatable shaft is carried by downwardly extending hangers 593 (Figure 63) pivotally secured to the side plates by shouldered studs 594 having threaded connection with the side plates. The shaft 592 at one end has four notches formed therein providing two pairs of oppositely facing flats to engage the edge surfaces of a recess 595 in the hanger, while the other end of the shaft may be peripherally grooved for the same purpose.

Depending from the end of each hanger 593 is a pin 596 carrying a roller 597 engaging the inner face of the adjacent side plate. A spring 598, connected at one end to the side plate and at the other to each pin 596 tends to swing each hanger rearwardly, toward the main cylinder.

Secured to each hanger 593 by a rivert or the like is a leaf spring 600, having an aperture therein, adapted to latch over a pin 601 projecting inwardly from the side plate and positioned to engage the aperture when the hangers are swung forwardly, out of engagement with shaft 592, to facilitate removal of the shaft 592 through the side plate and removal of the form roll 514 from the machine. The spring latch has an inwardly and forwardly turned end 600', adapted to act as a finger piece, so that the latch may be manipulated as desired.

Journalled upon each end of the hollow shaft 591 of the ink form roll is a rubber-tired, cam following wheel 599 (Figure 60) in position to be engaged by the ring cams 413 and 414 at each end of the main cylinder, as previously described in connection with the moisture form roll.

The ends of the non-rotatable, form roll supporting shaft 592 extend through enlarged openings in the main side plates 1 and 2, and the right-hand end is provided with a knob 625 (Figure 60) to facilitate withdrawal of the shaft when the hangers are retracted. Referring to Figures 1 and 3, electromagnetically controlled latches are provided at opposite ends of the shaft 592, to lock out the form roll when sheets are not being fed or when a sheet is skipped. The latches are substantially identical to the corresponding elements associated with the moisture form roll shaft. As shown in Figure 1, a small latch lever 626 is pivoted to the outer face of the side frame and is positioned behind the end of shaft 592, the arm being urged by a spring into contact with the shaft to follow the back and forth movements thereof. A bell crank lever 627, pivoted to the side plate has a downwardly projecting arm positioned behind an electromagnet 628 and an upper, forwardly and downwardly inclined arm having its end adjacent the upper end of the latch arm 626. When the electromagnet is energized, as shown in Figure 1, the upper arm is raised clear of the latch arm 626; but when the electromagnet is de-energized, the upper arm drops down under spring pressure and drops behind the latch lever 626, as soon as the latch arm 626 is moved forwardly by the outward movement of the ink form roll. Hence, the ink form roll is prevented from dropping back into contact with the plate, when the dwell of each ring cam passes the cam following wheel.

By reference to Figure 3, it will be noted that the opposite end of the shaft 592 is arranged in the same manner, the parts of the latching mechanism being represented by primed numbers.

Adjustable eccentric stops 629 and 629' may be secured to the side plates, behind the latch levers 626 and 626', to limit the inward movement of the form roll under the influence of springs 598, thereby to control the effective pressure between the form roll and the plate.

As previously described in connection with the moisture form roll, the parts of the latch-out mechanism are so proportioned that, when the high portions of the ring cams engage the cam following wheels, the ends of shaft 592 move forwardly a slight distance, even when the roll is latched out, so that the pressure between the end of the latch arm 626 and the end of the bell crank lever is relieved, thereby permitting the latter to swing to the release position under the relatively light pull of the electromagnets 628 and 628'. When the dwells of the cams are opposite the cam following wheels, however, the force of the springs 598 is borne directly by the ends of the bell crank levers and the electromagnet has insufficient force to swing the bell cranks to the release position, until the force of the springs is relieved by the high portions of the cam. This arrangement prevents the ink form roll from dropping in, except as controlled by the ring cams.

Secured to the outer face of the right-hand side plate 1 (Figures 71 and 72) are outwardly projecting upper and lower bearing brackets 602, 603, in which a substantially vertical shaft 604 is mounted. On the shaft 604 is a cam following lever 605, having a forwardly projecting arm 606, carrying on its end a spherical roller 607, disposed in the cam groove 565. The other end of the lever is bifurcated to provide parallel legs 608 and 609, having recessed ends receiving pins 610 and 611 projecting outwardly from the bushing 612, disposed between collars 613 and 614, fast on the shaft 580, which supports the oscillator roll bracket. Hence, as the cam 564 rotates, the cam following lever 605 is oscillated and the shaft 580 is reciprocated longitudinally. Since the brackets 577, secured to the sleeves 578 are constrained to reciprocate with the shaft 580 by the pulleys 585, set screwed to the shaft, the brackets are reciprocated with the shaft 580, thereby imparting reciprocating motion to the oscillator roll 513. The rider roll 512, however, does not partake of this movement, since it is restrained by the thrust balls 572, bearing against the hardened plates 573 on the side frames.

As shown in Figure 60, the shaft 580 has fixed upon its left hand end, a toothed and grooved pulley 615, of extended axial length. A Gilmer timing belt 616 (Figure 3) is trained about the pulley 615 and also about flanged pulleys 617 and 618, the latter of which constitutes the drive for rotating the shaft 580. In operation, the belt travels in a fixed path, as determined by the flanges on the axially immovable pulleys 617 and 618, and the elongated pulley 615 moves axially with respect to the belt, this movement being readily permitted by a creeping action between the pulley and belt.

The driving pulley 618 for the belt 616 is journalled upon a stub shaft 618a, mounted in a bracket secured to the side frame 2 and having fixed thereon, in outwardly spaced relation to the pulley, a gear 618b, in mesh with a gear 674, described below, which is fast on the main drive shaft 345. Counterclockwise rotation imparted to the main drive shaft is converted through the gears to clockwise rotation of the pulley 618 and, by the belt 616, to pulleys 617 and 615, reference being had to Figures 3 and 51.

In the operation of the inker, continuous rotation is imparted to the fountain roll shaft in a counterclockwise direction (Figures 59, 63, 67 and 68) by the combined pulley, phase corrector and one-way clutch mechanism 520. The pulley associated with this mechanism has an odd number of grooves, one more than a multiple of the grooves on the pulley 281 and the pulley 620, fast on the main cylinder shaft, about which the belt 280 is trained. Hence, the fountain roll is rotated out of phase with the machine.

The gear 559 on the fountain roll shaft 516 has one more tooth than gear 562, with the result that the latter gear and the cams rotatable therewith are brought back into phase with the other instrumentalities in the machine.

For instance, pulley 620 has 16 grooves; the pulley in phase corrector 520 has 33 grooves; gear 559 has 33 teeth; and gear 562 has 32 teeth.

Cam 563 swings the ductor roll back and forth in phase with the machine but out of phase with the fountain roll so that it does not roll in contact with the same portion of the fountain on successive revolutions of the latter. Cam 564 reciprocates the oscillator in phase with the machine so that it is moving in the mid-portion of its travel during the transfer of ink by the form roll to the lithographic plate.

The ductor roll is driven, first by contact with the fountain roll at a relatively slow speed and then by contact with the rider roll 512 at a relatively rapid rate, corresponding to the peripheral speed of the main cylinder.

The rider roll is driven by contact with the oscillator roll and the latter is positively driven, at the peripheral speed of the main cylinder, by the belt 584, receiving motion from the pulley 585 on shaft 580.

The form roll 514 is driven by contact with the oscillator roll at the peripheral speed of the plate on the main cylinder so that the form roll is rotating at the proper speed when it contacts the plate. When the cam following wheels 599 engage the ring cams 413 and 414 and move the form roll outwardly, to clear the paper holding segment of the main cylinder, the form roll continues to be driven by the oscillator roll. The oscillator roll is moved outwardly as indicated in an exaggerated manner by the broken lines in Figure 63, but, since the pivot points of the hangers for the two rolls are closely spaced together, there is no appreciable skid or slippage between the rolls, during outward and inward movement of the oscillator roll. The rider roll moves upwardly during this retraction of the form roll. When the form roll moves back into contact with the plate, its peripheral speed is still the same as that of the positively driven oscillator roll and that of the plate, so that skidding between the form roll and the plate is eliminated.

The inking mechanism is so timed with respect to the remainder of the machine that the main cylinder makes approximately two revolutions for one revolution of the fountain roll. Hence, the ductor roll supporting bracket, which has its swinging movements timed substantially with the fountain roll, makes one complete cycle of movement, back and forth, for two revolutions of the main cylinder. Thus, the ductor roll is in rolling contact with the fountain roll throughout nearly one revolution of the main cylinder and is in rolling contact with the rider roll during the next revolution of the main cylinder. As the ductor swings away from the fountain roll and contacts the rider roll, the leading edge of the lithographic plate may be about in position to be contacted by the form roll.

Referring to Figure 63, the ductor roll 511 makes rolling contact with the fountain roll 510 throughout nearly 180° rotation of the latter. Since the fountain roll rotates counterclockwise, the ductor roll when in contact therewith rotates clockwise. The blade associated with the fountain is set to deliver to the fountain roll a thin film of ink of substantially the thickness desired on the form roll.

When the ductor roll swings rearwardly into contact with the rider roll, its direction of rotation is reversed, since the rider roll rotates in a clockwise direction, and its speed is greatly accelerated, so that it makes several complete rotations in contact with the rider roll, thereby transferring ink to the latter and smoothing out the film. The rider roll derives its rotation from the positively driven oscillator roll and transfers the film of ink thereto, further smoothing out and breaking down the ink as a result of the rotation and axial reciprocations of the oscillator.

The positively driven oscillator roll drives the form roll and transfers ink thereto. The pressure between the oscillator roll and the form roll is the resultant of the weight of the supporting brackets and the rider and oscillator rolls, and the driving force imparted by the belt 584 to the oscillator roll. Rotation of the oscillator roll is resisted by the ink between the latter and the form roll and rider roll. This resistance to rotation increases in accordance with the thickness of the film and the tackiness of the ink. Since the belt is driven in a counterclockwise direction (Figure 63) about the upper pulley on a fixed axis, the tendency resulting from this resistance to rotation is to swing the bracket 577 and the oscillator roll in a counterclockwise direction about the axis of the upper shaft 580; or, in other words, to swing the oscillator roll forcefully into contact with the form roll. This arrangement results in an automatic increase in the rolling contact pressure between the oscillator roll and the form roll when the thickness of the ink is increased, to assist in breaking down and distributing the ink being transferred.

The ink transferred by the oscillator roll to the form roll in a thin film is applied by the latter to the lithographic plate on the main cylinder, but a buildup of ink, beyond the desired amount determined by the proper setting of the fountain blade, on the form roll is impossible. Prior to printing, the rolls are inked while the form roll is out of contact with the plate. The ink will be fed until a balanced condition, in accordance with the adjustment of the fountain blade, exists, in which all of the rolls have a film of ink of the same thickness thereon. When printing commences, ink is taken from the form roll at areas corresponding to the printed image on the plate, thereby disturbing the balance. The balance, however, is continually restored by the transfer of additional ink to the form roll, from the other rolls; but it is impossible to build up excessive amounts of ink on the form roll in areas where no ink is transferred to the plate, for instance at the ends of the roll, since the thickness of the film on the form roll cannot exceed that of the film on the fountain roll.

If the ink fountain has been adjusted, for one reason or another, to deliver too thick a film the situation may be quickly remedied, by increasing the pressure between the blade and the fountain roll, thereby reducing the thickness of the film on the fountain roll. This action again results in an unbalanced condition in the system, and ink will actually be fed back from the ductor roll to the fountain roll and the fountain; from the rider roll to the ductor roll; from the oscillator roll to the rider roll; and from the form roll to the oscillator roll, until a condition of balance is again established, in which all of the rolls have a film of a thickness corresponding to the new setting of the blade. This automatic feed-back of the ink is a feature of major importance and results from (*a*) the delivery of a relatively thick film of ink to the continuously rotating fountain roll and (*b*) the relatively long period of rolling contact between the ductor roll and the fountain roll and rider roll, respectively.

*Phase correcting mechanism*

It is often desirable or necessary to rotate the machine, by hand, in a reverse direction, for instance, when bringing the main cylinder to a position to remove and apply master sheets or plates. It is imperative, however, that the ink fountain roll never be rotated in the reverse direction, since if this were done, the thick, heavy ink in the fountain would be carried out of the fountain and spilled upon the ductor roll and on the feed table, positioned therebelow. Hence, a one-way clutch must be provided, between the fountain roll and its driving means. However, if a simple clutch were provided, of the type which might make engagement at any angular position of the driving pulley relative to the shaft, the cams driven by the roll shaft would get out of phase with respect to the other mechanisms in the machine and the ductor roll and the oscillator roll would not move in proper relation to those mechanisms.

Moreover, a simple pawl and ratchet type of one-way clutch is not satisfactory in the present machine, even though it be arranged to make connection in the same position of angular adjustment between the pulley and roll shaft at all times.

Such a connection would be satisfactory if the fountain roll shaft were in phase with the main cylinder and other mechanisms in the machine. However, as explained above, the fountain roll is out of phase since the main cylinder must make 2 1/16 revolutions for each revolution of the fountain roll pulley 630. Hence, if the main cylinder were rotated reversely 2 1/16 revolutions, with the fountain roll remaining stationary, such a conventional pawl would drop into engagement, since the pulley 630 would have made exactly one revolution, and mechanisms driven by the fountain roll would be one groove out of phase with the main cylinder when the machine was started up in the forward direction.

The mechanism shown in Figures 74-77 has been provided to take care of this situation and to assure that the one-way clutch makes driving engagement only when the fountain roll shaft and the cams driven thereby are in proper phase relation to all other mechanisms in the machine. Upon the outer end of the roll shaft 516 is a pulley 630, with a bearing sleeve 631 interposed, so that the pulley is free to rotate relative to the shaft. A face plate 632 is secured to the pulley for limited relative rotation, for shock absorbing purposes, by screws 633 extending through slots 634. The plate 632 carries a stud 635, upon which a planetary gear 636 is rotatably mounted. Projecting from the hub of the gear is a pin 637, in position to engage a spring pressed pawl 638 mounted upon a pin 639 carried by the plate 632. A spring 640, connected to pin 639 at one end and to the adjacent screw 633 at the other, applies a resilient force to the plate, to rotate the latter in a clockwise direction, relative to the pulley and to provide a resilient, shock absorbing, driving connection between the pulley and the plate.

Fixed to the end of the shaft 516 by a set screw or the like is a sun gear 641, in mesh with the planetary gear 636. The structure is completed by a back plate 642, secured to the pulley by appropriate screws.

The sun gear 641 has one more tooth than the planetary gear 636. In the present instance, the former has 33 teeth and the latter 32. The pulley 620 on the main cylinder shaft, as noted above, has 16 grooves therein, and the pulley 630 has 33 grooves.

When the machine is rotated by hand in the reverse direction, rotation is imparted from the pulley 620 through belt 280, to rotate the pulley 630, in the reverse direction, but since the pulley 630 has 33 grooves therein, it will rotate one groove less than a complete rotation for each two rotations of the main cylinder. Planetary gear 636 will planetate about the sun gear 641 during this reverse rotation of pulley 630. Since the sun gear has 33 teeth and the planetary gear has 32 teeth, the planetary gear will rotate about its own axis exactly one revolution during this amount of rearward rotation, and the pin 637 will just click past the pawl 638 at the end of each two reverse rotations of the main cylinder. If the machine is rotated reversely less than an even multiple of two, the pin 637 will come to rest at some intermediate point, spaced from the pawl 638. Now if the machine is started up and the main cylinder operated in the forward direction, the planetary gear 636 will planetate about the sun gear 641 in a clockwise direction, until the pin 637 strikes the pawl 638, thereby providing lost motion between the main cylinder and the ink fountain roll to compensate for the out-of-phase relation between the two, and to establish driving connection to the ink fountain roll only when the parts are in the proper phase relation.

In other words, the pulley 630 is always out of phase with the main cylinder. However, during reverse rotation of the machine and the pulley 630, the planetary gear 636 is always in phase with the main cylinder, although it rotates about its axis at one-half the speed of the main cylinder. The driving connection between the main cylinder and the fountain roll is controlled by the in-phase planetary gear, so that the connection may be effected only when the parts are in phase.

*The main cylinder*

Referring to Figures 2, 78-82, and 91, the main cylinder 17, as stated above, comprises a plate holding segment 18 and a paper holding, platen or impression segment 19. The plate segment comprises an accurately machined peripheral surface 645 and integral inwardly extending flanges or heads 646 and 647, provided with arcuate, outwardly extending hubs 648 at their inner ends, and outwardly projecting, stepped bosses 649 on their outer faces. The platen segment similarly has an accurately machined cylindrical surface 650 and end flanges or heads 651 and 652, terminating at their inner ends in arcuate outwardly extending hubs 653. Stepped bosses 654 also project outwardly from these end flanges. The hubs 648 and 653 of the segments 18 and 19 are seated upon the main cylinder supporting shaft 655. Arcuate clamping members 656 and 657 embrace the hubs 648 and 653, respectively, at both ends of the cylinder, and are held in clamping relation by bolts 658 extending through a radial bore in each hub 653, a diametric bore near each end of shaft 655 and a circumferentially elongated slot 648' in each hub 648, so that the plate segment may be angularly adjusted relative to the shaft 655 and the impression segment 19, while the angular relation between the shaft and the impression segment remains fixed. The adjustment of the plate segment may be effected by a turnbuckle rod 659 having a peripherally notched hand wheel 660 secured to its central portion and having right and left hand threaded ends, disposed in correspondingly threaded sleeves 661 and 662 pivotally secured upon pins 663 and 664 carried by lugs on the respective segments. A spring detent 665 appropriately secured to threaded sleeve 662 bears against the notched circumference of the hand wheel to hold the same in adjusted position. A pair of strong tension springs 666, connected to pins carried by the respective sections tends to draw them together against the turnbuckle.

Secured to the left hand end flange 647 of the plate segment, by cap screws 667 extending through spacer sleeves 668 into the bosses 649, is a ring gear 23, as shown in Figures 78, 79 and 81. The gear is provided with three cut-out portions 670, bridging the bosses 654 on the left hand end flange 652 of the impression segment. Hence, the gear is bolted to and carried by the plate segment, exclusively. The gear is in mesh with a gear 671, fast on the main drive shaft 345 journalled in the side frame and having on its outer end a variable speed drive pulley 672, described in detail below. A sleeve 673 may be mounted on the drive shaft to assist in guiding the paper sheets to the grippers carried by the impression segment. The drive shaft also carries the pulley 344 described above, and a spur gear 674. The variable speed drive has a hand wheel 675 associated therewith and the opposite end of the shaft 345 similarly has a hand wheel 676 thereon, so that the machine may be rotated by hand from either side.

The bosses 654, integral with the left hand end flange or head 652 of the impression segment 19 serve as seats to support the left hand ring cam 414. The cam is secured in position by cap screws 678, disposed in the cutout portion 670 of the ring gear 23, as shown in Figures 79 and 82.

The bosses 654 integral with the end flange 651 at the right hand end of the impression segment 19 serve as seats for the ring cam 413 and for the cam 365, referred to above. The cams are held in place upon the bosses 654 by cap screws 366, previously referred to, in spaced relation by flange 677 formed on the radial face of one of the cams.

Thus, the ring cams 413 and 414 and the cam 365 are fixed with respect to, and are carried by the impression segment exclusively. As pointed out above, the ring cams 413 and 414 engage the cam following wheels on the moisture form roll and on the ink form roll and move them outwardly to clear the impression segment, and drop the rolls inwardly, into a position to make contact with the plate on the plate segment. The cam 365, as explained above controls the raising and lowering movements of the upper feed roll for projecting the sheets into the gripper mechanism, which is also carried by the impression segment, and which will now be described.

Secured to the leading end face of the impression segment 19 by suitable bolts are a pair of bearing blocks 679, in which a rock shaft 680 is mounted. The right hand end of the shaft 680 carries an arm 681, having a cam following roller 682 on its free end, positioned to engage a stationary cam 683, carried by spacer sleeves 684 appropriately secured to and projecting inwardly from the main side plate 1. Adjacent its ends, the shaft 680 carries laterally projecting arms 685 connected to tension springs 686 having their opposite ends secured to pins 687 projecting inwardly from the heads or end flanges of the impression segment, whereby the shaft is rocked in the clockwise direction, as viewed in Figure 83.

The shaft 680 carries the combined gripper and ejector mechanism, which comprises a strip of sheet spring steel cut and bent to provide a plurality of securing tabs 688, wrapped around the shaft and attached thereto by rivets or the like, and a plurality of spaced gripper fingers 689 and a plurality of spaced ejector fingers 690.

The tabs 688 are spaced apart a distance equal to the width of the ejector fingers 690 and the latter are bent downwardly and rearwardly from the inner edges of the central portions of the gripper fingers 689 and are received by milled out recesses 691 formed in the leading end face of the impression segment 19. The gripper fingers 689 are nearly three times as wide as the ejector fingers 690 and seat upon a surface 692 which extends from end to end of the segment, except where the recesses 691 are formed. It should be noted that this surface extends inwardly on a plane inclined with respect to the circumferential surface 650.

Referring to Figures 95–99, the gripper is urged to the closed paper clamping position by the springs 686 and is moved to the open paper receiving position and to the paper ejecting position by the cam 683 which engages the roller 682, to rock the shaft 680. The cam 683 has a fairly pronounced rise 693, to swing the gripper-ejector to the maximum open position, for raising the leading end of the sheet of paper, above the periphery of the main cylinder, to be engaged by the stripper described below. Following the rise 693 is a dwell 694 which permits the springs 686 to seat the gripper fingers 689 firmly upon the surface 692 of the impression segment, in closed position, as shown in Figure 83 and Figure 97, with the cam following roller 682 free of the cam. In this position, the gripper fingers are located so that they will not make contact with the moisture and ink form rolls as they move therepast. Near the lower end section of the cam 683, following the dwell 694, is a rise 695 which engages the cam following roller 682 and swings the gripper to an intermediate open position, for receiving a sheet of paper. This paper receiving position is approximately half-way between the full and broken line positions of the gripper shown in Figure 83. Beyond the rise 695 is a drop 696, which permits the springs 686 to swing the gripper to the closed position, to clamp the sheet firmly upon the surface 692, after it has been fed into the space between the gripper and ejector fingers by the feed rolls described above. Following the drop 696, the roller 682 leaves the cam 683, and the gripper remains in the closed position, under the influence of the springs 686, until the roller again engages the cam rise 693, for sheet ejection.

As shown in Figure 80, secured to the trailing end face of the impression segment 19 is an elongated strip 697 of moisture absorbing material, coextensive in length with the cylinder and having its outer face substantially flush with the surface 650 of the segment. The strip may be secured in place by any appropriate means, such as a clamping plate 698, having forwardly projecting pins 699 embedded in the wicking to prevent relative movement of the latter. The plate may be secured to the cylinder in any suitable manner, as by a spring-pressed hinge connection or by suitable screws.

It has been found that, in the operation of offset duplicating machines, the moisture applied to the plate on the plate cylinder of a three cylinder machine, or to the plate on the plate holding segment of the main cylinder in a two-cylinder machine, is transferred to the blanket roll and by the blanket roll to the impression surface. This moisture accumulates on the impression surface in areas where it is not absorbed by the paper. As the blanket roll makes rolling contact with the impression surface, the excess moisture is rolled and squeezed toward the trailing end thereof, where it tends to accumulate in a ridge or in drops, until it is thrown off by centrifugal force, thereby wetting the machine.

The strip of wicking or other moisture absorbing material 697, disposed along the trailing edge of the impression surface entirely overcomes this difficulty, since the moisture is readily absorbed, as fast as it is rolled to the end of the surface, so that an excess never accumulates in the form of a ridge or drops.

The radial dimensions of the plate and impression segments of the main cylinder are quite critical and are accurately predetermined. They have been selected as a result of giving primary consideration to the plate and paper thicknesses which would most usually be employed. The aim is to have the plate segment, with a master plate in position thereon, of the same overall diameter as the impression segment, with a paper sheet thereon. In other words, the overall diameter of the cylinder as a whole, with the plate and paper thereon should be as nearly as possible the same. It was decided that plates of .006" thickness are the most practical, from the standpoint of economy, flexibility, ease of typing, minimum embossing and durability. It was also concluded that 16 lb. and 20 lb. paper stock would represent between 90% and 95% of the material printed with a machine of this type. Plate thicknesses can be standardized without difficulty, but it is desirable to be able to run all weights of paper ranging from tissue to card stock, having thickness variations from .002" to .011". With such variations in paper thickness, it is obviously impossible to maintain the overall radii of the plate and impression segments equal, without the use of shims, which are impractical in office duplicating machines. The paper most commonly used is approximately .004" thick. Accordingly, the radius of the impression segment is made .002" greater than that of the plate segment.

Important advantages result from having the gear 23 fast upon the plate carrying segment 18 and the cams 413, 414 and 365 fast upon the impression segment, and from having the plate segment mounted for adjustment relative to the supporting shaft 655. As explained below, the blanket roll 21 carries a gear 22 which is continuously in mesh with the gear 23 on the main cylinder. Hence, when the plate and impression segments are adjusted relative to each other by the turnbuckle wheel 660, the plate segment and the blanket roll do not have relative movement, but the impression segment and the blanket roll do have relative angular movement. As a result, the plate segment and blanket roll may be adjusted relative to the impression segment and the main shaft 655, to raise or lower the position of the image transferred to the paper by the blanket roll, but this adjustment does not change the position on the blanket roll to which the image is transferred by the plate. Hence, the formation of double images, on the blanket roll, after adjustment, is eliminated, and the cleaning of the blanket roll between adjustments is unnecessary.

The throw out cams 413 and 414 for the ink and moisture form rolls are mounted on the impression segment, for the reason that their function is to move the rolls out of contact before they can engage the impression segment and to drop them back in at the trailing end of the impression segment so that they are in position to engage the plate on the plate segment.

It is also advantageous to have the feed roll control cam 365 mounted upon the impression segment, since its position relative to the sheet receiving gripper mechanism is the important thing and, once determined, should not be changed, when the relative position of the plate and impression segments is changed.

The leading and trailing end faces of the plate segment 18 carry clamps for the corresponding ends of the master plate, but since these clamps may be constructed in accordance with the disclosure of the copending application of Herbert F. Bruns, Serial No. 84,509, filed March 31, 1949, they will not be shown or described herein.

*The sheet stripper and hold-down and delivery rolls*

The stripper, indicated generally at 26, comprises an arcuate plate 700 having upwardly extending hangers 701 at opposite ends, pivoted upon a stud 702 and a stub shaft 702' mounted in the machine side frames. The right hand stub shaft 702' extends through the side frame 1 and has secured to its outer end a depending arm 703, which carries a headed pin 704 disposed within a slot 705 in the end of a link 706. The link is connected to one end of a bell crank lever 707, fast upon a rock shaft 708 carried by the side frames and having its other arm 709 pivotally connected to a piston rod 710. The rod carries a piston 711 disposed within a cylinder 712, pivoted to the side frame at 713 and enclosing a compression spring 714, tending to force the piston and the rod toward the right as viewed in Figure 86, the piston being projected forwardly by compressed air delivered to the cylinder through a valved orifice 715 by a flexible hose 716, the latter being connected to the compressed air pipe 455, as shown in Figure 1.

Figure 85:
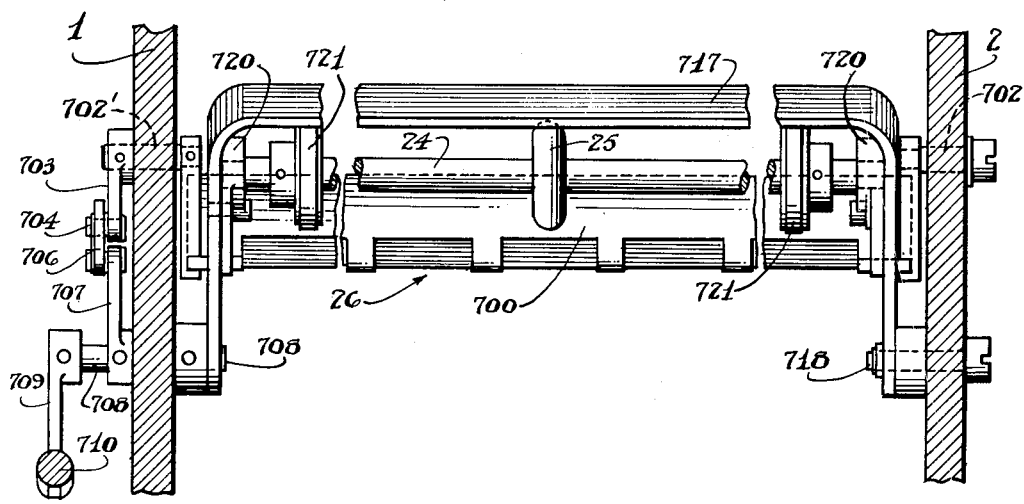
Figure 85 is a vertical section and elevation, showing certain of the parts illustrated in Figure 84.

Secured to the inner end of the rock shaft 708 is a U-shaped bracket 717, extending across the machine and having its opposite end mounted upon a stud 718 (Figures 84–86). The hold-down roll shaft 24 has its ends journalled in elongated openings in bearing blocks 720 carried by the legs of the bracket 717. A pair of cam following wheels 721 are mounted on the shaft 24, in position to be engaged and driven by the rise of the ring cams 413 and 414 on the main cylinder. The shaft also carries a plurality of rubber hold-down wheels or disks 25, of a diameter to just clear the paper and the plate on the main cylinder and to prevent the sheets from occasionally rising above the stripper. The sheets engage the rolls with such light pressure that ink tracking is avoided.

Eccentric stops 723 and 724 (Figure 86) are positioned on the outer surface of the right hand side plate, to limit the throw of the bell crank 707 and the rocking movements of shaft 708.

The pin 704 on the arm 703 is normally maintained in the right hand end of the slot 705 by the weight of the stripper plate 700 which always tends to swing rearwardly to the operative position, as shown in full lines in Figure 86 and in Figure 88.

The leading edge of the stripper plate 700 is beveled along spaced sections 725, as indicated in Figures 87 and 88, while the intermediate sections are forwardly extended to provide stripper fingers 726 having beveled ends 727, providing relatively sharp edges. The fingers are arranged to enter the spaces between the gripper fingers 689, and, of course, between the ejector fingers 690, since the latter are positioned at the mid-sections of the gripper fingers.

The slotted link connection with the actuating arm for the stripper plate is a safety feature of considerable importance, since the stripper plate may swing forwardly to an inoperative position, against the force of gravity, should anything become caught between the leading end of one of the segments of the machine and the stripper plate.

When the machine is stopped, the supply of compressed air to the cylinder 712 is cut off and the air in the cylinder is permitted to exhaust to atmosphere. The spring 714 retracts the piston and swings the bell crank in a counterclockwise direction. The link 706 rocks the stripper plate 700 in a clockwise direction and moves it to an inoperative position, as shown in broken lines in Figure 86. Simultaneously, the hold-down roll-supporting bracket 717 is swung forwardly, toward the left, to the broken line position. These movements of the stripper plate and the hold-down rolls are important in giving access to the gaps in the main cylinder, for instance, when it is desired to change a master plate or to adjust the hand wheel 660 of the turnbuckle mechanism.

As soon as the machine is put in operation, air is delivered to the cylinder 712, the piston is advanced against the force of spring 714, the stripper plate swings downwardly to the operative position, and the hold-down rolls are swung rearwardly into their operative position.

Disposed in front of the sheet stripper 26, when the plate 700 thereof is in the lower, normal position, is the sheet delivery roll shaft 27, having a plurality of disks or wheels 28 mounted thereon. As shown in Figures 4, 6 and 84, the shaft 27 is journalled in bearings 730 carried by the side plates 1 and 2 and has frictionally mounted on its left hand end the pulley 617 referred to above. The pulley is driven by the belt 616, trained about the oscillator pulley 615 and about the driving pulley 618 so as to be rotated quite rapidly. The sheets of paper travelling along the stripper plate 700 engage the peripheries of the rollers 28 and are carried forwardly thereby, into engagement with the spring hold-down finger 30 (Figure 2) associated with the receiving tray 29. Thus, the delivery rolls assure the passage of the sheets from the stripper completely into the receiving tray.

*The blanket cylinder and its mounting*

The blanket roll or cylinder 21 may comprise a substantially cylindrical metallic body 735, having a longitudinally extending channel or gap 736 formed therein, in which clamping means 737 of conventional form are disposed, for securing upon the periphery of the body, a rubber blanket 738, as is well understood in the art. The ends of the roll carry bearings 739 by which the roll is journalled on a non-rotatable shaft 740. Secured to the left hand end of the blanket roll is the gear 22, in mesh with the ring gear 23, carried by the left hand end of the plate segment of the main cylinder so that the cylinders rotate in unison.

The ends of the shaft 740 extend with clearance through openings in the side plates 1 and 2. Above each opening is a stud 741, having a reduced, threaded end extending through the side plate, and held in angular adjustment by a nut 742. Depending from the stud is a pivoted hanger arm 743 having a forwardly facing recess 744 therein, constituting a seat to receive a circumferentially grooved portion on the adjacent end of the roll shaft.

At its lower end, each hanger is provided with a roller 745, disposed in engagement with the inner surface of the adjacent side plate 1 or 2. A pin 746, projecting from the lower end face of each hanger is received in one or another of a plurality of openings formed in a finger piece 747, the forward end of which is connected to a strong tension spring 748 (Figure 2) attached to the machine side frame.

A second arm 749 depends from each stud 741, at opposite sides of the machine, in front of the shaft 740 and each is arranged to make clamping engagement therewith. The lower ends of arms 749 are connected by pins 750, to short, upwardly projecting arms 751 mounted on a rock shaft 752, extending transversely of the machine and journalled in the side plates. Thus, rock shaft 752 and arms 751 and 749 limit the degree of forward swinging movement imparted to the roll shaft 740 by the hanger arms 743 and spring 748. Rocking movement of the shaft 752 in a clockwise direction, Figure 90, moves the shaft 740 rearwardly, against the force of said springs.

As shown in the detail sectional view, Figure 92a, each stud 741 for supporting the hangers 743 and the arms 749 has a concentric portion 741a upon which the hanger 743 is mounted and an eccentric portion 741b embraced by a circular opening in the upper end of the arm 749. The head of the stud is provided with a kerf so that, with the nut 742 loosened, its angular position may be changed, to move the upper end of arm 749 forwardly or rearwardly, by shifting the eccentric portion 741b forwardly or rearwardly, without, however, changing the fore and aft or vertical position of the upper end of the hanger 743. The position of each arm 749 determines the position to which the corresponding end of the blanket roll shaft 740 may be drawn forwardly by the spring 748 connected to the hangers 743. Hence, by adjusting the screws 741, the blanket roll may be brought into exact parallelism with the main cylinder.

The automatic throw-out mechanism for the blanket roll and the means for controlling the pressure between the blanket roll and the main cylinder is mounted on the outside of the right-hand side plate 1 and is best shown in Figures 1 and 90—82. Fixed to the outer end of the shaft 752 is a main lever arm 753, projecting forwardly and having an extension 754 secured to its upper surface. At the forward end of the latter, there is secured a yoke 755, between the legs of which there is journalled a cam following roller 756, arranged to make rolling contact with a central cam 757, fast on the end of the main cylinder shaft 655, the purpose of which is described below.

Beneath the lever arm 753 is an eccentric stop 758, carried by the side frame 1 and arranged to limit the downward movement of the lever arm 753 and, thereby, the forward movement of the blanket roll.

As shown in Figures 90 and 92, the eccentric stop comprises an eccentric sleeve 759 surrounding an eccentrically mounted post 760, with a dished spring washer 761, disposed behind its inner surface, forcing the sleeve outwardly, against a pin 762 carried by the post and adapted to be seated in diametrically arranged grooves, to prevent inadvertent rotation of the sleeve. The eccentric post may be rotated for major adjustment only, and the sleeve may be adjusted whenever desired, in accordance with the thickness of paper sheets being printed, as explained below.

Pivotally secured in spaced relation to the outer face of the lever arm 753 upon a pin 765 is a secondary lever 766, carrying on its forward end a cam following roller 767 and having a notch 768 at its rear end, for engagement with a latch 769, pivoted to the main lever arm 753 by a pin 770 and urged forwardly by a spring 771 but adapted to be swung rearwardly, to the inoperative position as shown in Figure 90 by an electromagnet 772 carried by the lever 753.

This arrangement is duplicated on the inner side of the main lever arm 753. Another secondary lever 773, pivoted on the pin 765 carries on its forward end a cam following roller 774 and has a rear end adapted to be engaged by a similar latch 775 under the control an electromagnet 776, as best shown in Figure 92.

Pivotally secured to the side frame 1, upon an eccentrically adjustable stud 777 is a depending hook 778, the lower end of which is positioned to engage under and support, in a raised position, the inner end of the pin 765, when the hook is swung forwardly by a spring 779, this movement being permitted only when electromagnet 780, mounted on the side plate is de-energized.

The cam following roller 767 is disposed in engagement with a cam 781, fast on the outer end of the main cylinder shaft 655 and is normally held in contact therewith by a spring 782. A similar spring (not shown) holds the cam following roller 774 in contact with a cam 783, fast on the shaft 655, but spaced inwardly from the central cam 757, as shown in Figure 91.

In the normal operation of the machine, the electromagnets 772, 776, and 780 are all energized, thereby holding the latches 769 and 775 in their retracted, inoperative position and holding the hook 778 away from the end of pin 765. The cam following roller 756 on arm 754 attached to the main lever arm 753 is engaged by the rise on the central cam 757, which is a very slight rise, so that the arm 753 is swung upwardly a slight distance (Figure 90), during each rotation of the main cylinder, to impart a corresponding rocking movement to the shaft 752 and arms 751. This motion is transmitted through the arms 749 to the ends of shaft 740, moving the latter rearwardly a very slight distance, a matter of a few thousandths of an inch, to relieve the pressure between the blanket roll and the main cylinder. This relief occurs just prior to the engagement between the leading end of the plate on the plate segment with the blanket roll, to reduce the pressure during the offset operation.

When the dwell in the central cam 757 comes adjacent the central cam following roller 756, the main lever arm 753 swings downwardly a slight distance, either to the bottom of the dwell or until its movement is arrested by the eccentric stop 758, depending upon the adjustment of the latter which, in turn, is determined by the thickness of the paper being printed. The dwell is operatively associated with the impression segment of the main cylinder and is effective to drop-in the blanket roll to make contact with the paper on the impression segment with increased pressure. However, it is desirable to control the degree of drop-in and thereby the degree of pressure applied during printing, in accordance with the thickness of the sheet, so that the full force of the springs 748 is not applied to the paper, but is taken up in part by the eccentric stop.

Hence, the sleeve 759 is adjusted in accordance with the thickness of the paper being printed, to maintain the pressure substantially constant for all thicknesses.

During normal printing operations, with the magnets 772 and 776 energized, the secondary cam following levers 766 and 773 oscillate up and down, ineffectively, as a result of movements imparted thereto by cams 781 and 783.

The cams 783 and 781 control the throw-out of the blanket roll to a position out of rolling contact with the main cylinder and the throw-in of the roll to printing position, respectively.

The cams are effective only when the electromagnets 772 and 776 are de-energized, so that the latches controlled thereby may swing forwardly to lie under the corresponding, rear ends of the secondary levers 766 and 773. Two separate cams are provided for the throw-out and the throw-in, so that the movements will be gradual and may occur during a longer portion of rotation of the main cylinder than would be possible if only a single cam were employed.

The hook 778 holds the main lever arm 753 in the elevated position when the electromagnet 780 is de-energized, so that the lever arm 753 may be lowered, to move the blanket roll into operative position, only under the control of the appropriate cam and so that the lever arm will not be lowered materially in the gap where the dwells in the cams 781 and 783 overlap.

In the arrangement shown, cam 783 is the throw-out cam and cam 781 controls the throw-in. Assuming that the machine has been operating in the normal manner, with the three electromagnets energized, if a paper sheet is missed, the magnets are de-energized, the latches 769 and 775 are released, to swing forwardly, and the hook 778 is similarly moved. When the detector finger determines the absence of a paper sheet, the plate segment is approaching the blanket roll and the main lever 753 is supported by the central cam 757 engaging cam following roller 756. The throw-out lever 773 is on the dwell of cam 783, and the throw-in lever 766 is on the rise of cam 781, with its rear end below and disengaged from latch 769. If the detector finger detects the absence of a sheet, all three of the magnets are de-energized, and latch 775 swings under the tail of lever 773, the latter being raised to receive the latch by reason of the fact that the roller 774 is at this time on the dwell of cam 783. As the main cylinder continues its rotation, the cam 783 raises lever 773 and the main lever 753, because of the latched connection of the former with the latter, through latch 775. Raising of the levers throws the blanket to a position where it will not make contact with the main cylinder. As the levers rise, hook 778 swings under pin 765 and latch 769 swings under the tail of lever 766. When the dwell in cam 783 comes opposite cam following roller 774, the main lever 753 drops slightly, until the load is transferred to and carried by hook 778. The rise in cam 781, working through roller 767, lever 766 and latch 769 lifts the pin 765 a slight distance from hook 778, but the hook remains in the forwardly projected position, so long as the electromagnet 780 is de-energized.

When sheet feed is resumed, the sheet detector makes its determination at the same point in the cycle as previously noted, i. e., when roller 767 is on the rise of cam 781; but at this time the load is being borne by arm 766 and latch 769. The detector mechanism, through the switches and relay circuits described below instantly, energizes all three electromagnets, 772, 776, and 780; with the result that latch 775 and hook 778 swing to their inoperative positions. However, latch 769 cannot swing in this manner, since it is supporting the load. When the dwell in cam 781 comes opposite the roller 767, the lever 766 and the main lever arm 753 swing downwardly to control the throw-in of the blanket roll, until the load is taken by the eccentric stop 758, whereupon the latch 769 is free to swing rearwardly, toward the magnet 772, to the inoperative position, for continuing of the printing cycle.

After the plate has been moistened and linked, as explained below, it is desired to transfer the ink image to the blanket roll, before paper sheets are fed, but without transferring the image from the blanket roll to the bare impression segment of the main cylinder. This may be accomplished by energizing magnets 780 and 772, leaving magnet 776 de-energized. Hence, arm 773 is connected to the main arm 753 by the latch 775 and the blanket roll is thrown out of engagement with the platen segment by the cam 783 but is permitted to make contact with the plate segment by the cam following roller 774 on arm 773 dropping into the dwell of cam 783.

The way in which the two magnets 780 and 772 are energized, while magnet 776 is de-energized is explained below in connection with the description of the circuit diagram.

*The variable speed drive.*

Referring to Figures 3–7, 93 and 94, the motor 38 has a drive shaft 785 extending through an opening 786 in the left-hand side plate 2, upon which is mounted a hub 787, by means of a set screw 788, or the like. A fixed pulley section 789 is rigidly secured to the end of the hub by a cap screw 790. A shiftable inner pulley section 791, slidable on the hub 787 is connected to the outer section by a plurality of pins 792 and is urged outwardly by a coil compression spring 793 of predetermined relative strength, as explained below. The pulley sections have conical, mutually facing surfaces, providing a circumferential gap 794 of variable width, depending upon the position of the shiftable section 791, to accommodate the main V-belt 795 and to vary the effective diameter of the pulley.

The driven pulley comprises an inner section 797 keyed or otherwise fixedly secured to the main drive shaft 345 for the machine, which constitutes the driven shaft of the variable speed drive. The inner pulley section 797 has a plurality of outwardly projecting pins 798 extending through holes in the web of the outer pulley section 799. The latter section is axially slidable on the driven shaft 345 and has an externally threaded, outwardly projecting hub 800 formed integrally therewith. A cap nut 801 is mounted upon the threaded section of the hub and has its inner face bearing against the outer end of the shaft 345. A plurality of relatively strong tension springs 802 have their inner ends connected to pins 803 disposed in seats on the inner face of the fixed section 797 and their outer ends connected to pins 804 similarly arranged in seats formed in the outer face of the central section of the movable pulley section 799. Since the tension springs 802 are stronger than the compression spring 793, the outer pulley section 799 is drawn inwardly with greater force than is exerted by the compression spring tending to urge the movable pulley section 791 of the driving pulley outwardly. As a result, the tension springs associated with the driven pulley, normally tend to bring the driven pulley sections close together so that the belt rides at the outermost portion of that pulley. The force thus applied to the belt causes the same to move inwardly with respect to the driving pulley and spreads the sections thereof apart, against the force of compression spring 793.

The cap nut 801, however, may be adjusted to limit the extent of inward movement of the shiftable, outer section 799 of the driven pulley, by abutment with the end of shaft 345, thereby controlling the speed ratio between the two pulleys.

The hand wheel 675 has a cylindrical bore encircling the nut 801 and is provided with a plurality of bores 805 which receive the pins 798 so that rotation of the hand wheel is transmitted through the pulley section 797 to the shaft 345. Light compression springs 806 may be seated in the bores 805, to urge the hand wheel outwardly into contact with the flange on the nut 801. The nut may be provided with a kerf 807, to facilitate its rotary adjustment, relative to the associated parts, for changing the speed ratio of the pulleys.

It is thought that the operation of the variable speed drive will be apparent from a consideration of the foregoing description. The tension springs 802 always draw the outer pulley section and the cap nut inwardly, to maintain the inner face of the latter in contact with the end of shaft 345. When the parts are in the position shown in Figures 93 and 94, the speed reduction between the driving and driven pulleys is at the maximum and the machine operates at minimum speed. If the nut 801 is screwed inwardly, to force the pulley sections 797 and 799 apart, the belt 795 will ride in a lower portion of the gap between the pulley sections of the driven pulley, thereby decreasing the effective diameter thereof. The compression spring 793 associated with the driving pulley forces the movable section 791 thereof outwardly, to cause the belt to travel at an outwardly disposed point, thereby increasing the effective diameter of the driving pulley, decreasing the speed reduction, and increasing the speed of the machine. If the nut 801 is again backed off of the hub 800 and shaft 345, the springs 802 again draw the sections of the driven pulley together when operation is resumed, and the sections of the driving pulley are spread, to increase the speed reduction.

Receiving tray

The tray 29 for receiving the printed sheets is mounted, as shown in Figure 2, adjacent the front of the machine, above the feed table, in such a manner that the sheets are received, face up, in position for convenient inspection by the operator. The tray comprises a plate 865 of sheet metal, such as aluminum, having a downturned front edge 866 and an upwardly inclined rear end wall 867, terminating in a rearwardly bent edge portion 868, having its corners cut away as indicated at 869. Secured to the undersurface of the rear portion of the tray 865, adjacent the side edges thereof, are a pair of supporting arms 870, held in place by rivets 871 and 872. The arms extend upwardly and rearwardly in the cutout corners 869 and are secured to a transversely extending shaft 873, having flattened ends 874 disposed in circular recesses in socket plates 875, secured to the inner faces of the main side frames 1 and 2. The recesses in the socket plates open upwardly through slots 876 of a width corresponding to the thickness of the flattened ends 874 of the shaft 873, whereby the shaft may be removed from the socket plates by swinging the tray upwardly, to align the flattened ends with the slots.

A rod 877 is secured to the undersurface of the arms 870, for lateral shifting movement, by clips 878, held in place by rivets 871. The extent of longitudinal movement of the rod may be limited by a pair of spaced sleeves 879, fixed thereto. The rod serves simply as a latch, to hold the receiving tray in an upper position, for convenient access to mechanisms positioned therebelow. When the tray is lifted, the rod may be shifted to the left, to dispose the outer sleeve 879 above the upper edge of the side plate, to support the tray in the raised position.

A pair of side guides 880 are mounted on the tray for lateral adjustment, to accommodate sheets of different widths. Preferably, the upper, rear corners of the side guides are bent and flared outwardly, as indicated at 881. The side guides each have an inwardly extending base flange 882 disposed upon the plate 865, and each base flange terminates forwardly in a downwardly turned portion 883, having a rearwardly and upwardly hooked end 884, engaging the flange 866 of the plate 865. The downwardly turned portion 883 also has a forwardly bent extension 885, constituting a finger piece, by which the side guide as a whole may be shifted laterally on the table.

An adjustable guide for the leading, front edges of the sheets is also provided. Preferably, the guide includes a resilient strip arranged to underlie the stack of sheets received in the tray, so that the sheets may be lifted from the tray, to facilitate grasping of the stack by the operator. A mounting strip of spring metal 886 has its forward end bent downwardly, rearwardly, and upwardly, as indicated at 887, to slidably embrace the downturned flange 866 of the main plate 865. The mounting strip 886 extends rearwardly to a point just short of the upwardly inclined rear end wall 867 of the tray, where it is bent forwardly upon itself as indicated at 888. The guide for the front edges of the sheets comprises a strip of spring metal, having an upwardly extending portion 889, adapted to be engaged by the edges of the sheets; a forwardly bent finger piece extension 890; and a rearwardly extending portion 891, which is received in the space between the mounting strip 886 and the forwardly bent portion 888 thereof.

The rear portion of the strip 891 is provided with an elongated slot 892 and, forwardly thereof, with a circular aperture 893. Rivets 894 and 895 are secured in holes in the forwardly extending portion 888 of the mounting strip 886 and extend downwardly through the slot 892 and the hole 893, respectively, and into registering holes in the lower portion of strip 886. The rivet 894 is preferably peened over the margin of the last mentioned hole, but rivet 895 is removably received in its hole. Hence, the forwardly extending portion 888 of the mounting strip may be sprung upwardly to release rivet 895 and the latter may be drawn forwardly so that rivet 894 is disposed in the rear portion of slot 892 and the rivet 895 may be snapped back into the forward portion of the same slot. In this manner, the guide for the front edges of the sheets may assume two different positions, to accommodate sheets of different sizes.

It will be understood that the side edges of the stack are supported upon the base flanges 882 of the side guides and that the mounting strip 886 and the strip 891 underlie the central portion of the stack. When it is desired to remove the stack, the finger piece 890 may be lifted, to raise the central portion of the stack, so that the operator may readily grasp the stack by hand and lift it out of the tray.

Adjacent the forward edge of the plate 865, are a pair of inwardly projecting, supporting posts 896, secured to the side frame by screws 897 and having resilient sleeves 898 mounted thereon. As noted above, the tray as a whole may be removed from the machine, to give access to the mechanisms positioned therebelow, by simply swinging the forward end thereof upwardly until the flattened ends 874 of the rear shaft 873 are brought into alignment with the slots 876 formed in the socket plates, whereupon the tray may be bodily lifted from the machine.

The side guides preferably have a plurality of apertures 899 formed therein to permit the escape of air from beneath the sheets so that they may settle rapidly.

The electrical control circuit

Referring to Figure 102, showing a preferred electric circuit for the machine, it should be noted that, in addition to the various electromagnet coils referred to above, the circuit includes a rectifier R, a pair of relays 816 and 819, and a mercury switch 850 mounted on the shaft of the feeder control valve 251, adapted to be rocked by manipulation of the handle 252 at the right side of the control panel 40.

The rectifier R and the relays 816 and 819 are preferably positioned in a casing 828, secured to the outer surface of the right hand side plate 1.

When the feeder control valve handle 252 is in the straight down position, the mercury switch 850 is in the full line position, Figure 102, with its circuit open, but when the handle is turned all the way to the right, for normal operation, the mercury switch is in the dotted line position and its circuit closed.

Current is delivered from a source of alternating house current by lines L–1 and L–2, to the motor control switch M, mounted at the center of the control panel 40. When closed, current is conducted from this switch through lines 810 to the motor 38 and thence, in parallel, to the rectifier R.

It will be remembered that, when the various electromagnetic coils shown at the top of the diagram are energized, the associated mechanisms are in the operative position and that when the coils are de-energized, the mechanisms are latched out or otherwise rendered inoperative. In other words, when the moisture feed solenoid 454' is de-energized, the air valve 454 leading to the air spray tube within the rotating screen of the moistener is closed; when the ink feed coil 570 is de-energized, the ductor roll is held out of contact with the fountain roll. When the moisture contact coils 422 and 422' are de-energized, the moisture form roll is held out of contact with the plate. When the ink contact coils 628 and 628' are de-energized, the ink form roll is held out of contact with the plate. When the blanket contact coils 772, 780 and 776 are deenergized, the blanket roll is thrown out of contact with the main cylinder and is held out of contact. On the other hand, when these coils are energized, the associated mechanism operates normally.

Assume that the machine is started, without the feed of paper sheets, the detector finger 388 contacts the stop finger bar 322 completing a circuit from line 812 through detector switch contact 391, which is contacted by arm 390 on the detector finger shaft 370, through line 815 to the left hand end of the coil associated with the left hand relay 816 and back through line 817 and 818 to the rectifier R. When relay 816 is energized, current is delivered to the coil of the right hand relay 819 from line 812, branch 820, contact 821, and lines 822, 823, to the left hand end of the coil, for return through lines 817 and 818 to the rectifier. The rigth hand relay 819 includes a hold circuit comprising a branch line 824 from line 812, a contact 825, and branch 826 leading to line 823 and to the coil. Relay 819, therefore, remains closed until the main motor switch is opened.

As long as relay 816 is energized, no current can flow to the electromagnets and the solenoid, except when the push buttons on control panel 40 are manually operated.

Relay 816 remains energized until sheets are fed below the detector finger 388. The "hold" circuit for this relay is as follows: Current flows from the wire 812 either (a) to and through the detector finger 388, arm 390, contact 391, and line 815 to the coil or (b) from line 812, branch 820, contact 814, line 827, detector switch contacts 393 and line 815 to the coil. It should be understood that during the oscillation of the detector shaft 370, the detector finger 388 first makes contact with the plate 322; arm 390 then strikes contact 391; and contacts 393 of switch 392 are then moved out of contact. As the shaft oscillates in the other direction, toward the left, the reverse procedure is followed. Hence, the coil 816 is energized until a sheet of paper is interposed between the detector finger 388 and the plate 322. The circuit will then be broken, when arm 390 opens contacts 393, and the circuit will remain open until a sheet is missed.

Assuming that it is desired to energize the moisture feed solenoid to spray moisture on the moisture form roll, when starting the machine and before sheets are fed, this may be accomplished by depressing the button M. F. Current flows from rectifier R through line 818 to line 830, to the right hand end of the moisture feed solenoid 454', from the left hand end thereof to the movable spring contact 831, of switch M. F. to the lower fixed contact 832, to the line 833 across branch 834 to line 827, to contact 814 of relay 816 and back through branch 820 and line 812 to the rectifier.

Similarly, if it is desired to energize the ink feed coil 570 when sheets are not being fed, the ink feed button I. F. is depressed and current, after passing through the ink feed coil 570 from line 830, as previously described, flows through the intermediate spring contact 835 of the switch I. F. to the lower contact 836, and back to line 833, for return as previously described.

The circuits for the moisture contact coils 422 and 422' and for the ink contact coils 628 and 628' are arranged in an identical manner, for manual control by buttons M. C. and I. C., and need not be further described.

If it is desired to have the blanket roll make contact with the main cylinder, before sheets are fed, this may be accomplished by pressing the B. C. switch button to energize the blanket contact coils 772 and 780. Current flows through the coil 772 from line 818 and 830 to line 837 to the intermediate contact 838 of the switch B. C., to the lower contact 839 and back to line 834, as previously described. The latching coil 780 is energized in parallel.

The blanket roll is thrown into operation in this manner, under manual control of the button B. C., before sheets are fed to the machine, for the purpose of building up on the blanket, an image from the plate, previously inked and moistened, under manual control, as described above, and prior to the feeding of sheets. During this operation, it will be noted that the blanket roll control coil 776 is not energized. Hence, the latch 775 remains effective to lock the secondary cam following arm 773 to the main throw-out arm 753, with the result that the blanket roll drops into contact with the plate segment under control of cam 783 and is thrown out of contact with the main cylinder prior to the platen segment of the cylinder making contact therewith. This arrangement is highly desirable for inking up the blanket roll and to prevent the transfer of an image from the blanket roll to the bare platen segment.

As pointed out above, when paper sheets are being fed in the normal manner, the relay 816 is de-energized and the contacts thereof are in the position shown in the circuit diagram. Hence, all of the control coils are energized, as will now be explained.

Current flows from line 818 through the coil 776 of the group of blanket contact coils to line 840, to a connection 841 with a line 842 leading to contact 843 of relay 816 and thence through lines 822 and 826 to contact 825 of relay 819, the current returns through branch 824 to line 812, leading to the rectifier R.

Current for the coils 772 and 780 flows from line 830 through the coils to line 837, to the intermediate spring contact 838 of switch B. C., to the upper contact 844 thereof, then through line 841' back to connection 841, for return to line 812 as described above.

Current flows through the ink contact coils 628 and 628' from line 830, to line 845 to the intermediate contact 846 of the switch I. C., to the upper contact 847 thereof, through branch 848 to a line 849 leading to the mercury switch 850. Since this switch is always closed during normal printing, current flows therethrough and through line 851 to a connection 852 with line 841' for return as previously described.

Similarly, current flows through the moisture contact coil 422 and 422' from line 830 to line 853, leading to the middle contact 854 of the switch M. C., then to the upper contact 855 thereof, to the line 849 and through the mercury switch as previously described.

Current flows through the ink feed coil 570 from line 830 to line 856, leading to the intermediate contact 835 of switch I. F., then to the upper contact 857 thereof, then to a line 858, leading to the connection 852 to 841' and line 842, for return through relay 816 as previously described, without passing through the mercury switch 850.

Current flows through the moisture feed solenoid 454' from line 830 to line 859 to the intermediate contact 831 of the switch M. F., then through the upper contact 860 thereof to a line 861, leading to line 853, to the intermediate spring contact 854 of the switch M. C., then to the upper contact 855 thereof, then through line 849, for return through the mercury switch 850 as previously described in connection with the circuit for the moisture contact coils 422 and 422'.

It will be seen that, from the foregoing description, when the machine is operating in the normal manner, all of the electromagnetic coils are energized, namely, solenoid valve coil 454', ink ductor latch coil 570, moisture form roll latch coils 422 and 422', ink form roll latch coils 628 and 628', blanket control coils 722, 780 and 776.

At the conclusion of a normal run, either at the end of the day or when a new plate is to be substituted for one in use, it is desirable to run down the plate and the blanket; in other words, to remove substantially all of the ink on the plate and blanket. To this end, the electric circuit is so arranged that it is quite simple to discontinue the delivery of moisture to the form roll and from the form roll to the plate and to discontinue the delivery of ink from the ink form roll to the plate, while continuing the feeding of paper sheets through the machine, so that these sheets take up the ink on the plate and the blanket.

This is accomplished by turning the feeder control valve handle 252 to the straight up and down position, leaving the valve open, but shifting the mercury switch 850 to the circuit opening position. As a result, current cannot return from the air valve control solenoid 454', through switches M. F. and M. C. and the mercury switch 850 as previously described. Hence, the solenoid is deenergized and the valve 454 for delivering moisture spraying air is closed.

Similarly, current cannot return from the moisture form roll latching coils 422 and 422', through switch M. C. and the mercury switch 850; the magnets are de-energized and the moisture form roll is latched out of contact with the plate.

In the same manner, current cannot return from the ink form roll latch coils 628 and 628' through switch I. C. and the mercury switch 850; the coils 628 and 628' are deenergized and the ink form roll is latched out of contact with the plate. The blanket roll control coils 772, 776 and 780, however, are energized since their current does not flow through the mercury switch, and the machine operates in the normal manner, except for the delivery of moisture and ink to the plate. Hence, a simple system of plate and blanket run-down is provided.

If, during normal operation of the machine, it is desired, for any reason, to de-energize any of the coils to render the associated mechanism inoperative, this may be accomplished by depressing the appropriate pushbutton or buttons. For instance, if it is desired temporarily to discontinue the delivery of ink from the ink fountain roll to the ink form roll, the ductor roll may be latched out of contact with the fountain roll, by depressing the pushbutton I. F. This interrupts the flow of current from line 856 to the upper contact 857, for return through line 858 as previously described. When the machine is running and the button I. F. is pressed, current cannot flow from line 856, intermediate contact 835 and lower contact 836, back to the rectifier, since relay 816 is deenergized and line 827 is not connected to contact 814.

Similarly, depressing any of the other pushbuttons except the B. C. button, has a reversing action; M. F., M. C., or I. C., breaks the circuit by disconnecting the intermediate contact thereof with the upper contact, thereby deenergizing the corresponding coil or coils.

If, during the normal operation of the machine, a paper sheet is missed, all of the coils will be de-energized because the relay 816 will be energized, thereby breaking the return circuit from junction 841, line 842 and relay contact 843 to return line 822. Relay 816 is energized when a paper sheet is missed by a flow of current from line 812 to plate 322, detector finger 388, shaft 370, arm 390, contact 391 and line 815 to one side of the coil, for return through lines 817 and 818 to the rectifier. The relay 816 remains energized, by the hold circuits previously described, so long as paper sheets are not fed to the machine and the control coils remain de-energized for a corresponding period unless manual pushbuttons are used.

The purpose of the right hand relay 819 is to prevent energizing any of the coils until the detector switch has made its initial selection, at the proper time in the printing cycle, when the machine is first started in operation by closing the main motor switch M. Current cannot return from any of the electromagnetic coils to line 812 and to the rectifier, except through contact 825 to relay 819 and branch line 824. Contact 825 is closed only when relay 819 is energized, but the latter can be energized initially only by a momentary closing of relay 816. The delivery of current to the coil of relay 816 is controlled by the movement of detector shaft 370, establishing a circuit to line 812 from stop finger plate 322, detector finger 388, arm 390 and contact 391, the latter being connected to one end of the coil, the other end of which is connected through lines 817 and 818 to the rectifier. As pointed out above, the hold circuit associated with relay 819 if once closed maintains the contact 825 closed until the main motor switch M is opened.

Air control circuit

Figure 103 is a circuit diagram showing the flow of air under sub-atmospheric, minus pressure (suction or partial vacuum) and under super-atmospheric positive pressure. Air under positive pressure is delivered by the pump 39 through the filter 246, a pipe line 247, and a T-fitting 248 to a main line 249, leading to the feeder control valve 251. From the valve 251 air under pressure may be delivered through pipe 253 to the cylinder 241, for actuating the piston 240 which controls the latch 236 for the feeder control valve 219. Air from the line 253 also may be delivered by pipe 504 to the container 500 in which the bulb 502 for the moisture supply is located. This air is delivered to the container 500 whenever the feeder control valve is opened, to collapse the bulb 502, which delivers a measured amount of air to the liquid container 505 through pipe 503. Liquid is forced from the container through pipe 507, to the moistener 31.

Air under pressure also is delivered from line 253 through a branch line 486 to the moisture booster valve 487. When this valve is in the normal position, as explained above, air under pressure is delivered therefrom through pipes 493 and 482 to the cylinder 477 of the moisture booster.

Air under pressure is delivered from the main supply pipe 249 to a pipe 255, connected thereto ahead of the valve 250, and leading to the sheet separator control valve 256. From the latter, air flows through pipe 257 to the air separator 11 as previously explained.

A branch line 258, connected to the main line 249 delivers air under pressure through hose 259 to the feeder 12, for flow to the bellows 50 through line 189 and check valve 190. Air may be permitted to escape from the bellows 50 through line 78 connected to the table control valve 79.

Air flows from the T-fitting 248 through a pipe 455 to the solenoid valve 454 and from the latter through pipe 453 to the moistener 31, to spray moisture upon the moisture form roll 400.

Air under pressure also is delivered from the T-fitting 248 to a pipe 716, leading to the stripper plate control cylinder 712.

Suction is applied to the main suction line 216 by the combined vacuum pump and compressor 39. The vacuum pipe 216 has two branches, one indicated at 218 leading to the feeder control valve 219 and the other 220 leading to the sheet feeder as explained in detail above. Suction is constantly applied to the line 216, but it becomes effective only when the valve 219 is closed and the suction feet 168 are resting on a sheet of paper, since, when the valve is open or the suction feet are not sealed by a sheet, the vacuum is broken.

Sheet feeding and handling cycle

Figures 95–99 show a number of successive steps in the feeding of a sheet and in the handling of the sheet from the time it leaves the feed table, through the printing operation, to its delivery into the receiving tray. Many parts of the apparatus have been omitted in these figures, for the sake of clarity.

Figure 95 shows the relationship at the start of a cycle of operations. The suction feet 167 are at their lower position, resting upon the uppermost sheet S in the stack, having been dropped to this position by the opening of the atmosphere relief valve 219. The stop fingers 320 and the sheet detector 388 are raised and the upper feed roll 13 is in its upper position, spaced above the lower feed roll 14. With the parts in this position, the suction feet will be lifted, as soon as the valve 219 is closed and when a sufficient amount of vacuum has been created in the system to lift the feet and the uppermost sheet. Of course, this lifting occurs in a small fraction of a second. The suction is transferred, as described above, to the suction belt 145 and the sheet is gripped by the belt, as shown in Figure 96. The feed rolls, stop fingers and sheet detector remain in the same position.

The sheet is now advanced by the forward movement of the belt 145, produced by the intermittent motion mechanism, described above, until its forward edge contacts the stop fingers 320. At this time, the suction to the belt is cut off and the sheet is released thereby. Simultaneously the detector finger is depressed, to hold the sheet on the stop finger plate, as shown in Figure 97.

After a delay of approximately 30 degrees in the rotation of the main cylinder, the stop fingers 320 are lowered. After they have been lowered into the grooves of the lower feed roll, the upper feed roll drops upon the sheet, and the detector finger is raised clear of the sheet. As a result, the sheet is rapidly fed rearwardly and directed into the open sheet gripper, as shown in Figure 98. The sheet is guided in this direction, by the roller 673 on the main drive shaft 345.

The sheet enters the gripper and its leading edge is firmly seated in the V-shaped space between the gripper fingers 689 and the ejector fingers 690, because the speed of movement of the sheet is greater than the peripheral speed of movement of the main cylinder, by approximately 50%. Hence, a buckle is formed in the sheet, as indicated in Figure 99, as the gripper fingers close, to clamp the leading edge of the sheet upon the surface 692 of the impression segment.

As soon as the sheet is so gripped, the upper feed roll 13 rises and the sheet is carried around by the gripper, past the blanket roll, as indicated at S–1 in Figure 95, to receive the printing from the blanket roll.

The atmospheric air relief valve 219 is now opened, and the suction feet 167 again drop upon the uppermost sheet in the stack.

The stop fingers are again raised into their operative position, ready for the next feeding cycle.

When the cam following roller 682 associated with the sheet gripper engages the rise 693 of cam 683, the leading edge of the printed sheet is pushed outwardly by the ejector fingers 690, as shown in Figure 96 in position to be engaged by the stripper 26. Prior to this time, however, the valve 219 has been closed and the next sheet has been lifted by the suction feet, for transfer to the belt, as previously described. The first sheet, stripped from the impression segment of the main cylinder by the stripper 26 is propelled forwardly by the ejector wheels 28 and is guided into the receiving tray by the deflector wire 30, mounted thereabove, as shown in Figure 97. Meanwhile, the next sheet has been advanced rearwardly, with its leading edge against the stop fingers, and the cycle of operations is repeated.

Although the machine of the present invention has been described in this specification with considerable particularity by reference to the specific embodiment shown in the accompanying drawings, it must be understood that the invention is not limited to the details of construction shown and described, but includes all modifications coming within the scope of the appended claims and their equivalents.

I claim:

1. A duplicating machine comprising a pair of spaced side frames, a cylinder mounted for rotation on a fixed axis between said frames, a blanket roll, and means for supporting the same from the said frames, comprising a depending hanger pivotally secured at its upper end to each side frame, a shaft upon which the roll is journalled having its ends supported by the hangers adacent the pivoted upper ends thereof, resilient means connected to the hangers for urging the roll toward the cylinder, an arm pivotally secured at its upper end to each side frame on a common pivotal axis with said depending hanger and being adapted to limit the movement of the shaft and hangers toward the cylinder under the influence of said resilient means, control means pivotally mounted on one of said frames adapted to control the position of said arms, cam means rotating in timed relation with the cylinder for controlling the position of said control means during one portion of each cycle of operations, and an adustable, fixed stop adapted to intercept said control means so as to control the position of said control means, during the remaining portion of each cycle.

2. A duplicating machine comprising a pair of spaced side frames, a main cylinder having plate and impression segments mounted for rotation between said frames, a blanket roll, and means for supporting the same from said frames, comprising a depending hanger pivotally secured at its upper end to each side frame, a shaft having its ends carried by the hangers upon which the roll is journalled adjacent the pivoted upper ends thereof, resilient means for urging the hangers and the roll toward the cylinder, a depending arm pivotally secured at its upper end to each side frame on a common pivotal axis with said depending hanger and being adapted to limit the movement of the roll toward the main cylinder, control means pivotally mounted on one of said frames adapted to control the position of said arms, cam means rotating in timed relation with the main cylinder in cooperative association with and for controlling the position of said control means, arms and the roll while the plate segment is adjacent the roll; and an adjustable fixed stop adapted to intercept said control means so as to control the position thereof, while the impression segment is adjacent the blanket roll and when the dwell of said cam means is adjacent said control means.

3. A duplicating machine comprising a pair of spaced side frames, a main cylinder having plate and impression segments mounted for rotation between said frames, a blanket roll, means for supporting the same from said side frames for rolling contact with a plate and a sheet on said segments and for movement toward and from the main cylinder, a pivoted arm connected to the roll supporting means for controlling the positions of the roll, and a cam rotating in timed relation with the main cylinder for controlling the position of the arm while the roll is in contact with the plate segment, and an adjustable fixed stop adapted to intercept said arm for determining the position of the arm while the roll is in contact with the impression segment, and when the dwell of said cam means is adjacent said control means.

4. A duplicating machine comprising a pair of spaced side frames, a main cylinder having plate and impression segments mounted for rotation between said frames, a blanket roll, means for supporting the same from said side frames for rolling contact with a plate and a sheet on said segments and for movement toward and from the main cylinder, a pivoted arm connected to the roll supporting means for controlling the positions of the roll, cam means rotating in timed relation with said cylinder for controlling the position of said arm during a portion of the normal cycle of operations, a cam following lever pivoted to the arm for free swinging movement with respect thereto, a second cam for moving said lever, a movable latch for locking the lever against movement relative to the arm, means for actuating the latch to cause the arm to move with the lever to separate the blanket roll from the main cylinder upon the occurrence of predetermined conditions in the machine, a second latch carried by the frame and means for actuating the second latch to hold the arm in the last mentioned position so long as said predetermined conditions exist.

5. A duplicating machine comprising a pair of spaced side frames, a main cylinder having plate and impression segments mounted for rotation between said frames, a blanket roll, means for supporting the same from said side frames for rolling contact with a plate and a sheet on said segments and for movement toward and from the main cylinder, a pivoted arm connected to the roll supporting means for controlling the positions of the roll, cam means rotating in timed relation with said cylinder for controlling the position of said arm during a portion of the normal cycle of operations, a pair of cam following levers pivoted to the arm for free swinging movement with respect thereto, a pair of cams for moving the levers, a movable latch for locking each lever to the arm, and means for actuating the latches, one of said cams and its lever, when latched, serving to move the arm and the blanket roll to a position away from the main cylinder, the other cam and its lever, when latched, serving to control the movement of the arm in the other direction and the movement of the roll toward the cylinder.

6. A duplicating machine comprising a pair of spaced side frames, a main cylinder having plate and impression segments mounted for rotation between said frames, a blanket roll, means for supporting the same from said side frames for rolling contact with a plate and a sheet on said segments and for movement toward and from the main cylinder, a pivoted arm connected to the roll supporting means for controlling the positions of the roll, a pair of cam following levers pivoted to the arm for free swinging movement with respect thereto, a pair of cams for moving the levers, a movable latch for locking each lever to the arm, means for actuating the latches, one of said cams and its lever, when latched, serving to move the arm and the blanket roll to a position away from the main cylinder, the other cam and its lever, when latched, serving to control the movement of the arm in the other direction and the movement of the roll toward the cylinder, a third latch carried by the frame, engageable with the arm to hold the arm in the first position, and means for actuating the third latch.

7. A duplicating machine comprising a pair of spaced side frames, a main cylinder having plate and impression segments mounted for rotation between said frames, a blanket roll, means for supporting the same from said frames for rolling contact with a plate and a sheet on said segments and for movement toward and from the main cylinder, resilient means urging the roll toward the cylinder, a cam following arm operatively connected to the roll supporting means for controlling the positions of the roll, a cam rotating in timed relation with said cylinder for controlling the normal position of the arm while the roll is in contact with the plate segment to reduce the pressure therebetween, an adjustable abutment for intercepting the arm and determining the normal position thereof while the roll is in contact with the impression segment, a second cam rotating with the first cam, a cam following lever engaging the second cam, freely pivoted to said arm for movement with respect thereto, a movable latch for locking the lever to the arm to cause the arm to follow the second cam to move the roll to an abnormal position away from the main cylinder, and means for actuating the latch when desired and upon occurrence of abnormal conditions in the machine.

8. A duplicating machine comprising a pair of spaced side frames, a main cylinder having plate and impression segments mounted for rotation between said frames, a blanket roll, means for supporting the same from said side frames for rolling contact with a plate and a sheet on said segments and for movement toward and from the main cylinder, resilient means urging the roll toward the cylinder, a cam following arm operatively connected to the roll supporting means for controlling the positions of the roll, a cam rotating in timed relation with said cylinder for controlling the normal position of the arm while the roll is in contact with the plate segment to reduce the pressure therebetween, an adjustable abutment for intercepting the arm and determining the normal position thereof while the roll is in contact with the impression segment, a second cam rotating with the first cam, a cam following lever engaging the second cam, freely pivoted to said arm for movement with respect thereto, a movable latch for locking the lever to the arm to cause the arm to follow the second cam to move the roll to an abnormal position away from the main cylinder, means for actuating the latch when desired and upon occurrence of abnormal conditions in the machine, a second latch carried by one of the side frames, and means for actuating the second latch to hold the arm in the position to which it is moved by the second cam.

9. A duplicating machine comprising a pair of spaced side frames, a main cylinder having plate and impression segments mounted for rotation between said frames, a blanket roll, means for supporting the same from said side frames for rolling contact with a plate and a sheet on said segments and for movement toward and from the main cylinder, resilient means urging the roll toward the cylinder, a cam following arm operatively connected to the roll supporting means for controlling the positions of the roll, a cam rotating in timed relation with said cylinder for controlling the normal position of the arm while the roll is in contact with the plate segment to reduce the pressure therebetween, an adjustable abutment for intercepting the arm and determining the normal position thereof while the roll is in contact with the impression segment, a pair of cams rotating with the first cam, a pair of cam following levers engaging said pair of cams, freely pivoted to the arm for movement relative thereto, a moveable latch for each lever for locking the same to the arm, a third latch carried by one of the side frames, and means for actuating said latches to cause the arm to follow one cam of said pair to move the roll to an abnormal position away from the main cylinder and to hold the arm in the last mentioned position so long as the third latch is actuated, the other cam following lever serving to return the arm to its normal position when the third latch is released.

10. A duplicating machine in accordance with claim 9 in which each of said latches is normally maintained in the inoperative position by an electromagnet and in which the means for actuating the latches comprises a spring connected to each latch to move the same when the associated electromagnet is de-energized.

11. A duplicating machine comprising a main cylinder having plate and impression segments, means for feeding sheets in succession to the cylinder, a blanket roll mounted for rolling contact therewith, control means adapted to position said blanket roll with respect to said cylinder cam actuated means adapted to cooperate with said control means for moving the blanket roll outwardly out of contact with the impression segment, a second cam actuated means adapted to cooperate with said control means for holding the roll out of contact with the plate segment, an electromagnetic latch controlling the effectiveness of the first cam actuated means, a second electromagnetic latch controlling the effectiveness of the second cam actuated means, a circuit including automatic means for actuating said latches to render the cam actuated means effective when paper sheets are not fed, and a manual switch, operable when sheets are not fed, for actuating the latches to render the first cam actuated means effective and the second cam actuated means ineffective, whereby the roll is moved out of contact with the impression segment and into contact with a plate on the plate segment, for image build-up on the blanket roll.

12. A duplicating machine comprising a main cylinder having plate and impression segments, means for feeding sheets in succession to the cylinder, a blanket roll mounted for rolling contact therewith, control means adapted to position said blanket roll with respect to said cylinder cam actuated means adapted to cooperate with said control means for moving the blanket roll outwardly out of contact with the impression segment, cam actuated means adapted to cooperate with said control means for holding the roll out of contact with the plate segment, an electromagnet rendering the first cam actuated means ineffective when energized and effective when de-energized, a second electromagnet rendering the second cam actuated means ineffective when energized and effective when de-energized, a circuit including automatic means for de-energizing the magnets when paper sheets are not fed, and a manual switch, operable when sheets are not fed, for energizing the second magnet, leaving the first magnet de-energized, whereby the first cam actuated means moves the roll out of contact with the impression segment and permits contact between the roll and the plate segment for image build-up on the blanket roll.

References Cited in the file of this patent

UNITED STATES PATENTS

| Number | Name | Date |
|---|---|---|
| 350,056 | Huber | Sept. 26, 1886 |
| 746,124 | Mosher | Dec. 8, 1903 |
| 841,142 | Gramlich | Jan. 15, 1907 |
| 1,061,526 | Cortissoz | May 13, 1913 |
| 1,613,255 | Tyler | Jan. 4, 1927 |
| 1,849,143 | Granger | Mar. 15, 1932 |
| 1,853,781 | Rider | Apr. 12, 1932 |
| 2,070,903 | Horst | Feb. 16, 1937 |
| 2,102,641 | Osborn | Dec. 21, 1937 |
| 2,129,230 | O'Neil | Sept. 6, 1938 |
| 2,158,047 | Weston | May 9, 1939 |
| 2,183,720 | Lougee et al. | Dec. 19, 1939 |
| 2,247,473 | Binder | July 1, 1941 |
| 2,273,476 | Shaffer | Feb. 17, 1942 |
| 2,306,044 | Davidson | Dec. 22, 1942 |
| 2,310,363 | Goebel | Feb. 9, 1943 |
| 2,317,993 | Harrold | May 4, 1943 |
| 2,328,990 | Meyer | Sept. 7, 1943 |
| 2,335,010 | Huck | Nov. 23, 1943 |
| 2,347,619 | Taylor | Apr. 25, 1944 |
| 2,387,750 | Davidson | Oct. 30, 1945 |
| 2,397,053 | Schneider | Mar. 19, 1946 |
| 2,408,449 | Russell | Oct. 1, 1946 |
| 2,459,922 | Crafts | Jan. 25, 1949 |
| 2,539,383 | Davidson | Jan. 30, 1951 |
| 2,542,073 | Aberle | Feb. 20, 1951 |